US011051083B2

(12) United States Patent
Takahashi et al.

(10) Patent No.: US 11,051,083 B2
(45) Date of Patent: Jun. 29, 2021

(54) IMAGE PROCESSING APPARATUS AND FILE GENERATION APPARATUS

(71) Applicant: Sony Corporation, Tokyo (JP)

(72) Inventors: Ryohei Takahashi, Kanagawa (JP); Mitsuhiro Hirabayashi, Tokyo (JP); Mitsuru Katsumata, Tokyo (JP); Toshiya Hamada, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/644,970

(22) PCT Filed: Aug. 31, 2018

(86) PCT No.: PCT/JP2018/032326
§ 371 (c)(1),
(2) Date: Mar. 6, 2020

(87) PCT Pub. No.: WO2019/054202
PCT Pub. Date: Mar. 21, 2019

(65) Prior Publication Data
US 2020/0288217 A1 Sep. 10, 2020

(30) Foreign Application Priority Data
Sep. 15, 2017 (JP) .............................. JP2017-177381

(51) Int. Cl.
*H04N 21/845* (2011.01)
*H04N 21/2343* (2011.01)
(Continued)

(52) U.S. Cl.
CPC ... *H04N 21/8456* (2013.01); *H04N 21/23439* (2013.01); *H04N 21/816* (2013.01); *H04N 21/85406* (2013.01)

(58) Field of Classification Search
CPC ......... H04N 21/8456; H04N 21/23439; H04N 21/816; H04N 21/85406
See application file for complete search history.

(56) References Cited

U.S. PATENT DOCUMENTS

2011/0119709 A1* 5/2011 Kim ..................... H04N 13/183
725/39
2013/0287364 A1* 10/2013 Katsumata ......... H04N 21/4856
386/239
(Continued)

FOREIGN PATENT DOCUMENTS

GB  2 554 877 A    4/2018
WO  2017/145757 A1  8/2017

OTHER PUBLICATIONS

Industry Forum: "VR Industry Forum", 3GPP Draft; VRIF Draft Guidelines (V0.0DRAFT10 Sep. 12, 2017), 3rd Generation Partnership Project (3GPP), Sep. 12, 2017 (Sep. 12, 2017), XP051361509, Retrieved from the Internet: URL:http://www.3gpp.org/ftp/tsg_sa/WG4_CODEC/TSGS4_95/Docs/ [retrieved on Oct. 8, 2017].
Lucia D 'Acunto et al: "MPD signalling of 360 content properties for VR applications", 115. MPEG Meeting; May 30, 2016-Jun. 3, 2016; Geneva; (Motion Picture Expert Group of ISO/IEC JTC/SC29/WG11 ). No. m38605, May 25, 2016 (May 25, 2016), XP055327831.
(Continued)

*Primary Examiner* — Mishawn N. Hunter
(74) *Attorney, Agent, or Firm* — Xsensus LLP

(57) ABSTRACT

The present technology relates to an image processing apparatus and a file generation apparatus that make it possible to appropriately reproduce a BV content. An image processing apparatus includes a file processor that selects, from a plurality of streams included in a 3D object content, a plurality of the streams to be used for reproduction of the 3D object content on the basis of group information for selection of the stream appropriate for reproduction of the 3D object content, a file including the group information. The present technology is applicable to a client apparatus.

20 Claims, 56 Drawing Sheets

(51) Int. Cl.
*H04N 21/81* (2011.01)
*H04N 21/854* (2011.01)

(56) References Cited

U.S. PATENT DOCUMENTS

| | | | |
|---|---|---|---|
| 2015/0012956 A1* | 1/2015 | Kim | H04N 21/44209 725/110 |
| 2016/0165210 A1* | 6/2016 | Lee | H04N 21/816 348/43 |
| 2016/0379370 A1* | 12/2016 | Nakazato | G01B 11/24 382/103 |
| 2017/0099513 A1* | 4/2017 | Furbeck | H04N 21/85406 |
| 2017/0156015 A1* | 6/2017 | Stockhammer | H04N 21/8456 |
| 2017/0339415 A1* | 11/2017 | Wang | H04N 21/84 |
| 2018/0035172 A1* | 2/2018 | Lai | H04N 21/816 |
| 2018/0063590 A1* | 3/2018 | Her | H04N 21/8146 |
| 2019/0028744 A1* | 1/2019 | Katsumata | H04N 21/8456 |
| 2019/0191203 A1* | 6/2019 | Asbun | H04N 21/2668 |

OTHER PUBLICATIONS

Ye-Kul Wang et al: "Carriage of AVC based 3D video excluding MVC", MPEG 11 a-Strasbourg, Oct. 24, 2014 (Oct. 24, 2014), pp. 1-126, XP055663853, Retrieved from the Internet: URL:https://mpeg.chiariglione.org/sites/default/files/files/standards/parts/ docs/w14837-v2-w14837.zip [retrieved on Jan. 31, 2020].

European Search Report dated May 8, 2020 in European Application No. 18856632.7.

International Search Report and Written Opinion dated Oct. 16, 2018 for PCT/JP2018/032326 filed on Aug. 31, 2018, 13 pages including English Translation of the International Search Report.

Gao, Z., et al., "OmniViewer: Enabling multi-modal 3D Dash," Proceedings of the 23rd ACM international conference on multimedia, Brisbane, Australia, Oct. 26-30, 2015, 2 pages.

Kapetanakis, K, "Web-3D Real-Time Adaptation Framework Based on MPEG-Dash," 2014, 109 pages.

* cited by examiner

FIG. 4

```
//BASIC BV GROUP
<MPD>
  <Period>         ⬚W11
    <Preselection id="bv_base" preselectionComponents="mesh tex1 tex2 tex3 tex4">
      <SupplementalProperty schemeIdUri="urn:mpeg:dash:birdview:2017"> ⬚A11          ⬚A15
      <SupplementalProperty schemeIdUri="urn:mpeg:dash:bvcoverage:2017" value="0, 0, 0, 0, 0, 0, 360, 120" />
    </Preselection>
    // texture       ⬚W12
    <AdaptationSet id="tex1" mime-type="video/mp4">        ⬚A12
      <SupplementalProperty schemeIdUri="urn:mpeg:dash:texture:2017">                  ⬚A16
      <SupplementalProperty schemeIdUri="urn:mpeg:dash:bvcoverage:2017" value="0, 0, 0, -90, 0, 0, 90, 120" />
      <Representation bandwidth="1280000">
        <BaseURL>texture1_1.mp4</BaseURL>
      </Representation>
      . . .
      <Representation bandwidth="5120000">
        <BaseURL>texture1_4.mp4</BaseURL>
      </Representation>
    </AdaptationSet>
    . . .            ⬚W13
    <AdaptationSet id="tex4" mime-type="video/mp4">        ⬚A13
      <SupplementalProperty schemeIdUri="urn:mpeg:dash:texture:2017">                  ⬚A17
      <SupplementalProperty schemeIdUri="urn:mpeg:dash:bvcoverage:2017" value="0, 0, 0, 180, 0, 0, 90, 120" />
      <Representation bandwidth="5120000">
        <BaseURL>texture4_1.mp4</BaseURL>
      </Representation>
      . . .
      <Representation bandwidth="5120000">
        <BaseURL>texture4_4.mp4</BaseURL>
      </Representation>
    </AdaptationSet>
    // mesh          ⬚W14
    <AdaptationSet id="mesh" mime-type="video/mp4">       ⬚A14
      <EssentialProperty schemeIdUri="urn:mpeg:dash:mesh:2017">                       ⬚A18
      <SupplementalProperty schemeIdUri="urn:mpeg:dash:bvcoverage:2017" value="0, 0, 0, 0, 0, 0, 360, 180" />
      <Representation bandwidth="10240000"><BaseURL>mesh_1.mp4</BaseURL></Representation>
      . . .
      <Representation bandwidth="20480000"><BaseURL>mesh_4.mp4</BaseURL></Representation>
    </AdaptationSet>
  </Period>
</MPD>
```

FIG. 7

| PARAMETER OF VALUE | MEANING |
|---|---|
| x | x-COORDINATE OF CENTER POSITION OF 3D MODEL |
| y | y-COORDINATE OF CENTER POSITION OF 3D MODEL |
| z | z-COORDINATE OF CENTER POSITION OF 3D MODEL |
| center_yaw | YAW ANGLE OF CENTER OF DISPLAYABLE REGION AS VIEWED FROM CENTER POSITION OF 3D MODEL |
| center_pitch | PITCH ANGLE OF CENTER OF DISPLAYABLE REGION AS VIEWED FROM CENTER POSITION OF 3D MODEL |
| center_roll | ROLL ANGLE OF CENTER OF DISPLAYABLE REGION AS VIEWED FROM CENTER POSITION OF 3D MODEL |
| hor_range | HORIZONTAL ANGLE RANGE OF DISPLAYABLE REGION AS VIEWED FROM CENTER POSITION OF 3D MODEL |
| ver_range | VERTICAL ANGLE RANGE OF DISPLAYABLE REGION AS VIEWED FROM CENTER POSITION OF 3D MODEL |

FIG. 8

| PARAMETER OF VALUE | MEANING |
|---|---|
| x | x-COORDINATE OF VIEWPOINT POSITION |
| y | y-COORDINATE OF VIEWPOINT POSITION |
| z | z-COORDINATE OF VIEWPOINT POSITION |
| center_yaw | YAW ANGLE OF CENTER OF DISPLAYABLE REGION IN CASE WHERE 3D MODEL IS VIEWED FROM VIEWPOINT POSITION |
| center_pitch | PITCH ANGLE OF CENTER OF DISPLAYABLE REGION IN CASE WHERE 3D MODEL IS VIEWED FROM VIEWPOINT POSITION |
| center_roll | ROLL ANGLE OF CENTER OF DISPLAYABLE REGION IN CASE WHERE 3D MODEL IS VIEWED FROM VIEWPOINT POSITION |
| hor_range | HHORIZONTAL ANGLE RANGE OF DISPLAYABLE REGION IN CASE WHERE 3D MODEL IS VIEWED FROM VIEWPOINT POSITION |
| ver_range | VERTICAL ANGLE RANGE OF DISPLAYABLE REGION IN CASE WHERE 3D MODEL IS VIEWED FROM VIEWPOINT POSITION |

FIG. 15

```
//BASIC BV GROUP
<MPD>
  <Period>      W21
    <Preselection id="bv_base" preselectionComponents="mesh tex1 tex2 tex3 tex4">
         <SupplementalProperty schemeIdUri="urn:mpeg:dash:birdview:2017">               A23
         <SupplementalProperty schemeIdUri="urn:mpeg:dash:bvcoverage:2017" value="1, 0, 0, 0, 0, 0, 0, 360, 120" />
    </Preselection>
    // texture    W22
    <AdaptationSet id="tex1" mime-type="video/mp4">
       <SupplementalProperty schemeIdUri="urn:mpeg:dash:texture:2017">                  A24
       <SupplementalProperty schemeIdUri="urn:mpeg:dash:bvcoverage:2017" value="1, 0, 0, 0, -135, 0, 0, 90, 120"/>
       <Representation bandwidth="1280000">
          <BaseURL>texture1_1.mp4</BaseURL>
       </Representation>
       ...
       <Representation bandwidth="5120000">
          <BaseURL>texture1_4.mp4</BaseURL>
       </Representation>
    </AdaptationSet>
    ...            W23
    <AdaptationSet id="tex4" mime-type="video/mp4">
       <SupplementalProperty schemeIdUri="urn:mpeg:dash:texture:2017">                  A25
       <SupplementalProperty schemeIdUri="urn:mpeg:dash:bvcoverage:2017" value="1, 0, 0, 0, 135, 0, 0, 90, 120" />
       <Representation bandwidth="5120000">
          <BaseURL>texture4_1.mp4</BaseURL>
       </Representation>
       ...
       <Representation bandwidth="5120000">
          <BaseURL>texture4_4.mp4</BaseURL>
       </Representation>
    </AdaptationSet>
    // mesh       W24
    <AdaptationSet id="mesh" mime-type="video/mp4">
       <EssentialProperty schemeIdUri="urn:mpeg:dash:mesh:2017">                        A26
       <SupplementalProperty schemeIdUri="urn:mpeg:dash:bvcoverage:2017" value="1, 0, 0, 0, 0, 0, 0, 360, 180" />
       <Representation bandwidth="10240000">
          <BaseURL>mesh_1.mp4</BaseURL>
       </Representation>
       ...
       <Representation bandwidth="20480000">
          <BaseURL>mesh_4.mp4</BaseURL>
       </Representation>
    </AdaptationSet>
```

```
                                                              CONTINUED FROM FIG. 15
//texture for enhancement of          W25
  image quality
<AdaptationSet id="hq_tex1" mime-type="video/mp4">
                                                                           A27
  <SupplementalProperty schemeIdUri="urn:mpeg:dash:texture:2017">
  <SupplementalProperty schemeIdUri="urn:mpeg:dash:bvcoverage:2017" value="1, 0, 0, 0, -90, 0, 0, 90, 120" />
  <Representation bandwidth="10240000">
    <BaseURL>hq_texture1.mp4</BaseURL>
  </Representation>
</AdaptationSet>
 . . .                                W26
<AdaptationSet id="hq_tex4" mime-type="video/mp4">
                                                                           A28
  <SupplementalProperty schemeIdUri="urn:mpeg:dash:texture:2017">
  <SupplementalProperty schemeIdUri="urn:mpeg:dash:bvcoverage:2017" value="1, 0, 0, 0, 180, 0, 0, 90, 120" />
  <Representation bandwidth="10240000">
    <BaseURL>hq_texture4.mp4</BaseURL>
  </Representation>
</AdaptationSet>
//depth for enhancement of            W27
  image quality                            A21
<AdaptationSet id="hq_dep1" mime-type="video/mp4">
                                                                           A29
  <EssentialProperty schemeIdUri="urn:mpeg:dash:depth:2017">
  <SupplementalProperty schemeIdUri="urn:mpeg:dash:bvcoverage:2017" value="1, 0, 0, 0, -90, 0, 0, 90, 120" />
  <Representation bandwidth="2560000">
    <BaseURL>hq_depth1.mp4</BaseURL></Representation>
</AdaptationSet>
 . . .                                W28
                                             A22
  <AdaptationSet id="hq_dep4" mime-type="video/mp4">
                                                                           A30
    <EssentialProperty schemeIdUri="urn:mpeg:dash:depth:2017">
    <SupplementalProperty schemeIdUri="urn:mpeg:dash:bvcoverage:2017" value="1, 0, 0, 0, 180, 0, 0, 90, 120" />
    <Representation bandwidth="2560000">
      <BaseURL>hq_depth4.mp4</BaseURL>
    </Representation>
  </AdaptationSet>
</Period>
</MPD>
```

FIG. 17

| PARAMETER OF VALUE | MEANING |
|---|---|
| source_id | ID OF SOURCE OF BV CONTENT. IT IS POSSIBLE TO CONFIGURE BV CONTENT BY COMBINING BV STREAMS HAVING SAME VALUE. |
| x | x-COORDINATE OF CENTER POSITION OF 3D MODEL |
| y | y-COORDINATE OF CENTER POSITION OF 3D MODEL |
| z | z-COORDINATE OF CENTER POSITION OF 3D MODEL |
| center_yaw | YAW ANGLE OF CENTER OF DISPLAYABLE REGION AS VIEWED FROM CENTER POSITION OF 3D MODEL |
| center_pitch | PITCH ANGLE OF CENTER OF DISPLAYABLE REGION AS VIEWED FROM CENTER POSITION OF 3D MODEL |
| center_roll | ROLL ANGLE OF CENTER OF DISPLAYABLE REGION AS VIEWED FROM CENTER POSITION OF 3D MODEL |
| hor_range | HORIZONTAL ANGLE RANGE OF DISPLAYABLE REGION AS VIEWED FROM CENTER POSITION OF 3D MODEL |
| ver_range | VERTICAL ANGLE RANGE OF DISPLAYABLE REGION AS VIEWED FROM CENTER POSITION OF 3D MODEL |

FIG. 18

```
//BASIC BV GROUP
<MPD>
  <Period>          ←W41
    <Preselection id="bv_base" preselectionComponents="mesh tex1 tex2 tex3 tex4">
        <SupplementalProperty schemeIdUri="urn:mpeg:dash:birdview:2017">
        <SupplementalProperty schemeIdUri="urn:mpeg:dash:bvcoverage:2017" value="1, 0, 0, 0, 0, 0, 0, 360, 120" />
    </Preselection>
    // texture      ←W42
    <AdaptationSet id="tex1" mime-type="video/mp4">
      <SupplementalProperty schemeIdUri="urn:mpeg:dash:texture:2017">
      <SupplementalProperty schemeIdUri="urn:mpeg:dash:bvcoverage:2017" value="1, 0, 0, 0, -135, 0, 0, 90, 120" />
      <Representation bandwidth="1280000">
         <BaseURL>texture1_1.mp4</BaseURL>
      </Representation>
      ...
      <Representation bandwidth="5120000">
         <BaseURL>texture1_4.mp4</BaseURL>
      </Representation>
    </AdaptationSet>
    ...             ←W43
    <AdaptationSet id="tex4" mime-type="video/mp4">
      <SupplementalProperty schemeIdUri="urn:mpeg:dash:texture:2017">
      <SupplementalProperty schemeIdUri="urn:mpeg:dash:bvcoverage:2017" value="1, 0, 0, 0, 135, 0, 0, 90, 120" />
      <Representation bandwidth="5120000">
         <BaseURL>texture4_1.mp4</BaseURL>
      </Representation>
      ...
      <Representation bandwidth="5120000">
         <BaseURL>texture4_4.mp4</BaseURL>
      </Representation>
    </AdaptationSet>
    // mesh         ←W44
    <AdaptationSet id="mesh" mime-type="video/mp4">
      <EssentialProperty schemeIdUri="urn:mpeg:dash:mesh:2017">
      <SupplementalProperty schemeIdUri="urn:mpeg:dash:bvcoverage:2017" value="1, 0, 0, 0, 0, 0, 0, 360, 180" />
      <Representation bandwidth="10240000">              ←A41
         <SupplementalProperty schemeIdUri="urn:mpeg:dash:bvqualityranking:2017" value="1, 5, 1" />
         <BaseURL>mesh_1.mp4</BaseURL>
      </Representation>
      ...
      <Representation bandwidth="20480000">
         <BaseURL>mesh_4.mp4</BaseURL>
      </Representation>
    </AdaptationSet>
```

```
                                                            CONTINUED FROM FIG. 18
//texture for enhancement of        W45
  image quality
  <AdaptationSet id="hq_tex1" mime-type="video/mp4">
    <SupplementalProperty schemeIdUri="urn:mpeg:dash:texture:2017">
    <SupplementalProperty schemeIdUri="urn:mpeg:dash:bvcoverage:2017" value="1, 0, 0, 0, -90, 0, 0, 90, 120" />
    <Representation bandwidth="10240000">
      <BaseURL>hq_texture1.mp4</BaseURL>
    </Representation>
  </AdaptationSet>
  ...                               W46
  <AdaptationSet id="hq_tex4" mime-type="video/mp4">
    <SupplementalProperty schemeIdUri="urn:mpeg:dash:texture:2017">
    <SupplementalProperty schemeIdUri="urn:mpeg:dash:bvcoverage:2017" value="1, 0, 0, 0, 180, 0, 0, 90, 120" />
    <Representation bandwidth="10240000">
      <BaseURL>hq_texture4.mp4</BaseURL>
    </Representation>
//depth for enhancement of image quality
  </AdaptationSet>                  W47
  <AdaptationSet id="hq_dep1" mime-type="video/mp4">
    <EssentialProperty schemeIdUri="urn:mpeg:dash:depth:2017">
    <SupplementalProperty schemeIdUri="urn:mpeg:dash:bvcoverage:2017" value="1, 0, 0, 0, -90, 0, 0, 90, 120" />
    <Representation bandwidth="2560000">                                                          A42
      <SupplementalProperty schemeIdUri="urn:mpeg:dash:bvqualityranking:2017" value="1, 3, 0, -90, 0, 0, 90, 120" />
      <BaseURL>hq_depth1.mp4</BaseURL></Representation>
  </AdaptationSet>
  ...                               W48
  <AdaptationSet id="hq_dep4" mime-type="video/mp4">
    <EssentialProperty schemeIdUri="urn:mpeg:dash:depth:2017">
    <SupplementalProperty schemeIdUri="urn:mpeg:dash:bvcoverage:2017" value="1, 0, 0, 0, 180, 0, 0, 90, 120" />
    <Representation bandwidth="2560000">                                                          A43
      <SupplementalProperty schemeIdUri="urn:mpeg:dash:bvqualityranking:2017" value="1, 1, 0, 180, 0, 0, 90, 90" />
      <SupplementalProperty schemeIdUri="urn:mpeg:dash:bvqualityranking:2017" value="1, 5, 1" />
      <BaseURL>hq_depth4.mp4</BaseURL>                                                            A44
    </Representation>
  </AdaptationSet>
</Period>
</MPD>
```

FIG. 20

| PARAMETER OF VALUE | MEANING |
|---|---|
| id | ID OF QUALITY RANKING. QUALITY RANKING IS SIGNALED WITH RELATIVE VALUE IN QUALITY RANKING DESCRIPTORS HAVING SAME ID. |
| quality_ranking | VALUE OF QUALITY RANKING. IN CASE OF 1 OR MORE, INDICATE THAT THE SMALLER THE VALUE IS, THE HIGHER THE QUALITY IS. IN CASE OF 0, RANKING IS UNDEFINED. |
| remaining_area_flag | IN CASE OF 0, REGION INFORMATION THAT INCLUDES "center_yaw", "center_pitch", "center_roll", "hor_range" and "ver_range" AND WHERE THE QUALITY RANKING IS SIGNALED IS SIGNALED. IN CASE OF 1, INDICATE THAT QUALITY RANKING IS RANKING OF REMAINING REGION WHERE QUALITY RANKING IS NOT SIGNALED IN SAME REPRESENTATION. |
| center_yaw | YAW ANGLE OF CENTER OF REGION AS VIEWED FROM CENTER OF 3D MODEL |
| center_pitch | PITCH ANGLE OF CENTER OF REGION AS VIEWED FROM CENTER OF 3D MODEL |
| center_roll | ROLL ANGLE OF CENTER OF REGION AS VIEWED FROM CENTER OF 3D MODEL |
| hor_range | HORIZONTAL ANGLE RANGE OF REGION AS VIEWED FROM CENTER OF 3D MODEL |
| ver_range | VERTICAL ANGLE RANGE OF REGION AS VIEWED FROM CENTER OF 3D MODEL |

FIG. 21

| PARAMETER OF VALUE | MEANING |
|---|---|
| stream_type | INDICATE TYPE OF BV STREAM OF WHICH QUALITY RANKING IS SIGNALED.<br>0: TEXTURE<br>1: DEPTH OR MESH<br>2: BIRDVIEW |

FIG. 24

```
//BASIC BV GROUP
<MPD>       W61
  <Period>
    <Preselection id="bv_base" preselectionComponents="mesh tex1 tex2 tex3 tex4">
        <SupplementalProperty schemeIdUri="urn:mpeg:dash:birdview:2017">
        <SupplementalProperty schemeIdUri="urn:mpeg:dash:bvcoverage:2017" value="1, 0, 0, 0, 0, 0, 0, 360, 120" />
    </Preselection>
    // texture    W62
    <AdaptationSet id="tex1" mime-type="video/mp4">
      <SupplementalProperty schemeIdUri="urn:mpeg:dash:texture:2017">
      <SupplementalProperty schemeIdUri="urn:mpeg:dash:bvcoverage:2017" value="1, 0, 0, 0, -135, 0, 0, 90, 120" />
      <Representation bandwidth="1260000">
        <BaseURL>texture1_1.mp4</BaseURL>
      </Representation>
      ...
      <Representation bandwidth="5120000">
        <BaseURL>texture1_4.mp4</BaseURL>
      </Representation>
    </AdaptationSet>
    ...           W63
    <AdaptationSet id="tex4" mime-type="video/mp4">
      <SupplementalProperty schemeIdUri="urn:mpeg:dash:texture:2017">
      <SupplementalProperty schemeIdUri="urn:mpeg:dash:bvcoverage:2017" value="1, 0, 0, 0, 135, 0, 0, 90, 120" />
      <Representation bandwidth="5120000">
        <BaseURL>texture4_1.mp4</BaseURL>
      </Representation>
      ...
      <Representation bandwidth="5120000">
        <BaseURL>texture4_4.mp4</BaseURL>
      </Representation>
    </AdaptationSet>
    // mesh       W64
    <AdaptationSet id="mesh" mime-type="video/mp4">
      <EssentialProperty schemeIdUri="urn:mpeg:dash:mesh:2017">
      <SupplementalProperty schemeIdUri="urn:mpeg:dash:bvcoverage:2017" value="1, 0, 0, 0, 0, 0, 0, 360, 180" />
      <Representation bandwidth="10240000">
        <BaseURL>mesh_1.mp4</BaseURL>
      </Representation>
      ...
      <Representation bandwidth="20480000">
        <BaseURL>mesh_4.mp4</BaseURL>
      </Representation>
    </AdaptationSet>
```

CONTINUED FROM FIG. 24

```
//texture/depth for enhancement                    W65
  of image quality
<AdaptationSet id="hq_tex1" mime-type="video/mp4">
   <SupplementalProperty schemeIdUri="urn:mpeg:dash:texture:2017">
   <SupplementalProperty schemeIdUri="urn:mpeg:dash:bvcoverage:2017" value="1, 0, 0, 0, -90, 0, 0, 90, 120" />
   <Representation bandwidth="10240000">
      <BaseURL>hq_texture1.mp4</BaseURL>
   </Representation>
</AdaptationSet>
...                                                W66
<AdaptationSet id="hq_tex4" mime-type="video/mp4">
   <SupplementalProperty schemeIdUri="urn:mpeg:dash:texture:2017">
   <SupplementalProperty schemeIdUri="urn:mpeg:dash:bvcoverage:2017" value="1, 0, 0, 0, 180, 0, 0, 90, 120" />
   <Representation bandwidth="10240000">
      <BaseURL>hq_texture4.mp4</BaseURL>
   </Representation>
</AdaptationSet>                                   W67
<AdaptationSet id="hq_dep1" mime-type="video/mp4">
   <EssentialProperty schemeIdUri="urn:mpeg:dash:depth:2017">
   <SupplementalProperty schemeIdUri="urn:mpeg:dash:bvcoverage:2017" value="1, 0, 0, 0, -90, 0, 0, 90, 120" />
   <Representation id="hq_dep1_1" bandwidth="2560000">   ← A63
      <BaseURL>hq_depth1.mp4</BaseURL></Representation>
</AdaptationSet>
...                                                W68
<AdaptationSet id="hq_dep4" mime-type="video/mp4">
   <EssentialProperty schemeIdUri="urn:mpeg:dash:depth:2017">
   <SupplementalProperty schemeIdUri="urn:mpeg:dash:bvcoverage:2017" value="1, 0, 0, 0, 180, 0, 0, 90, 120" />
   <Representation id="hq_dep4_1" bandwidth="2560000">   ← A64
      <BaseURL>hq_depth4.mp4</BaseURL>
   </Representation>
</AdaptationSet>
//silhouette                                       W69
<AdaptationSet id="sil1" mime-type="video/mp4">           A61
   <EssentialProperty schemeIdUri="urn:mpeg:dash:silhouette:2017">    A65
   <Representation associationId="hq_dep1_1" associationType="silh" bandwidth="2560000">
      <BaseURL>silhouette1.mp4</BaseURL>
   </Representation>
</AdaptationSet>
...                                                W70
<AdaptationSet id="sil4" mime-type="video/mp4">           A62
   <EssentialProperty schemeIdUri="urn:mpeg:dash:silhouette:2017">    A66
   <Representation associationId="hq_dep4_1" associationType="silh" bandwidth="2560000">
      <BaseURL>silhouette4.mp4</BaseURL>
   </Representation>
</AdaptationSet>
</Period>
</MPD>
```

FIG. 28

```
//BASIC BV GROUP
<MPD>
  <Period>
    //BASIC BV GROUP          /W91
    <Preselection id="bv_base" preselectionComponents="dep1 dep2 dep3 dep4 tex1 tex2 tex3 tex4">
        <SupplementalProperty schemeIdUri="urn:mpeg:dash:birdview:2017">
        <SupplementalProperty schemeIdUri="urn:mpeg:dash:bvcoverage:2017" value="1, 0, 0, 0, 0, 0, 0, 360, 120" />
    </Preselection>
    // texture                 /W92
    <AdaptationSet id="tex1" mime-type="video/mp4">
        <SupplementalProperty schemeIdUri="urn:mpeg:dash:texture:2017">
        <SupplementalProperty schemeIdUri="urn:mpeg:dash:bvcoverage:2017" value="1, 0, 0, 0, -90, 0, 0, 90, 120" />
        <Representation bandwidth="1280000">
            <BaseURL>texture1-1.mp4</BaseURL>
        </Representation>
        ...
        <Representation bandwidth="5120000">
            <BaseURL>texture1-4.mp4</BaseURL>
        </Representation>
    </AdaptationSet>
    ...                        /W93
    <AdaptationSet id="tex4" mime-type="video/mp4">
        <SupplementalProperty schemeIdUri="urn:mpeg:dash:texture:2017">
        <SupplementalProperty schemeIdUri="urn:mpeg:dash:bvcoverage:2017" value="1, 0, 0, 0, 180, 0, 0, 90, 120" />
        <Representation bandwidth="1280000">
            <BaseURL>texture4-1.mp4</BaseURL>
        </Representation>
        ...
        <Representation bandwidth="5120000">
            <BaseURL>texture4-4.mp4</BaseURL>
        </Representation>
    </AdaptationSet>
```

```
                                                          CONTINUED FROM FIG. 28
// depth                       W94
  <AdaptationSet id="dep1" mime-type="video/mp4">     A81
    <EssentialProperty schemeIdUri="urn:mpeg:dash:depth:2017">    A82
    <SupplementalProperty schemeIdUri="urn:mpeg:dash:bvcoverage:2017" value="1, 0, 0, 0, -90, 0, 0, 90, 120" />
    <Representation bandwidth="320000">
        <BaseURL>depth1-1.mp4</BaseURL>
    </Representation>
    ...
    <Representation bandwidth="2560000">
        <BaseURL>depth1-4.mp4</BaseURL>
    </Representation>
  </AdaptationSet>
  ...                          W95
  <AdaptationSet id="dep4" mime-type="video/mp4">
    <EssentialProperty schemeIdUri="urn:mpeg:dash:depth:2017">
    <SupplementalProperty schemeIdUri="urn:mpeg:dash:bvcoverage:2017" value="1, 0, 0, 0, 180, 0, 0, 90, 120" />
    <Representation bandwidth="320000">
        <BaseURL>depth4-1.mp4</BaseURL>
    </Representation>
    ...
    <Representation bandwidth="2560000">
        <BaseURL>depth4-4.mp4</BaseURL>
    </Representation>
  </AdaptationSet>
 </Period>
</MPD>
```

FIG. 32

```
//BASIC BV GROUP
<MPD>
   <Period>                 W111
   //BASIC BV GROUP
      <Preselection id="bv_base" preselectionComponents="dep1 dep2 dep3 dep4 tex1 tex2 tex3 tex4">           A101
         <SupplementalProperty schemeIdUri="urn:mpeg:dash:birdview:2017">
         <SupplementalProperty schemeIdUri="urn:mpeg:dash:bvcoverage:2017" value="1, 0, 0, 0, 0, 0, 0, 360, 120" />
      </Preselection>        W112
   // texture
   <AdaptationSet id="tex1" mime-type="video/mp4">                                                          A102
      <SupplementalProperty schemeIdUri="urn:mpeg:dash:texture:2017">
      <SupplementalProperty schemeIdUri="urn:mpeg:dash:bvcoverage:2017" value="1, 0, 0, 0, -90, 0, 0, 90, 120" />
      <Representation bandwidth="1280000">
         <BaseURL>texture1-1.mp4</BaseURL>
      </Representation>
      ...
      <Representation bandwidth="5120000">
         <BaseURL>texture1-4.mp4</BaseURL>
      </Representation>
   </AdaptationSet>            W113
   ...
   <AdaptationSet id="tex4" mime-type="video/mp4">                                                          A103
      <SupplementalProperty schemeIdUri="urn:mpeg:dash:texture:2017">
      <SupplementalProperty schemeIdUri="urn:mpeg:dash:bvcoverage:2017" value="1, 0, 0, 0, 180, 0, 0, 90, 120" />
      <Representation bandwidth="1280000">
         <BaseURL>texture4-1.mp4</BaseURL>
      </Representation>
      ...
      <Representation bandwidth="5120000">
         <BaseURL>texture4-4.mp4</BaseURL>
      </Representation>
   </AdaptationSet>            W114
   // depth
   <AdaptationSet id="dep1" mime-type="video/mp4">                                                          A104
      <EssentialProperty schemeIdUri="urn:mpeg:dash:depth:2017">
      <SupplementalProperty schemeIdUri="urn:mpeg:dash:bvcoverage:2017" value="1, 0, 0, 0, -90, 0, 0, 90, 120" />
      <Representation bandwidth="320000">
         <BaseURL>depth1-1.mp4</BaseURL>
      </Representation>
      ...
      <Representation bandwidth="2560000">
         <BaseURL>depth1-4.mp4</BaseURL>
      </Representation>
   </AdaptationSet>            W115
   ...
   <AdaptationSet id="dep4" mime-type="video/mp4">                                                          A105
      <EssentialProperty schemeIdUri="urn:mpeg:dash:depth:2017">
      <SupplementalProperty schemeIdUri="urn:mpeg:dash:bvcoverage:2017" value="1, 0, 0, 0, 180, 0, 0, 90, 120" />
      <Representation bandwidth="320000">
         <BaseURL>depth4-1.mp4</BaseURL>
      </Representation>
      ...
      <Representation bandwidth="2560000">
         <BaseURL>depth4-4.mp4</BaseURL>
      </Representation>
   </AdaptationSet>
```

```
                                                              CONTINUED FROM FIG. 32
//texture for enhancement of        W116
  image quality
<AdaptationSet id="hq_tex1" mime-type="video/mp4">
    <SupplementalProperty schemeIdUri="urn:mpeg:dash:texture:2017">              A106
    <SupplementalProperty schemeIdUri="urn:mpeg:dash:bvcoverage:2017" value="1, 0, 0, 0, -135, 0, 0, 90, 120"/>
    ...
</AdaptationSet>
...                                 W117
<AdaptationSet id="hq_tex4" mime-type="video/mp4">
    <SupplementalProperty schemeIdUri="urn:mpeg:dash:texture:2017">              A107
    <SupplementalProperty schemeIdUri="urn:mpeg:dash:bvcoverage:2017" value="1, 0, 0, 0, 135, 0, 0, 90, 120"/>
    ...
</AdaptationSet>
//depth for enhancement of          W118
  image quality
<AdaptationSet id="hq_dep1" mime-type="video/mp4">
    <SupplementalProperty schemeIdUri="urn:mpeg:dash:depth:2017">                A108
    <SupplementalProperty schemeIdUri="urn:mpeg:dash:bvcoverage:2017" value="1, 0, 0, 0, 135, 0, 0, 90, 120"/>
    ...
</AdaptationSet>
...                                 W119
<AdaptationSet id="hq_dep4" mime-type="video/mp4">
    <SupplementalProperty schemeIdUri="urn:mpeg:dash:depth:2017">                A109
    <SupplementalProperty schemeIdUri="urn:mpeg:dash:bvcoverage:2017" value="1, 0, 0, 0, 135, 0, 0, 90, 120"/>
    ...
</AdaptationSet>
</Period>
</MPD>
```

FIG. 35

```
aligned(8) class TrackGroupTypeBox(unsigned int(32) track_group_type) extends FullBox(track_group_type, version = 0, flags = 0)
{
    unsigned int(32) track_group_id;
    // the remaining data may be specified for a particular track_group_type
}
```
Q81

| FIELD | MEANING |
|---|---|
| track_group_id | ID OF TRACK GROUP. MEAN THAT TRACKS HAVING SAME track_group_type AND SAME track_group_id BELONG TO SAME TRACK GROUP. |

```
aligned(8) class BirdviewGroupBox extends TrackGroupTypeBox('bvgp')
{
    // optional box
}
```
Q91

FIG. 37

```
aligned(8) class BirdviewCoverageInformationBox extends FullBox('bvci',version=0,0)
{
    signed int(32) pos_x;
    signed int(32) pos_y;
    signed int(32) pos_z;
    signed int(32) center_yaw;
    signed int(32) center_pitch;
    signed int(32) center_roll;
    unsigned int(32) hor_range;
    unsigned int(32) ver_range;
}
```
← Q101

| FIELD | MEANING |
|---|---|
| pos_x | x-COORDINATE OF CENTER POSITION OF 3D MODEL |
| pos_y | y-COORDINATE OF CENTER POSITION OF 3D MODEL |
| pos_z | z-COORDINATE OF CENTER POSITION OF 3D MODEL |
| center_yaw | YAW ANGLE OF CENTER OF DISPLAYABLE REGION AS VIEWED FROM CENTER POSITION OF 3D MODEL |
| center_pitch | PITCH ANGLE OF CENTER OF DISPLAYABLE REGION AS VIEWED FROM CENTER POSITION OF 3D MODEL |
| center_roll | ROLL ANGLE OF CENTER OF DISPLAYABLE REGION AS VIEWED FROM CENTER POSITION OF 3D MODEL |
| hor_range | HORIZONTAL ANGLE RANGE OF DISPLAYABLE REGION AS VIEWED FROM CENTER POSITION OF 3D MODEL |
| ver_range | VERTICAL ANGLE RANGE OF DISPLAYABLE REGION AS VIEWED FROM CENTER POSITION OF 3D MODEL |

```
aligned(8) class BirdviewInformationBox extends FullBox('bvif', version=0, 0)
{
    unsigned int(8) stream_num;
    unsigned int(2) streams_type;
    bit(6)          reserved=0;
    for (i=0 ; i<stream_num;  i++) {
        unsigned int(16) stream_left[i];
        unsigned int(16) stream_top[i];
        unsigned int(16) stream_width[i];
        unsigned int(16) stream_height[i];
        if (streams_type==0)
            unsigned int(8) stream_type[i];
        IntrinsicCameraParameters(i);
        ExtrinsicCameraParametersBox(i);
    }
}
```

FIG. 41

| FIELD | MEANING |
|---|---|
| stream_num | TOTAL NUMBER OF TEXTURES AND DEPTHS INCLUDED IN TRACK |
| streams_type | IMAGE CONFIGURATION INFORMATION IN TRACK<br>0: BOTH TEXTURES AND DEPTHS EXIST<br>1: ONLY TEXTURES EXIST<br>2: ONLY DEPTHS EXIST<br>3: RESERVED |
| stream_left[i] | HORIZONTAL POSITION OF UPPER LEFT PIXEL OF EACH OF IMAGE REGIONS PACKED IN IMAGE IN TRACK |
| stream_top[i] | VERTICAL POSITION OF UPPER LEFT PIXEL OF EACH OF IMAGE REGIONS PACKED IN IMAGE IN TRACK |
| stream_width[i] | WIDTH OF EACH OF IMAGE REGIONS PACKED IN IMAGE IN TRACK |
| stream_height[i] | HEIGHT OF EACH OF IMAGE REGIONS PACKED IN IMAGE IN TRACK |
| stream_type[i] | TYPE OF EACH OF IMAGE REGIONS PACKED IN IMAGE IN TRACK<br>0: IMAGE REGION IS TEXTURE<br>1: IMAGE REGION IS DEPTH<br>OTHERS: RESERVED |
| IntrinsicCameraParameters(i) | INTRINSIC CAMERA PARAMETER SUCH AS FOCAL LENGTH AND PRINCIPAL POINT INFORMATION (FOR EXAMPLE, INFORMATION OF MULTIVIEW ACQUISITION INFORMATION SEI) |
| ExtrinsicCameraParametersBox(i) | EXTRINSIC CAMERA PARAMETER SUCH AS ROTATION AND POSITIONAL INFORMATION OF CAMERA (FOR EXAMPLE, INFORMATION OF MULTIVIEW ACQUISITION INFORMATION SEI) |

FIG. 43

```
aligned(8) class BirdviewQualityRankingBox extends FullBox('bvqr', version=0, 0)
{
    unsigned int(8)    num_regions;
    unsigned int(1)    remaining_area_flag;
    unsigned int(2)    stream_type;
    bit(5)             reserved=0;
    for(i=0; i<num_regions; i++) {
        unsigned int(8) quality_ranking;
        if((i<(num_regions-1)) || (remaining_area_flag==0)) {
            signed int(32)    center_yaw;
            signed int(32)    center_pitch;
            signed int(32)    center_roll;
            unsigned int(32)  hor_range;
            unsigned int(32)  ver_range;
        }
    }
}
```

FIG. 44

| FIELD | MEANING |
|---|---|
| num_regions | NUMBER OF REGIONS OF WHICH QUALITY RANKING IS SIGNALED |
| remaining_area_flag | IN CASE OF 0, REGION OF WHICH QUALITY RANKING IS SIGNALED IS SIGNALED BY center_yaw, center_pitch, center_roll hor_range, AND ver_range.<br>IN CASE OF 1, LAST REGION IS ENTIRE REMAINING PORTION NOT INCLUDED IN REGIONS SIGNALED BY center_yaw TO ver_range. |
| stream_type | IMAGE INFORMATION OF REGION OF WHICH QUALITY RANKING IS SIGNALED<br>0: TEXTURE<br>1: DEPTH<br>2: BIRDVIEW<br>3: RESERVED |
| center_yaw | YAW ANGLE OF CENTER OF REGION OF WHICH QUALITY RANKING IS SIGNALED AS VIEWED FROM CENTER POSITION OF 3D MODEL |
| center_pitch | PITCH ANGLE OF CENTER OF REGION OF WHICH QUALITY RANKING IS SIGNALED AS VIEWED FROM CENTER POSITION OF 3D MODEL |
| center_roll | ROLL ANGLE OF CENTER OF REGION OF WHICH QUALITY RANKING IS SIGNALED AS VIEWED FROM CENTER POSITION OF 3D MODEL |
| hor_range | HORIZONTAL ANGLE RANGE OF REGION OF WHICH QUALITY RANKING IS SIGNALED AS VIEWED FROM CENTER POSITION OF 3D MODEL |
| ver_range | VERTICAL ANGLE RANGE OF REGION OF WHICH QUALITY RANKING IS SIGNALED AS VIEWED FROM CENTER POSITION OF 3D MODEL |

FIG. 45

| FIELD | MEANING |
|---|---|
| stream_num | TOTAL NUMBER OF TEXTURES, DEPTHS, AND SILHOUETTES INCLUDED IN TRACK |
| streams_type | IMAGE CONFIGURATION INFORMATION IN TRACK<br>0: TEXTURES, DEPTHS, DEPTHS INCLUDING SILHOUETTE INFORMATION, SILHOUETTES ARE MIXED<br>1: ONLY TEXTURES EXIST<br>2: ONLY DEPTHS EXIST<br>3: ONLY DEPTHS INCLUDING SILHOUETTE INFORMATION EXIST<br>4: ONLY SILHOUETTES EXIST<br>OTHERS: RESERVED |
| stream_left[i] | HORIZONTAL POSITION OF UPPER LEFT PIXEL OF EACH OF IMAGE REGIONS PACKED IN IMAGE IN TRACK |
| stream_top[i] | VERTICAL POSITION OF UPPER LEFT PIXEL OF EACH OF IMAGE REGIONS PACKED IN IMAGE IN TRACK |
| stream_width[i] | WIDTH OF EACH OF IMAGE REGIONS PACKED IN IMAGE IN TRACK |
| stream_height[i] | HEIGHT OF EACH OF IMAGE REGIONS PACKED IN IMAGE IN TRACK |
| stream_type[i] | TYPE OF EACH OF IMAGE REGIONS PACKED IN IMAGE IN TRACK<br>0: IMAGE REGION IS TEXTURE<br>1: IMAGE REGION IS DEPTH<br>2: IMAGE REGION IS DEPTH INCLUDING SILHOUETTE INFORMATION<br>3: IMAGE REGION IS SILHOUETTE<br>OTHERS: RESERVED |
| IntrinsicCameraParameters(i) | INTRINSIC CAMERA PARAMETER SUCH AS FOCAL LENGTH AND PRINCIPAL POINT INFORMATION (FOR EXAMPLE INFORMATION OF MULTIVIEW ACQUISITION INFORMATION SEI) |
| ExtrinsicCameraParametersBox(i) | EXTRINSIC CAMERA PARAMETER SUCH AS ROTATION AND POSITIONAL INFORMATION OF CAMERA (FOR EXAMPLE INFORMATION OF MULTIVIEW ACQUISITION INFORMATION SEI) |

FIG. 51

```
aligned(8) class RegionWisePackingBox extends FullBox('rwpk', 0, 0) {
    RegionWisePackingStruct();
}
```

FIG. 52

```
aligned(8) class RegionWisePackingStruct {
    unsigned int(8) num_regions;
    unsigned int(16) proj_picture_width;
    unsigned int(16) proj_picture_height;
    for (i = 0; i < num_regions; i++) {
        bit(4) reserved = 0;
        unsigned int(4) packing_type[i];
        if (packing_type[i] == 0)
            RectRegionPacking(i);
    }
}
```

FIG. 53

```
aligned(8) class RectRegionPacking(i) {
    unsigned int(8) content_type;
    if(content_type==1) {
        unsigned int(8) stream_type;
        IntrinsicCameraParameters(i);
        ExtrinsicCameraParametersBox(i);
    }
    unsigned int(16) proj_reg_width[i];
    unsigned int(16) proj_reg_height[i];
    unsigned int(16) proj_reg_top[i];
    unsigned int(16) proj_reg_left[i];
    unsigned int(16) packed_reg_width[i];
    unsigned int(16) packed_reg_height[i];
    unsigned int(16) packed_reg_top[i];
    unsigned int(16) packed_reg_left[i];
}
```

FIG. 54

| FIELD | MEANING |
|---|---|
| num_regions | NUMBER OF REGIONS |
| proj_picture_width | WIDTH OF PROJECTED PICTURE |
| proj_picture_height | HEIGHT OF PROJECTED PICTURE |
| packing_type[i] | TYPE OF REGION-WISE PACKING OF i-TH REGION. 0 INDICATES PACKING OF RECTANGULAR REGION. OTHERS ARE RESERVED. |
| content_type | TYPE OF CONTENT<br>0: OMNIDIRECTIONAL IMAGE<br>1: BIRDVIEW IMAGE |
| stream_type | IMAGE TYPE FOR EACH REGION<br>0: IMAGE IS TEXTURE<br>1: IMAGE IS DEPTH<br>2: IMAGE IS DEPTH INCLUDING SILHOUETTE INFORMATION<br>3: IMAGE IS SILHOUETTE<br>OTHERS: RESERVED |
| IntrinsicCameraParameters(i) | INTRINSIC CAMERA PARAMETER SUCH AS FOCAL LENGTH AND PRINCIPAL POINT INFORMATION (FOR EXAMPLE, INFORMATION OF MULTIVIEW ACQUISITION INFORMATION SEI) |
| ExtrinsicCameraParametersBox(i) | EXTRINSIC CAMERA PARAMETER SUCH AS ROTATION AND POSITIONAL INFORMATION OF CAMERA (FOR EXAMPLE, INFORMATION OF MULTIVIEW ACQUISITION INFORMATION SEI) |
| proj_reg_width[i] | WIDTH OF i-TH REGION ON PROJECTED PICTURE |
| proj_reg_height[i] | HEIGHT OF i-TH REGION ON PROJECTED PICTURE |
| proj_reg_top[i] | VERTICAL POSITION OF UPPER LEFT PIXEL OF i-TH REGION ON PROJECTED PICTURE |
| proj_reg_left[i] | HORIZONTAL POSITION OF UPPER LEFT PIXEL OF i-TH REGION ON PROJECTED PICTURE |
| packed_reg_width[i] | WIDTH OF i-TH REGION ON PACKED PICTURE |
| packed_reg_height[i] | HEIGHT OF i-TH REGION ON PACKED PICTURE |
| packed_reg_top[i] | VERTICAL POSITION OF UPPER LEFT PIXEL OF i-TH REGION ON PACKED PICTURE |
| packed_reg_left[i] | HORIZONTAL POSITION OF UPPER LEFT PIXEL OF i-TH REGION ON PACKED PICTURE |

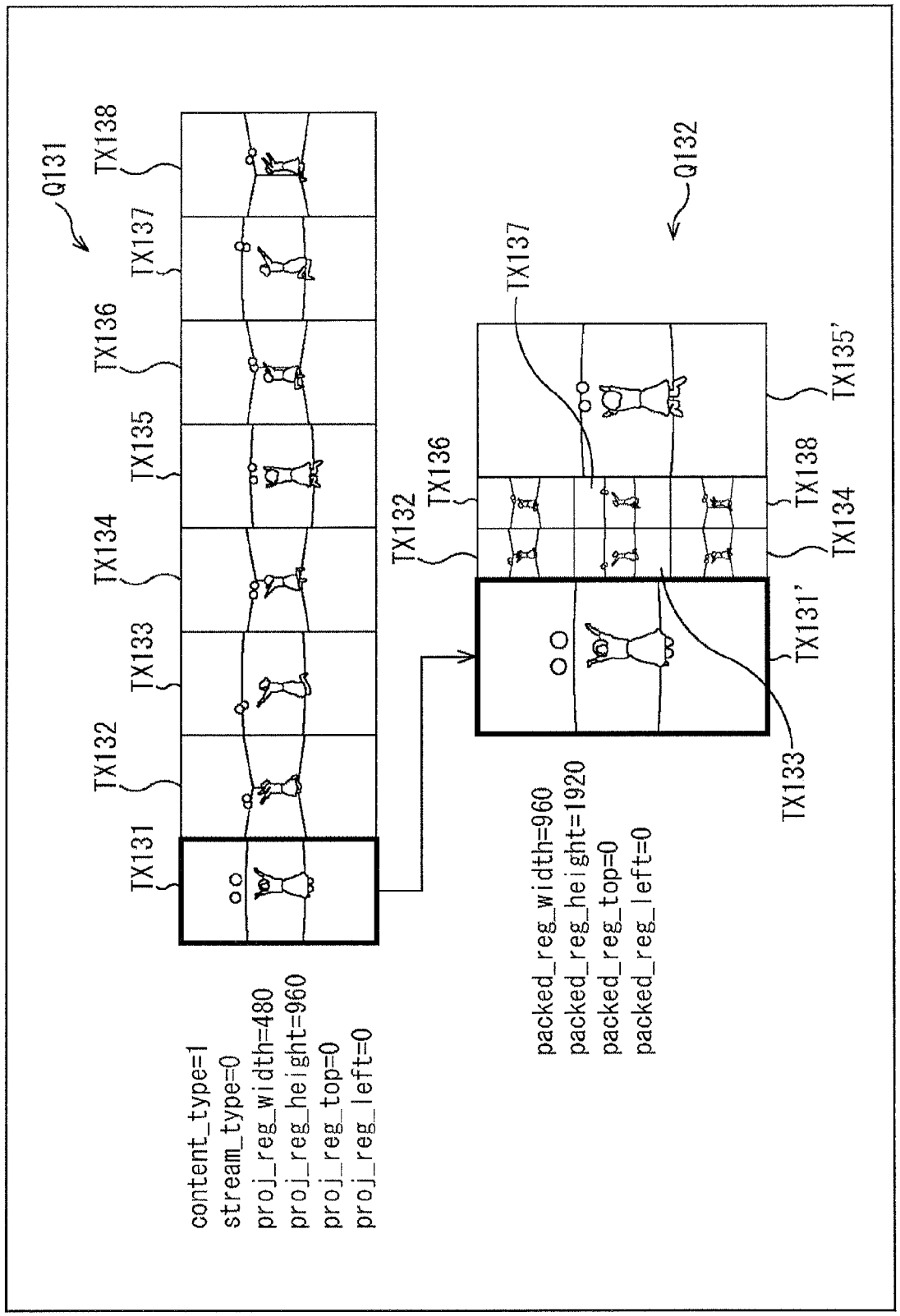

IMAGE PROCESSING APPARATUS AND FILE GENERATION APPARATUS

CROSS-REFERENCE TO RELATED APPLICATIONS

The present application is based on PCT filing PCT/JP2018/032326, filed Aug. 31, 2018, which claims priority to JP 2017-177381, filed Sep. 15, 2017, the entire contents of each are incorporated herein by reference.

TECHNICAL FIELD

The present technology relates to an image processing apparatus and a file generation apparatus, and specifically relates to an image processing apparatus and a file generation apparatus that make it possible to reproduce a 3D object content.

BACKGROUND ART

A content called a birdview content (hereinafter referred to as a BV (Birdview) content) has been known.

The BV content is a 3D model generated by Volumetric Capturing, which is technology for capturing space three-dimensionally. Look-around viewing of this 3D model is possible with use of a head-mounted display, for example.

Such a BV content includes a plurality of BV streams, and the BV streams are encoded by a combination of three types of information, that is, a texture (texture), a mesh (mesh), and a depth (depth).

Herein, both the mesh and the depth are data for creating a 3D shape, and a 3D model is configured by adding the texture to the 3D shape. Specifically, it is possible to configure a 3D model with use of the texture and the depth, or with use of the texture and the mesh. Further, it is possible to configure a 3D model even with use of the texture, the mesh and the depth.

Incidentally, in a case where the BV content is viewed, a viewing experience enabling smoothly looking around the 3D model is of utmost importance.

In order to achieve such a viewing experience by MPEG-DASH (Moving Picture Experts Group-Dynamic Adaptive Streaming over HTTP) distribution, it is necessary to select all a plurality of BV streams included in the BV content and acquire all the plurality of BV streams in advance (for example, refer to NPTL 1). In addition, it is also important to adaptively acquire BV streams in accordance with a transmission band and a viewing direction of the BV content and effectively utilize bands.

CITATION LIST

Non-Patent Literature

NPTL 1: ISO/IEC 23009-1 Information technology-Dynamic adaptive streaming over HTTP(DASH)—Part1: Media presentation description and segment formats, April2012

SUMMARY OF THE INVENTION

Problems to be Solved by the Invention

However, in a case where a plurality of BV streams included in a BV content is individually selected and acquired in accordance with a transmission band or a viewing direction (a viewpoint position), there is a plurality of combinations of BV streams to be acquired. Accordingly, a client has not been allowed to know an appropriate combination necessary to appropriately reproduce a BV content from a plurality of BV streams acquired by the client, which has not made it possible to reproduce the BV content. Further, the client has not been allowed to know the appropriate combination of BV streams, which has not made it possible to selectively acquire an appropriate combination of BV streams according to circumstances.

For example, in ISO/IEC 14496-15 or ISO/IEC 14496-14 that has already been standardized, a method of storing a texture, a mesh and a depth in a file format has been defined; however, it is difficult to select and acquire appropriate BV streams in streaming distribution by ISO/IEC 23009-1 (MPEG-DASH).

As described above, in a case where the BV content is to be reproduced, it has been difficult to select an appropriate combination of BV streams. In other words, it has not been possible to appropriately reproduce the BV content.

The present technology has been devised in view of such circumstances, and makes it possible to appropriately reproduce a BV content.

Means for Solving the Problem

An image processing apparatus according to a first aspect of the present technology includes a file processor that selects, from a plurality of streams included in a 3D object content, a plurality of the streams to be used for reproduction of the 3D object content on the basis of group information for selection of the stream appropriate for reproduction of the 3D object content, a file including the group information.

In the first aspect of the present technology, a plurality of the streams to be used for reproduction of the 3D object content is selected from a plurality of streams included in the 3D object content on the basis of the group information in the file including the group information for selection of the stream appropriate for reproduction of the 3D object content.

A file generation apparatus according to a second aspect of the present technology includes a file generator that generates a file including group information for selection, from a plurality of streams included in a 3D object content, of the stream appropriate for reproduction of the 3D object content.

In the second aspect of the present technology, the file is generated. The file includes the group information for selection, from a plurality of streams included in the 3D object content, of the stream appropriate for reproduction of the 3D object content.

Effect of the Invention

According to the first aspect and the second aspect of the present technology, it is possible to appropriately reproduce a BV content.

It is to be noted that the effects described here are not necessarily limited, and any effect described in the present disclosure may be exhibited.

BRIEF DESCRIPTION OF DRAWING

FIG. 4 is a diagram illustrating an example of an MPD file.

FIG. 7 is a diagram illustrating semantics of displayable region information.

FIG. 8 is a diagram illustrating semantics of displayable region information.

FIG. 15 is a diagram illustrating an example of an MPD file.

FIG. 16 is a diagram illustrating the example of the MPD file.

FIG. 17 is a diagram illustrating semantics of a birdview coverage descriptor.

FIG. 18 is a diagram illustrating an example of an MPD file.

FIG. 19 is a diagram illustrating the example of the MPD file.

FIG. 20 is a diagram illustrating semantics of a quality ranking descriptor.

FIG. 21 is a diagram illustrating semantics of stream_type.

FIG. 24 is a diagram illustrating an example of an MPD file.

FIG. 25 is a diagram illustrating the example of the MPD file.

FIG. 28 is a diagram for describing an example of an MPD file.

FIG. 29 is a diagram for describing the example of the MPD file.

FIG. 32 is a diagram illustrating an example of an MPD file.

FIG. 33 is a diagram illustrating the example of the MPD file.

FIG. 35 is a diagram illustrating a syntax and semantics of a Track Group Type Box.

FIG. 36 is a diagram illustrating a syntax example of a Birdview Group Box.

FIG. 37 is a diagram illustrating examples of a syntax and semantics of a Birdview Coverage Information Box.

FIG. 40 is a diagram illustrating a syntax example of a Birdview Information Box.

FIG. 41 is a diagram illustrating a semantics example of the Birdview Information Box.

FIG. 43 is a diagram illustrating a syntax example of a Birdview Quality Ranking Box.

FIG. 44 is a diagram illustrating a semantics example of the Birdview Quality Ranking Box.

FIG. 45 is a diagram illustrating a semantics example of the Birdview Information Box.

FIG. 51 is a diagram illustrating an example of RegionWisePackingBox.

FIG. 52 is a diagram illustrating an example of RegionWisePackingStruct.

FIG. 53 is a diagram illustrating an example of RectRegionPacking(i).

FIG. 54 is a diagram illustrating semantics examples of RegionWisePackingStruct and RectRegionPacking(i).

FIG. 55 is a diagram illustrating a signaling example of RegionWisePackingBox.

MODES FOR CARRYING OUT THE INVENTION

Hereinafter, embodiments to which the present technology is applied are described with reference to the drawings.

First Embodiment

<About Present Technology>

The present technology makes it possible to appropriately reproduce a BV content by grouping BV streams necessary to configure the BV content and thereby informing a client of an appropriate combination of BV streams for reproduction of the BV content.

In particular, the present technology is applicable to BV content reproduction with use of MPEG-DASH, BV content reproduction with a file in ISOBMFF (ISO Base Media File Format), and the like.

For example, in the present technology, in a case where a BV content is distributed with use of MPEG-DASH, it is possible to group Adaptation Sets referring to BV streams included in the BV content by extending an MPD (Media Presentation Description) file. Accordingly, even in the case where the BV content is distributed with use of MPEG-DASH, a client knows an appropriate combination of BV streams for reproduction of the BV content on the basis of the MPD file, thereby making it possible to appropriately reproduce the BV content.

Moreover, in the present technology, in the case where the BV content is distributed with use of MPEG-DASH, it is possible to enhance image quality of the BV content in accordance with a transmission band, a field of view of a user, or the like by definition of new metadata in an MPD file, that is, a descriptor to be described later, or the like.

Further, for example, in the present technology, in a case where the BV streams included in the BV content are stored in tracks in ISOBMFF, it is possible to group the tracks included in the BV content by extending ISOBMFF. Accordingly, even in a case where the BV content is reproduced with a file in ISOBMFF, it is possible to appropriately reproduce the BV content.

In addition, in the present technology, in a case where BV streams are stored in the tracks in ISOBMFF, it is possible to store a plurality of BV streams in one track.

Hereinafter, the present technology is described in more detail. First, in a first embodiment, a case where the present technology is applied to BV content distribution with use of MPEG-DASH is described as an example.

As described above, a BV content is a 3D model that is generated by Volumetric Capturing, which is technology for capturing space three-dimensionally and allows for look-around viewing. In other words, the BV content is a content that allows a predetermined 3D object, that is, a 3D model of an object to be viewed from surroundings of the 3D model.

Figure 1:
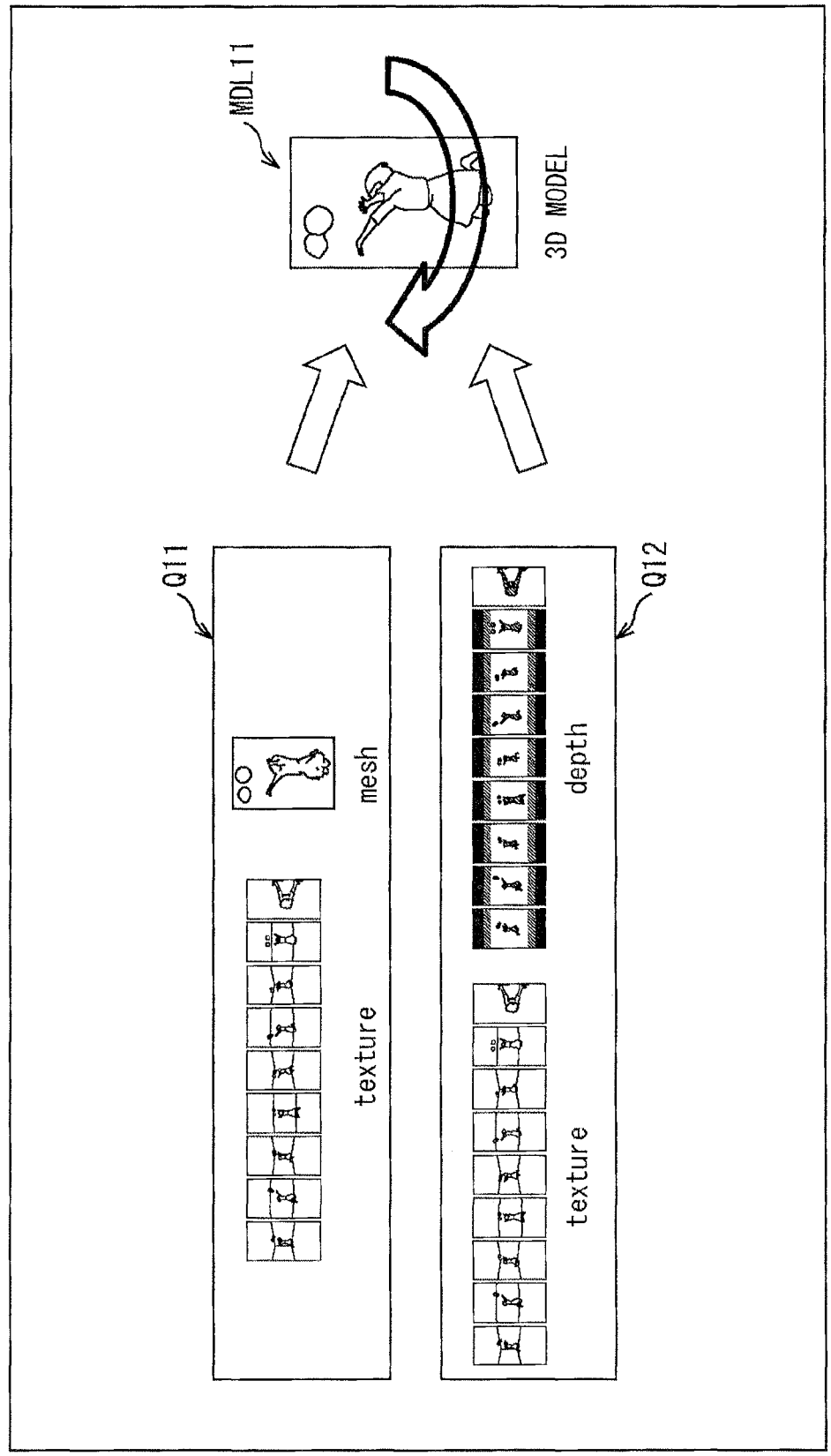
FIG. 1 is a diagram for describing a BV content.

In such a BV content, for example, the 3D model includes a texture, a mesh, a depth, and the like, as illustrated in FIG. 1.

In an example illustrated in FIG. 1, it is possible to configure a 3D model MDL11 with use of a plurality of textures at different viewpoint positions and a mesh, as indicated by an arrow Q11. The mesh indicates a shape of the 3D model.

Similarly, it is possible to configure the 3D model MDL11 with use of a plurality of textures at different viewpoint positions and a plurality of depths at different viewpoint positions, as indicated by an arrow Q12. The depths indicate the shape of the 3D model.

Herein, the texture (texture information) is, for example, image information (a texture image) of a color image including, as subjects, a subject corresponding to an 3D model serving as a foreground in a case where a predetermined position in space is set as a viewpoint position and a subject serving as a background. That is, it can be said that the texture is color information indicating colors of respective portions of the 3D model. In the BV content, for example, a texture at one viewpoint position is one BV stream.

The mesh is, for example, shape information (mesh information) such as a polygon mesh that represents a shape of a 3D model (object) by connection of vertices. Several points on the 3D model are set as the vertices. In the BV content, one mesh is one BV stream.

Further, the depth is, for example, a depth image (depth information) called a depth map indicating a distance from a viewpoint position to the subject corresponding to the 3D model serving as the foreground or the subject serving as the background in a case where a predetermined position in space is set as the viewpoint position. This depth is also shape information representing the shape of the 3D model. In the BV content, for example, a depth at one viewpoint position is one BV stream.

As described above, using the texture, and the mesh or the depth makes it possible to configure the 3D model MDL11. That is, it is possible to construct a 3D shape of the 3D model MDL11 with the mesh or the depth; therefore, adding color information to each region of the 3D shape with the texture makes it possible to acquire the color 3D model MDL11.

It is to be noted that it is also possible to configure (construct) the 3D model MDL11 with use of the texture, the mesh, and the depth.

In the BV content, once the 3D model MDL11 is configured, a user who is a viewer is allowed to look around the 3D model MDL11 with use of, for example, a head-mounted display while changing his or her viewpoint position.

In a case where the BV content is viewed, a viewing experience enabling smoothly looking around the 3D model is of utmost importance. In order to achieve such a viewing experience by MPEG-DASH distribution, for example, it is necessary for a client to acquire, in advance, all appropriate combinations of BV streams for configuring the BV content.

In the present technology, in order to inform a client of appropriate combinations of BV streams for reproduction of the BV content, thereby allowing the client to select, acquire, and process appropriate BV streams, BV streams included in the BV content are grouped.

Hereinafter, grouped BV streams, that is, a group of BV streams including a plurality of BV streams is also referred to as a BV group.

Herein, the BV group includes at least a BV stream necessary for reproduction of the BV content. In other words, if a combination of BV streams included in the BV group is used, at least reproduction of the BV content is possible.

A plurality of BV streams is combined into one BV group, which makes it possible for the client to reproduce the BV content if the client acquires at least the BV streams included in the BV group. This makes it possible for the client to easily select and acquire BV stream necessary for smooth look-around viewing.

It is to be noted that in the present technology, the 3D model of the BV content generated by Volumetric Capturing is encoded as a texture, a mesh, a depth, and a silhouette. That is, types of BV streams include at least a texture, a mesh, a depth and a silhouette. Herein, the silhouette (silhouette information) is a silhouette image indicating a region of a subject (an object) serving as a 3D model in a depth image.

In addition, hereinafter, a case where the depth or the silhouette is image information is described as an example, but it is sufficient if the depth or the silhouette is information indicating a shape of the 3D model or the region of the 3D model, and is not necessarily image information. Further, in the following, in order to make the type of BV stream clear, the BV stream is also referred to as a BV stream of a texture, a BV stream of a depth, or the like.

<About Signaling of BV Group>

Next, description is given of signaling of the BV group as described above.

Herein, a case where one BV group includes a texture and a mesh is described as a specific example.

An advantage and a disadvantage in the case where one BV group includes a texture and a mesh are as follows.

(Advantage 1);

The mesh has a low decoder processing load on a client side, as compared with a depth.

(Disadvantage 1)

A BV stream of the mesh has a large total size necessary for creation of the 3D shape, as compared with a BV stream of the depth.

Figure 2:
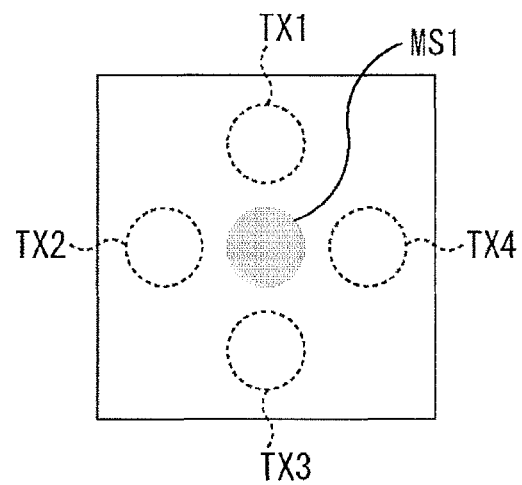
FIG. 2 is a diagram for describing an example of a BV group.

In addition, FIG. 2 illustrates an example of a BV group including textures and a mesh.

In an example in FIG. 2, a mesh MS1 of the 3D model is located at a position of a 3D model (an object) in space, and four textures TX1 to TX4 are located at viewpoint positions that are shifted by 90 degrees to surround the 3D model.

Then, one BV group includes the mesh MS1 and the textures TX1 to TX4. It is possible to configure the BV content with the BV streams included in the BV group.

It is to be noted that it is possible to enhance image quality of each of the textures and the mesh in accordance with a bandwidth of a transmission path or the like. That is, acquiring a texture or mesh having a higher bit rate in accordance with the bandwidth by bit rate adaptation makes it possible to reproduce a BV content having higher quality even with the same texture or mesh.

In addition, it is also possible to enhance image quality of only a texture corresponding to a field of view of a user who views the BV content. For example, it is possible to set a texture necessary to display a region in the field of view of the user in the 3D model to a texture having a higher bit rate and set a texture necessary to display a region outside the field of view of the user in the 3D model to a texture having a lower bit rate. Doing so makes it possible to present a high-quality BV content at least for a field of view of a current user even in a case where the bandwidth is not so wide.

In a case where the BV content is distributed with use of MPEG-DASH, it is sufficient if an MPD file is used for signaling of the BV group as described above. The MPD file is a media presentation management file for management of the BV content.

Figure 3:
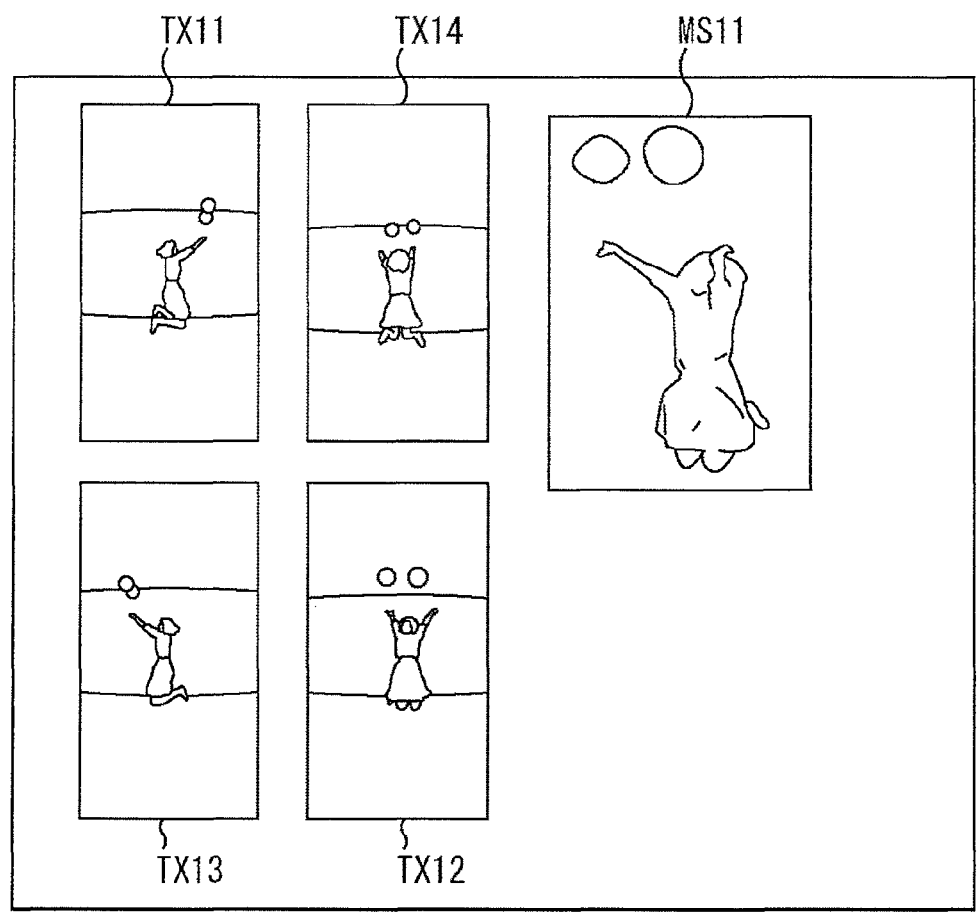
FIG. 3 is a diagram for describing an example of a BV group.

For example, it is assumed that one BV group includes the mesh MS11 and four textures TX11 to TX14, as illustrated in FIG. 3. In such a case, it is sufficient if information relating to the BV group is signaled with an MPD file illustrated in FIG. 4.

It is to be noted that, herein, it is assumed that each of the textures and the mesh is individually stored as a single track file. That is, it is assumed that information relating to one texture or mesh is described in one Adaptation Set.

In the MPD file illustrated in FIG. 4, a portion indicated by an arrow W11 is a Preselection, and information relating to one group including one or a plurality of Adaptation Sets is described in this Preselection. That is, the Preselection is a region in which information for each BV content (each BV group) is stored.

Each of a portion indicated by an arrow W12, a portion indicated by an arrow W13, and a portion indicated by an arrow W14 is one Adaptation Set, and information relating to one texture or mesh is described in the Adaptation Set. That is, herein, the Adaptation Set is a region in which information relating to a BV stream is stored.

In addition, in this example, an essential property (EssentialProperty) or a supplemental property (SupplementalProperty) with "schemeIdUri="urn:mpeg:dash:birdview:2017"" is newly defined as a birdview descriptor (birdview descriptor).

This birdview descriptor is information indicating that the Preselection or the Adaptation Set including the birdview descriptor is a Preselection or an Adaptation Set relating to a BV content.

In other words, it can be said that the birdview descriptor is information indicating that the information stored in the Preselection or the Adaptation Set is information relating to the BV content, that is, a content indicated by the Preselection or the Adaptation Set is the BV content.

For example, the Preselection indicated by the arrow W11 has a SupplementalProperty with "schemeIdUri="urn:mpeg:dash:birdview:2017"" as a birdview descriptor as indicated by an arrow A11. This makes it possible for the client to figure out that the Preselection indicated by the arrow W11 is a Preselection relating to the BV content.

It is to be noted that, hereinafter, a client receiving content distribution by MPEG-DASH is also specifically referred to as a DASH client.

In addition, an EssentialProperty or a SupplementalProperty with "schemeIdUri="urn:mpeg:dash:texture:2017"" is newly defined as a texture descriptor (texture descriptor). The texture descriptor is information indicating that the Preselection or the Adaptation Set is a Preselection or an Adaptation Set relating to a texture.

For example, a portion indicated by an arrow A12 in the Adaptation Set indicated by the arrow W12 or a portion indicated by an arrow A13 in the Adaptation Set indicated by the arrow W13 has a SupplementalProperty with "schemeIdUri="urn:mpeg:dash:texture:2017"" as a texture descriptor. This makes it possible for the client to figure out that the Adaptation Set indicated by the arrow W12 or the Adaptation Set indicated by the arrow W13 is an Adaptation Set relating to a texture included in the BV content.

Further, an EssentialProperty or a SupplementalProperty with "schemeIdUri="urn:mpeg:dash:mesh:2017"" is newly defined as a mesh descriptor (mesh descriptor). The mesh descriptor is information indicating that the Preselection or the Adaptation Set is a Preselection or an Adaptation Set relating to a mesh.

For example, a portion indicated by an arrow A14 in the Adaptation Set indicated by the arrow W14 has an EssentialProperty with "schemeIdUri="urn:mpeg:dash:mesh:2017"" as a mesh descriptor. This makes it possible for the client to figure out that the Adaptation Set indicated by the arrow W14 is an Adaptation Set relating to a mesh included in the BV content.

Hereinafter, in a case where it is not specifically necessary to distinguish the birdview descriptor, the texture descriptor, the mesh descriptor, and the like from each other, each of these descriptors is simply referred to as a descriptor. In addition, hereinafter, in a case where it is not specifically necessary to distinguish the EssentialProperty and the SupplementalProperty from each other, each of the EssentialProperty and the SupplementalProperty is simply referred to as a Property.

Referring to the descriptor makes it possible for the client to identify the type of content or BV stream to which the Preselection or the Adaptation Set refers.

In particular, it can be said that the texture descriptor and the mesh descriptor is information indicating the type of BV stream corresponding to the Adaptation Set.

Each of the descriptors such as the birdview descriptor, the texture descriptor, and mesh descriptor may be signaled in a Representation and a SubRepresentation. That is, the descriptor may be described in the Representation or the SubRepresentation.

It is to be noted that the DASH client not supporting schemeIdUri of the EssentialProperty has to ignore a Preselection, an Adaptation Set, a Representation or the like in which the Property is written.

That is, in a case where the descriptor such as the above-described birdview descriptor is described in the EssentialProperty, the DASH client not supporting the descriptor has to ignore a Preselection, an Adaptation Set, or the like including the EssentialProperty in which such a descriptor is described.

In contrast, the DASH client not supporting schemeIdUri of the SupplementalProperty may use the Preselection, the Adaptation Set, the Representation, or the like while ignoring a value of the Property. That is, it is possible for even the DASH client not supporting the above-described descriptor to use a Preselection, an Adaptation Set, or the like including the SupplementalProperty in which such a descriptor is described while ignoring the SupplementalProperty in which such a descriptor is described.

Further, in the MPD file illustrated in FIG. 4, a Preselection element defined by MPEG-DASH is used for grouping in the BV group.

Herein, grouping is performed by describing ids of the Adaptation Sets included in the BV group in a preselectionComponents attribute of a Preselection element indicated by the arrow W11.

That is, in this example, a preselectionComponents portion of the Preselection indicated by the arrow W11 has "preselectionComponents="mesh tex1 tex2 tex3 tex4"".

Herein, "mesh", "tex1", "tex2", "tex3", and "tex4" in the preselectionComponents portion are ids of the Adaptation Sets relating to BV streams included in one BV group.

Accordingly, it can be seen that one BV group includes an Adaptation Set with an id of mesh, an Adaptation Set with an id of tex1, an Adaptation Set with an id of tex2, an Adaptation Se with an id of tex3, and an Adaptation Set with an id of tex4. More specifically, one BV group includes BV streams corresponding to these Adaptation Sets.

In this example, five Adaptation Sets including the Adaptation Set indicated by the arrow W12, the Adaptation Set indicated by the arrow W13, and the Adaptation Set indicated by the arrow W14 are Adaptation Sets of the BV streams included in one BV group.

For example, the Adaptation Set with the id of mesh indicated by the arrow W14 is an Adaptation Set in which information relating to the BV stream of the mesh MS11 illustrated in FIG. 3 is described.

In addition, the Adaptation Set with the id of tex1 indicated by the arrow W12 is an Adaptation Set in which information relating to the BV stream of the texture TX11 in FIG. 3 is described.

Similarly, each of the Adaptation Sets with ids of tex2 to tex4 is an Adaptation Set in which information relating to a corresponding one of the BV streams of the textures TX12 to TX14 in FIG. 3 is described.

Thus, the Preselection of the MPD file includes the ids of the Adaptation Sets that indicate the Adaptation Sets including information relating to the textures and the mesh included in one BV group corresponding to the Preselection.

The Preselection is group information indicating BV streams belonging to a BV group, that is, a plurality of BV streams for configuring the same 3D model.

Accordingly, in the example in FIG. 4, referring to the Preselection makes it possible for the DASH client to specify that one BV group includes one mesh MS11 and four textures TX11 to TX14 as illustrated in FIG. 3.

In addition, referring to the Preselection and the ids of the respective Adaptation Sets makes it possible for the DASH client to specify the Adaptation Set in which information relating to the mesh MS11, the texture TX11, or the like included in the BV group is described.

As described above, in a case where the client acquires the BV content, the client refers to the preselectionComponents attribute of the Preselection element having the Property with "schemeIdUri="urn:mpeg:dash:birdview:2017"", which makes it possible to easily select and acquire the Adaptation Sets necessary for displaying (reproduction) of the BV content.

In addition, image quality of each of the Adaptation Sets of the textures and the mesh is changeable in accordance with the bandwidth of the transmission path. For example, in a case where the bandwidth has a margin, acquiring a BV stream of a texture or a mesh having higher image quality makes it possible to enhance image quality of the BV content.

That is, the Adaptation Set includes a plurality of Representations. Information relating to each of BV streams relating to the same texture or the same mesh having a plurality of different bit rates, that is, a plurality of different image qualities is described in each of the plurality of Representations.

Accordingly, the client selects one Representation from the plurality of Representations included in one Adaptation Set in accordance with the bandwidth of the transmission path or the like, and acquires a BV stream corresponding to the selected Representation, which makes it possible to acquire a BV stream having any desired image quality.

Further, in the example illustrated in FIG. 4, the EssentialProperty or the SupplementalProperty with schemeIdUri "schemeIdUri="urn:mpeg:dash:bvcoverage:2017"" is newly defined as a birdview coverage descriptor (birdview coverage descriptor).

This birdview coverage descriptor is information described in the Preselection or the Adaptation Set, that is, displayable region information indicating a displayable region of the BV content, the texture, the mesh, or the like. In FIG. 4, each SupplementalProperty indicated by each of arrows A15 to A18 is a birdview coverage descriptor.

For example, in the birdview coverage descriptor, the displayable region is signaled as a spherical region as viewed from a center of the 3D model.

Figure 5:
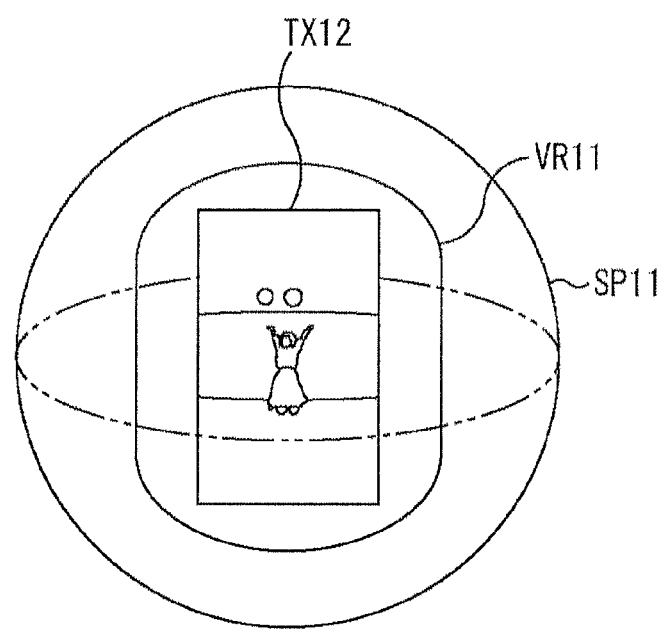
FIG. 5 is a diagram for describing a displayable region.

Herein, FIG. 5 illustrates an example of a displayable region of one texture, for example. It is to be noted that, in FIG. 5, portions corresponding to those in FIG. 3 are denoted by the same reference numerals, and description thereof is omitted as appropriate.

In the example illustrated in FIG. 5, a region on a surface of a sphere SP11 with a center position of the 3D model as a center is a spherical region. Herein, the center position of the sphere SP11 is referred to as a center O.

Now, it is assumed that the texture TX12 of the 3D model is located in space. A position where the texture TX12 is located is, for example, a position where a subject corresponding to the 3D model on the texture TX12 and the actual 3D model located at the center O overlap each other as viewed from a viewpoint position of the texture TX12.

At this time, a region having, as a boundary, a line including a point where a straight line passing through the center O and an end portion of the texture TX12 intersect with the sphere SP11 is a displayable region VR11 of the texture TX12. Accordingly, a straight line passing through the center O and a position of any end portion of the texture TX12 always passes through an end portion of the displayable region VR11.

Such a displayable region VR11 is a region obtained by projecting the texture TX12 located in space onto the spherical region of the sphere SP11, and is a region where an image of the subject is displayable by the texture TX12.

Figure 6:
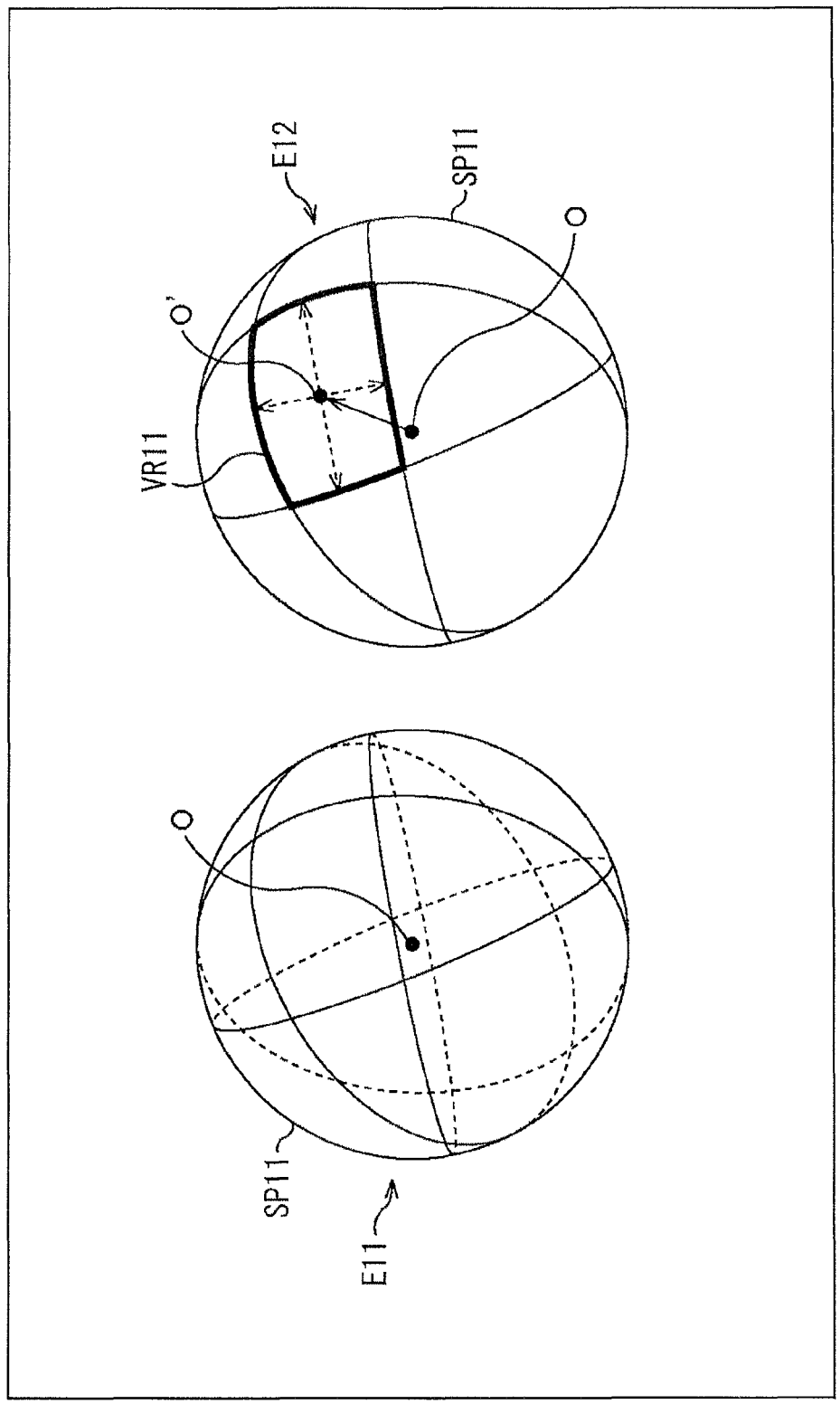
FIG. 6 is a diagram for describing the displayable region.

The displayable region in the spherical region as described above is, for example, a region surrounded by the center O of the sphere SP11 and four circles on the sphere SP11 each having a center coincident with the center O, as indicated by an arrow E11 in FIG. 6. It is to be noted that, in FIG. 6, portions corresponding to those in FIG. 5 are denoted by the same reference numerals, and description thereof is omitted as appropriate.

The displayable region VR11 illustrated in FIG. 5 is illustrated in a portion indicated by an arrow E12 in FIG. 6. Herein, the center O is the center position of the 3D model, and a center O' is a center position of the displayable region VR11.

Returning to description of FIG. 4, a value of the Property as the birdview coverage descriptor includes coordinate information or angular information indicating the displayable region such as the BV content, the texture, or the mesh corresponding to the Preselection or the Adaptation Set including the Property.

Herein, for example, respective parameters illustrated in FIG. 7 are described in the value of the Property as the birdview coverage descriptor. That is, semantics of displayable region information are as illustrated in FIG. 7.

Specifically, a parameter "x" indicates an x-coordinate of the center position of the 3D model in space. It is to be noted that, herein, the center position of the 3D model is represented by coordinates of a three-dimensional orthogonal coordinate system including the x-coordinate, a y-coordinate, and a z-coordinate.

A parameter "y" indicates the y coordinate of the center position of the 3D model in space, and a parameter "z" indicates the z coordinate of the center position of the 3D model in space.

The center position of the 3D model determined by these parameters x, y, and z is the position of the center O illustrated in FIG. 6. In a case where a plurality of BV contents exist, the coordinates of the center position of the 3D model are useful in determining a positional relationship of these BV contents.

A parameter "center_yaw" indicates a yaw angle (yaw angle) indicating the center position of a displayable region as viewed from the center position of the 3D model. A parameter "center_pitch" indicates a pitch angle (pitch angle) indicating the center position of the displayable region as viewed from the center position of the 3D model, and a parameter "center_roll" indicates a roll angle (roll angle) of the center position of the displayable region as viewed from the center position of the 3D model.

The yaw angle, the pitch angle, and the roll angle determine the center position of the displayable region in the spherical region and a direction (a rotation angle) of the displayable region.

That is, for example, the position of the center O' illustrated in FIG. 6 is determined by the yaw angle and the pitch angle, and a rotation angle of the displayable region VR11 illustrated in FIG. 6 is determined by the roll angle. The rotation angle herein is a rotation angle in a case where the displayable region VR11 is rotated about a straight line, as a rotation axis, connecting the center O and the center O' in FIG. 6.

Further, a parameter "hor_range" indicates a horizontal angle range of the displayable region as viewed from the center position of the 3D model, and a parameter "ver_range" indicates a vertical angle range of the displayable region as viewed from the center position of the 3D model.

Accordingly, a width in a horizontal direction and a width (height) in a vertical direction of the displayable region in the spherical region are determined by these parameters hor_range and ver_range. For example, in the example in FIG. 6, a dotted horizontal arrow drawn in FIG. 6 represents a width in the horizontal direction of the displayable region VR11 determined by hor_range, and a dotted vertical arrow drawn in FIG. 6 represents a width in the vertical direction of the displayable region VR11 determined by ver_range.

In the value of the Property as the birdview coverage descriptor, the above-described parameters x, y, z, center_yaw, center_pitch, center_roll, hor_range, and ver_range are described in a comma-separated manner as information indicating the displayable region. That is, "value=" x, y, z, center_yaw, center_pitch, center_roll, hor_range, ver_range"" is described.

For example, in the example in FIG. 4, the SupplementalProperty indicated by the arrow A15 that is signaled in the Preselection element is the birdview coverage descriptor, and a value portion thereof has "0, 0, 0, 0, 0, 0, 0, 360, 120".

The value portion "0, 0, 0, 0, 0, 0, 0, 360, 120" is information indicating the displayable region that is a region where the BV content itself is displayable.

Herein, it can be seen from "0, 0, 0, 0, 0, 0, 0, 360, 120" that the coordinates of the center position of the 3D model of the BV content are (0, 0, 0), and the center position and the direction of the displayable region are a position and a direction determined by the yaw angle of "0 degrees", the pitch angle of "0 degrees", and the roll angle of "0 degrees". Further, it can be seen that a range of the displayable region of the 3D model is a range of 360 degrees in the horizontal direction and 120 degrees in the vertical direction in the spherical region.

In this case, the displayable region of the BV content does not cover the entire spherical region, that is, all horizontal and vertical directions (an entire circumference). However, even in such a case, the client may perform implementation-dependent complementary processing on a portion where the texture is insufficient, that is, a portion with no texture outside the displayable region, and may display a BV content that allows for 360-degree look-around viewing from the entire circumference.

Further, for example, in the SupplementalProperty indicated by the arrow A16 in FIG. 4, a value portion has "0, 0, 0, −90, 0, 90, 120". It can be seen from this that a range of a displayable region of a texture corresponding to the SupplementalProperty is a range of 90 degrees in the horizontal direction and 120 degrees in the vertical direction with a position, as a center, determined by the yaw angle of "−90 degrees" and the pitch angle of "0 degrees" as viewed from the coordinates (0, 0, 0) of the center position of the 3D model. It can also be seen that the rotation angle of the displayable region is 0 degrees.

Thus, signaling the birdview coverage descriptor makes it possible for the client side to figure out the displayable regions of the BV content itself and the BV stream.

This makes it possible for the client to select an appropriate BV content from a plurality of BV contents having different displayable regions, or select only a texture covering the field of view of the user from a plurality of textures in accordance with the viewpoint position of the user, for example.

In addition, signaling the birdview coverage descriptor makes it possible for the client side to select, from textures to be acquired, only a texture having higher image quality and covering a region corresponding to the field of view of the user, for example. This makes it possible to enhance image quality of a BV content adaptive to the field of view of the user.

It is to be noted that, herein, although an example in which the respective parameters indicating the displayable region are described in the value portion of the Property in a comma-separated manner has been described, the respective parameters may be signaled with individual attribute values. In this case, the respective parameters are not described in the value, but x=0, y=0, or the like is described in one element.

In addition, in the example illustrated in FIG. 7, a case where the displayable region is represented by the respective parameters as viewed from the center position of the 3D model has been described. However, the displayable region may be represented by the respective parameters as viewed from outside of the 3D model, and these parameters may be signaled. In such a case, for example, semantics of displayable region information are as illustrated in FIG. 8.

Specifically, the parameter "x" indicates an x-coordinate of a viewpoint position serving as a reference of the user in space. Herein, the viewpoint position serving as the reference of the user is a predetermined position.

The parameter "y" indicates a y-coordinate of the viewpoint position serving as the reference of the user in space, and the parameter "z" indicates a z-coordinate of the viewpoint position serving as the reference of the user in space.

The parameter "center_yaw" indicates a yaw angle (yaw angle) indicating the center position of the displayable region in a case where the 3D model is viewed from the viewpoint position serving as the reference of the user. The parameter "center_pitch" indicates a pitch angle (pitch angle) indicating the center position of the displayable region in the case where the 3D model is viewed from the viewpoint position serving as the reference of the user, and the parameter "center_roll" indicates a roll angle (roll angle) of the center position of the displayable region, that is, a rotation angle of the displayable region in the case where the 3D model is viewed from the viewpoint position serving as the reference of the user.

Further, the parameter "hor_range" indicates a horizontal angle range of the displayable region in the case where the 3D model is viewed from the viewpoint position serving as the reference of the user, and the parameter "ver_range" indicates a vertical angle range of the displayable region in the case where the 3D model is viewed from the viewpoint position serving as the reference of the user.

<Configuration Example of File Generation Apparatus>

Next, description is given of the MPD file described above and a file generation apparatus that generates a segment file corresponding to the MPD file.

Figure 9:
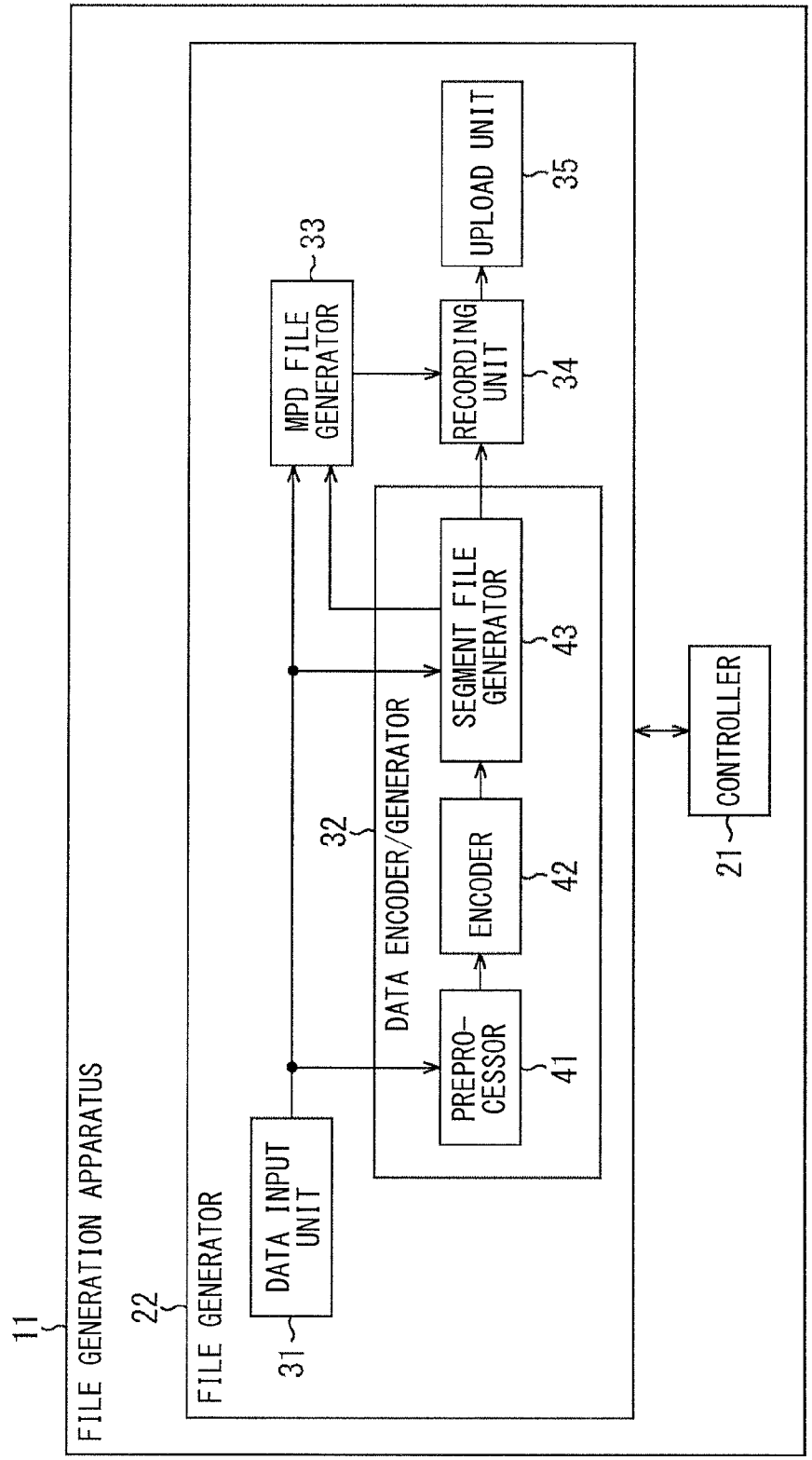
FIG. 9 is a diagram illustrating a configuration example of a file generation apparatus.

The file generation apparatus that generates the MPD file and the segment file is configured, for example, as illustrated in FIG. 9.

A file generation apparatus 11 illustrated in FIG. 9 includes a controller 21 and a file generator 22. The file generation apparatus 11 generates a segment file of a BV stream of a BV content and an MPD file distributed by MPEG-DASH or the like, and uploads the segment file and the MPD file to a server.

The controller 21 controls an entire operation of the file generation apparatus 11. For example, the controller 21 controls the file generator 22 to generate a segment file in which a BV stream is stored, an MPD file including metadata of a BV content and upload the segment file and the MPD file.

The file generator 22 generates the segment file and the MPD file in accordance with control of the controller 21, and uploads (transmits) the segment file and the MPD file to the server via a network.

The file generator 22 includes a data input unit 31, a data encoder/generator 32, an MPD file generator 33, a recording unit 34, and an upload unit 35.

The data input unit 31 acquires data such as an image necessary for generation of a texture and a mesh, and metadata, such as displayable region information, necessary for generation of the MPD file, and supplies the data and the metadata to the data encoder/generator 32 and the MPD file generator 33.

The data encoder/generator 32 generates BV streams of a texture and a mesh on the basis of the data such as an image supplied from the data input unit 31, and generates a segment file in which the BV streams are stored, and then supplies the segment file to the recording unit 34.

The data encoder/generator 32 includes a preprocessor 41, an encoder 42, and a segment file generator 43.

The preprocessor 41 generates the BV streams of the texture and the mesh on the basis of the data such as an image supplied from the data input unit 31, and supplies the BV streams to the encoder 42. The encoder 42 encodes the BV streams supplied from the preprocessor 41, and supplies thus-acquired encoded data to the segment file generator 43.

The segment file generator 43 files the encoded data supplied from the encoder 42 in units of segments on the basis of the metadata or the like supplied from the data input unit 31, and supplies a resultant segment file to the recording unit 34.

The MPD file generator 33 generates an MPD file including the BV content and information relating to the BV streams of the texture and the mesh included in the BV content on the basis of the metadata or the like supplied from the data input unit 31, and supplies the MPD file to the recording unit 34. It is to be noted that the MPD file generator 33 may acquire metadata or the like necessary for generation of the MPD file from the segment file generator 43.

The recording unit 34 records the MPD file supplied from the MPD file generator 33 and the segment file supplied from the segment file generator 43.

The upload unit 35 reads the MPD file of the BV content and the segment file from the recording unit 34 and uploads the MPD file and the segment file to the server. That is, the upload unit 35 functions as a communication unit that transmits the MPD file and the segment file to the server.

It is to be noted that, although an example in which the file generation apparatus 11 functions as an apparatus that uploads the MPD file and the segment file to the server is described herein, the file generation apparatus 11 may function as a server. In such a case, the upload unit 35 of the file generation apparatus 11 transmits the MPD file and the segment file to a client apparatus via a network.

<Description of Upload Processing>

Next, description is given of an operation of the file generation apparatus 11. That is, upload processing by the file generation apparatus 11 is described below with reference to a flowchart in FIG. 10.

In step S11, the data input unit 31 acquires data, such as an image, necessary for generation of BV streams, and metadata, such as displayable region information, necessary for generation of an MPD file, and supplies the data and the metadata to the data encoder/generator 32 and the MPD file generator 33.

In step S12, the data encoder/generator 32 generates a segment file.

That is, the preprocessor 41 generates BV streams of a texture and a mesh on the basis of the data such as an image supplied from the data input unit 31, and supplies the BV streams to the encoder 42. The encoder 42 encodes the BV streams supplied from the preprocessor 41, and supplies thus-acquired encoded data to the segment file generator 43.

The segment file generator 43 files the encoded data supplied from the encoder 42 on the basis of the metadata or the like supplied from the data input unit 31, and supplies a resultant segment file to the recording unit 34.

In step S13, the MPD file generator 33 generates an MPD file on the basis of the metadata or the like supplied from the data input unit 31, and supplies the MPD file to the recording unit 34.

The MPD file herein includes a birdview descriptor, a texture descriptor, mesh descriptor, an id of an Adaptation Set relating to a BV stream included in a BV group, a birdview coverage descriptor, and the like. Specifically, for example, the MPD file illustrated in FIG. 4 is generated.

In step S14, the recording unit 34 records the MPD file supplied from the MPD file generator 33 and the segment file supplied from the segment file generator 43.

In step S15, the upload unit 35 reads the MPD file and the segment file from the recording unit 34 and uploads the MPD file and the segment file to the server at any desired timing, and the upload processing ends.

The MPD file and the segment file may be uploaded at any timing after the MPD file and the segment file are recorded in the recording unit 34.

As described above, the file generation apparatus 11 generates and uploads the MPD file and the segment file.

In particular, the file generation apparatus 11 generates an MPD file in which the ids of the Adaptation Sets included in the BV group are included in a Preselection.

This makes it possible for a client supplied with the MPD file to easily specify the Adaptation Sets of the BV streams included in the BV group. That is, it is possible to easily specify a combination of BV streams necessary for reproduction of the BV content.

As a result, even in a case where the BV content is distributed with use of MPEG-DASH, it is possible for the client to acquire the BV streams necessary for reproduction of the BV content and appropriately reproduce the BV content.

<Configuration Example of Client Apparatus>

Next, description is given of a client apparatus that acquires the MPD file and the segment file uploaded by the file generation apparatus 11 from the server and reproduces the BV content. The client apparatus to which the present technology is applied is configured, for example, as illustrated in FIG. 11.

Figure 11:
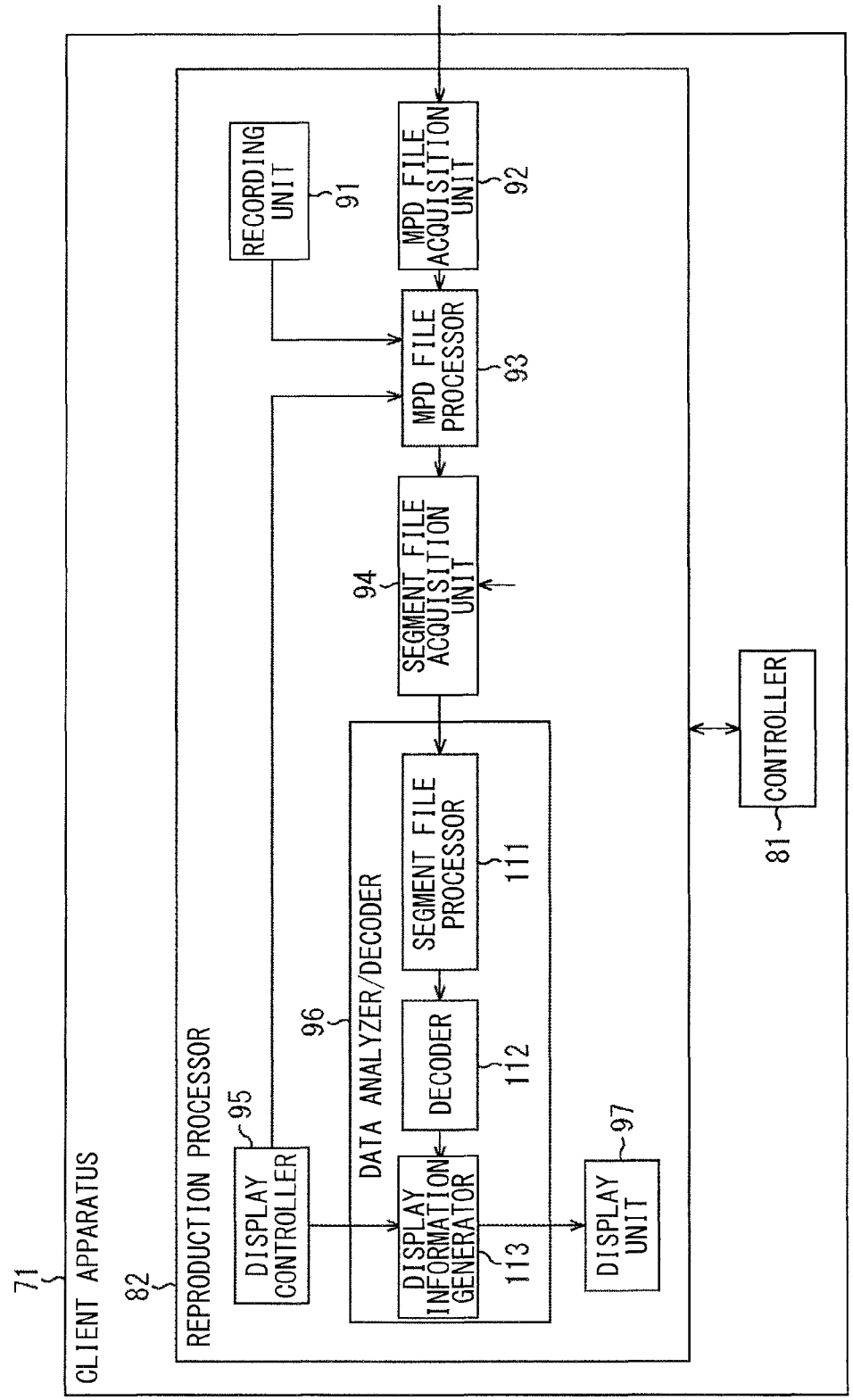
FIG. 11 is a diagram illustrating a configuration example of a client apparatus.

A client apparatus 71 illustrated in FIG. 11 is a DASH client, and includes a controller 81 and a reproduction processor 82.

The controller 81 controls an entire operation of the client apparatus 71. For example, the controller 81 controls the reproduction processor 82 to acquire the MPD file and the segment file from the server and reproduce the BV content on the basis of the segment file.

The reproduction processor 82 reproduces the BV content in accordance with control of the controller 81. The reproduction processor 82 includes a measuring unit 91, an MPD file acquisition unit 92, an MPD file processor 93, a segment file acquisition unit 94, a display controller 95, a data analyzer/decoder 96, and a display unit 97.

The measuring unit 91 measures a transmission band of a network between the client apparatus 71 and the server, and supplies a result of such measurement to the MPD file processor 93. The MPD file acquisition unit 92 acquires the MPD file from the server and supplies the MPD file to the MPD file processor 93.

The MPD file processor 93 selects a BV stream to be acquired on the basis of the MPD file supplied from the MPD file acquisition unit 92, and supplies a result of such selection to the segment file acquisition unit 94. It is to be noted that, for selection of the BV stream to be acquired, the result of measurement supplied from the measuring unit 91, the viewpoint position of the user supplied from the display controller 95, and the like are also used as appropriate.

The segment file acquisition unit 94 acquires, from the server, the segment file in which the BV streams necessary for reproduction of the BV content are stored, on the basis of the result of selection supplied from the MPD file processor 93, and supplies the segment file to the data analyzer/decoder 96.

The display controller 95 controls reproduction (displaying) of the BV content. For example, the display controller 95 acquires results of detection of the viewpoint position and a visual line direction of the user who views the BV content, and supplies the results to the MPD file processor 93 and the data analyzer/decoder 96.

The data analyzer/decoder 96 generates an image of the 3D model as the BV content on the basis of the segment file supplied from the segment file acquisition unit 94, and supplies the image of the 3D model to the display unit 97. The data analyzer/decoder 96 includes a segment file processor 111, a decoder 112, and a display information generator 113.

The segment file processor 111 extracts encoded data of the BV streams from the segment file supplied from the segment file acquisition unit 94, and supplies the encoded data to the decoder 112. The decoder 112 decodes the encoded data supplied from the segment file processor 111, and supplies resultant BV streams to the display information generator 113.

The display information generator 113 generates data of the image of the 3D model corresponding to the viewpoint position and the visual line direction of the user on the basis of the results of detection of the viewpoint position and the visual line direction of the user supplied from the display controller 95 and the BV streams supplied from the decoder 112, and supplies the data to the display unit 97.

The display unit 97 includes, for example, a liquid crystal display panel, and the like, and displays (reproduces) the image of the 3D model, that is, the BV content on the basis of the data supplied from the display information generator 113.

<Description of BV Content Reproduction Processing>

Next, description is given of an operation of the client apparatus 71.

Figure 12:
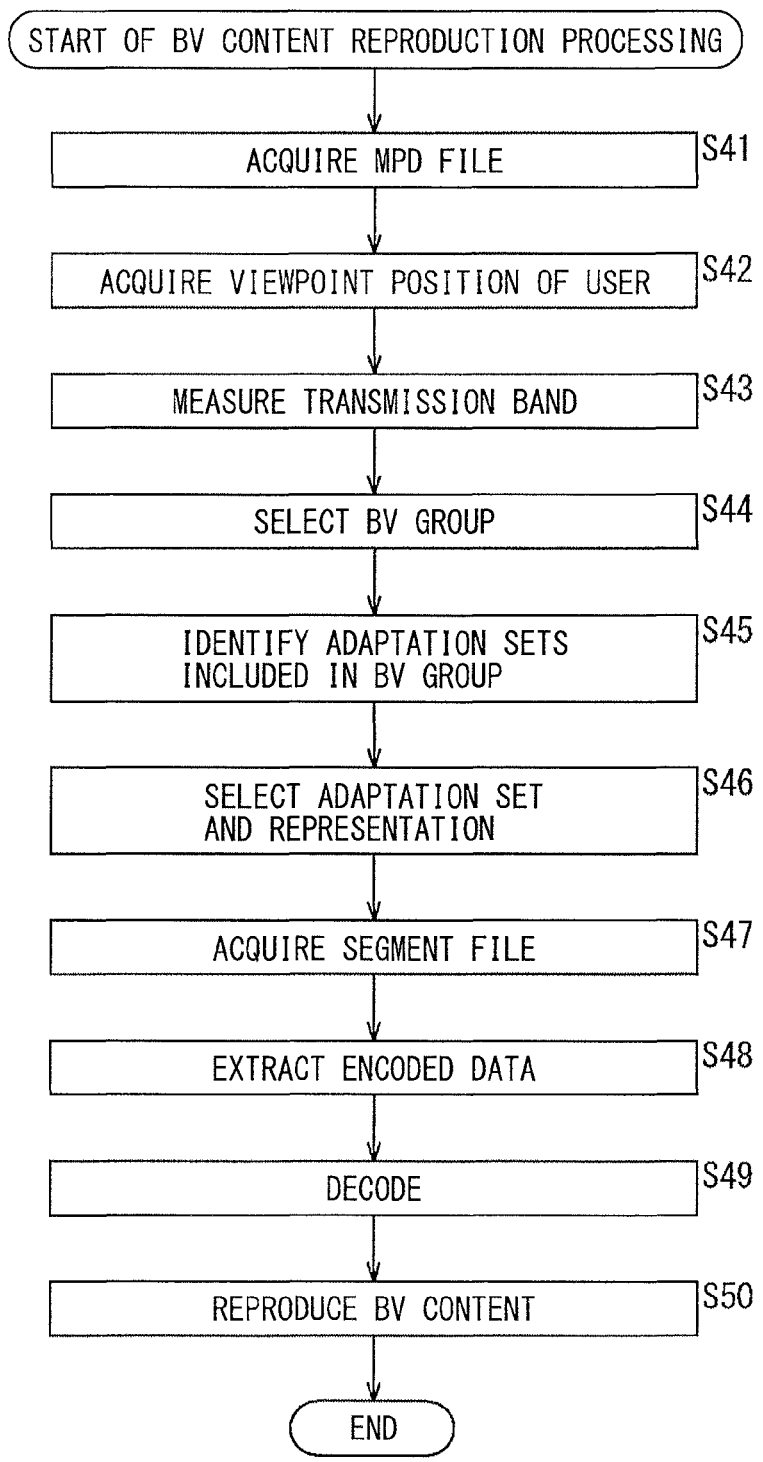
FIG. 12 is a flowchart for describing BV content reproduction processing.

That is, description is given of BV content reproduction processing performed by the client apparatus 71 with reference to a flowchart in FIG. 12.

In step S41, the MPD file acquisition unit 92 acquires the MPD file from the server and supplies the MPD file to the MPD file processor 93. That is, the MPD file transmitted from the server is received by the MPD file acquisition unit 92. Thus, for example, the MPD file illustrated in FIG. 4 is acquired.

In step S42, the MPD file processor 93 acquires the viewpoint position of the user from the display controller 95.

For example, the display controller 95 acquires results of detection of the viewpoint position and the visual line direction of the user from an unillustrated sensor or the like, and supplies the results of detection to the MPD file processor 93 and the display information generator 113. Thus, the MPD file processor 93 acquires information outputted from the display controller 95 to acquire the viewpoint position of the user. For example, the viewpoint position of the user is coordinate information of the viewpoint position of the user in three-dimensional space where the 3D model is located.

In step S43, the measuring unit 91 measures a transmission band between the client apparatus 71 and the server, and supplies a result of such measurement to the MPD file processor 93.

In step S44, the MPD file processor 93 identifies a BV group on the basis of the MPD file acquired in the step S41 and supplied from the MPD file acquisition unit 92, and selects one BV group from one or a plurality of BV groups.

That is, the MPD file processor 93 specifies a Preselection element in which the birdview descriptor is signaled from the MPD file, that is, a Preselection element in which the birdview descriptor is included, thereby identifying that the Preselection element belongs to the one BV group.

In addition, the MPD file processor 93 selects one BV group, as a BV group to be reproduced, from the one or the plurality of BV groups identified.

At this time, for example, the MPD file processor 93 may refer to the birdview coverage descriptor included in a Preselection and may select a BV group that allows for displaying of a region corresponding to the field of view of the user, on the basis of the viewpoint position of the user supplied from the display controller 95.

In step S45, the MPD file processor 93 identifies Adaptation Sets of BV streams included in the BV group selected in the step S44.

That is, the MPD file processor 93 identifies, as the Adaptation Sets of the BV streams included in the BV group, the Adaptation Sets that refer to the BV streams, and are signaled with the ids of the Adaptation Sets described in the preselectionComponents attribute in the Preselection element of the selected BV group. At this time, it is possible to identify the type of each of the Adaptation Sets in the BV group, that is, whether each of the Adaptation Sets is an Adaptation Set of a texture or an Adaptation Set of a mesh, etc. by the texture descriptor and the mesh descriptor signaled in the Adaptation Sets.

In step S46, the MPD file processor 93 selects Adaptation Sets and Representations of BV streams to be used for reproduction of the BV content from the Adaptation Sets in the BV group identified in the step S45.

That is, the MPD file processor 93 selects the Adaptation Set of the BV stream to be acquired from the Adaptation Sets in the BV group identified in the step S45 on the basis of the viewpoint position of the user acquired in the step S42 and the transmission band (bandwidth) acquired in the step S43.

At this time, for example, if it is possible to acquire the BV streams of all the Adaptation Sets in the BV group with consideration given to the transmission band, the MPD file processor 93 selects all the Adaptation Sets, and selects a Representation of an appropriate bit rate in each of the Adaptation Sets.

In addition, the MPD file processor 93 may refer to the birdview coverage descriptor, and may select a Representation to select a BV stream having higher image quality (a high bit rate) for a BV stream corresponding to a field-of-view region of the user on the basis of the viewpoint position of the user.

Further, in some cases, it is not possible to acquire all the BV streams of the BV group due to transmission band limits. In such cases, the MPD file processor 93 may refer to the birdview coverage descriptor, and may select and acquire only the minimum Adaptation Sets of BV streams necessary for displaying of the BV content only in the field-of-view region of the user.

In a case where the Adaptation Sets of the BV group and the Representation are selected, the MPD file processor 93 supplies a result of such selection to the segment file acquisition unit 94 to instruct the segment file acquisition unit 94 to acquire the segment file. Thus, an instruction to acquire BV streams to be referred to by the Adaptation Set and the Representation has been issued.

In step S47, on the basis of the result of selection supplied from the MPD file processor 93, the segment file acquisition unit 94 acquires the segment file in which the BV streams of the Adaptation Set and the Representation indicated by the result of selection are stored.

That is, the segment file acquisition unit 94 requests the server to transmit the segment file in accordance with the result of selection supplied from the MPD file processor 93. Then, the segment file acquisition unit 94 receives the segment file transmitted from the server in response to such a request, and supplies the segment file to the segment file processor 111.

In step S48, the segment file processor 111 extracts encoded data of the BV streams from the segment file supplied from the segment file acquisition unit 94, and supplies the encoded data to the decoder 112.

In step S49, the decoder 112 decodes the encoded data supplied from the segment file processor 111, and supplies resultant BV streams of the texture and the mesh to the display information generator 113.

In step S50, the display unit 97 reproduces the BV content, and the BV content reproduction processing ends.

That is, the display information generator 113 generates the image of the 3D model corresponding to the viewpoint position and the visual line direction of the user on the basis of the results of detection of the viewpoint position and the visual line direction of the user supplied from the display controller 95 and the BV streams supplied from the decoder 112. Specifically, the display information generator 113 constructs the 3D model on the basis of the texture and the mesh, thereby generating an image of the 3D model corresponding to the field of view of the user.

Then, the display information generator 113 supplies the generated image of the 3D model to the display unit 97 to cause the display unit 97 to display the image of the 3D model. thereby reproducing the BV content.

As described above, the client apparatus 71 acquires the MPD file to identify the BV group with reference to the Preselection of the MPD file, and selects the BV group and any of the BV streams included in the BV group in accordance with the viewpoint position of the user and the transmission band.

Accordingly, using the MPD file in which the Preselection including the ids of the Adaptation Sets included in the BV group is described makes it possible to easily select the BV group and the BV streams. This makes it possible to appropriately reproduce the BV content.

Modification Example 1 of First Embodiment

<About Acquisition of Additional BV Stream>

Incidentally, an example in which a necessary BV stream is selected from the BV streams included in the BV group has been described above.

However, in addition to the BV group including the BV streams of the texture and the mesh, it may also be possible to additionally acquire BV streams of a texture and a depth at a viewpoint position that are not included in the BV group. That is, it may also be possible to additionally acquire a BV stream at a viewpoint position different from the viewpoint positions of the BV streams of the BV group.

In a case where an additional BV stream is acquired in addition to the BV group, it is possible to reproduce a BV content having higher image quality.

In other words, increasing the number of acquirable textures makes it unnecessary to generate a texture in a region outside the displayable region by complementing, which makes it possible to enhance quality of the BV content during rendering. In addition, adding a depth in addition to the mesh makes it possible to acquire a more accurate 3D shape in a case where the 3D model is constructed.

Figure 13:
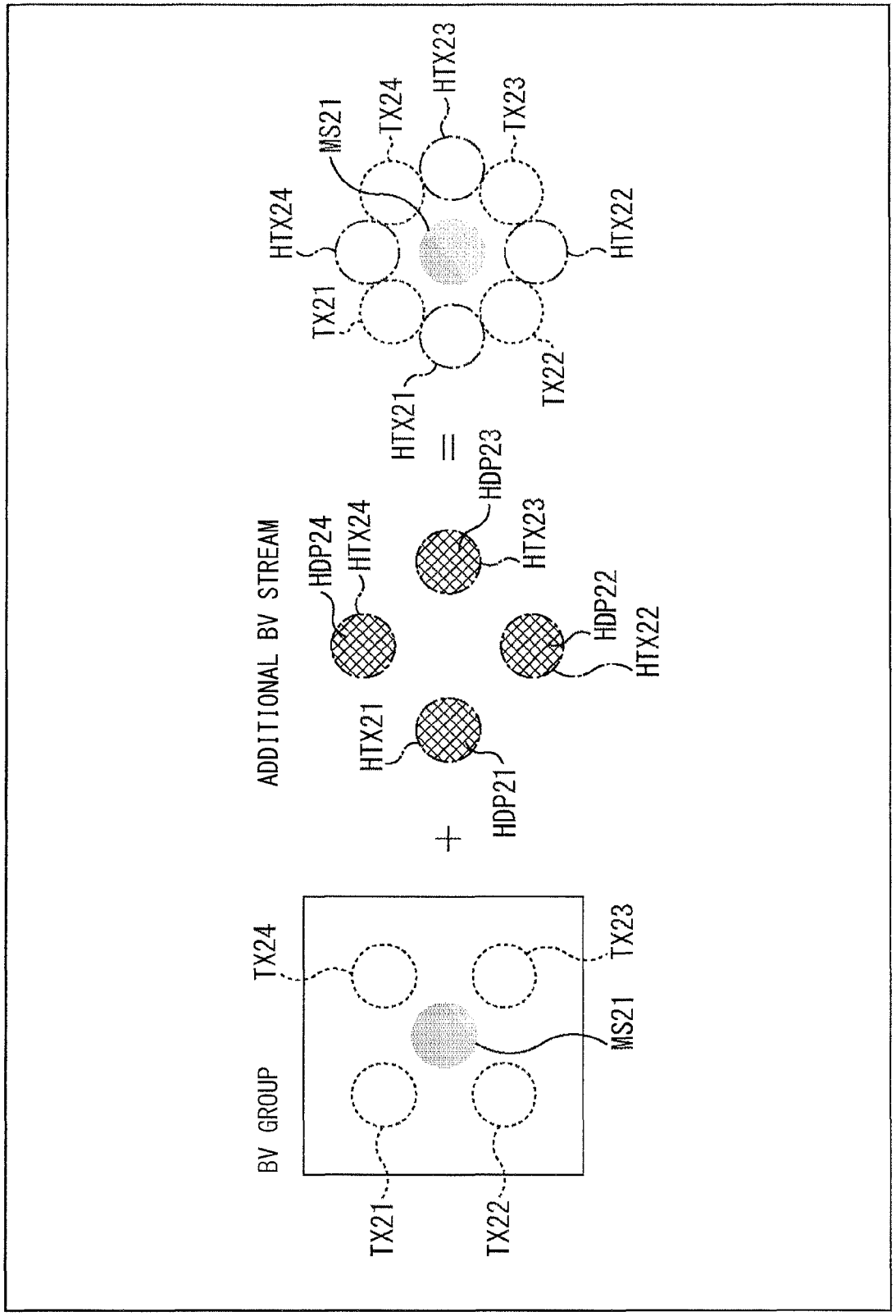
FIG. 13 is a diagram for describing examples of a BV group and additional BV streams.

For example, an example illustrated in FIG. 13 is considered in a case where BV streams of a texture and a depth are additionally acquirable.

In the example in FIG. 13, as illustrated on a left side in the diagram, at a position of the 3D model in space, a mesh MS21 of the 3D model is located, and four textures TX21 to TX24 are located at viewpoint positions that are shifted by 90 degrees to surround the 3D model.

Then, one BV group includes the mesh MS21 and the textures TX21 to TX24.

Further, in addition to the BV streams of the BV group, as illustrated at a center in the diagram, four textures HTX21 to HTX24 are located at viewpoint positions that are shifted by 90 degrees to surround the 3D model and are different from the viewpoint positions of the textures TX21 to TX24. Further, depths HDP21 to HDP24 are located at the same viewpoint positions as the viewpoint positions of the textures HTX21 to HTX24, respectively.

It is possible for the client side to additionally acquire BV streams of the textures HTX21 to HTX24 and BV streams of the depths HDP21 to HDP24.

Hereinafter, an additionally acquirable BV stream is also specifically referred to as an additional BV stream.

In a case where such additionally acquirable textures exist, for example, as illustrated on a right side in the diagram, it becomes possible to use a texture having a coverage (a displayable region) different from the textures of the BV group, which makes it possible to reproduce the BV content having higher image quality. In particular, in this example, it is possible to use textures at more viewpoint positions that surround the 3D model.

In a case where the BV content is distributed with use of MPEG-DASH, in order to also allow for distribution of the additional BV streams as described above, it is sufficient if signaling of information relating to the additional BV streams is performed with use of the MPD file.

Figure 14:
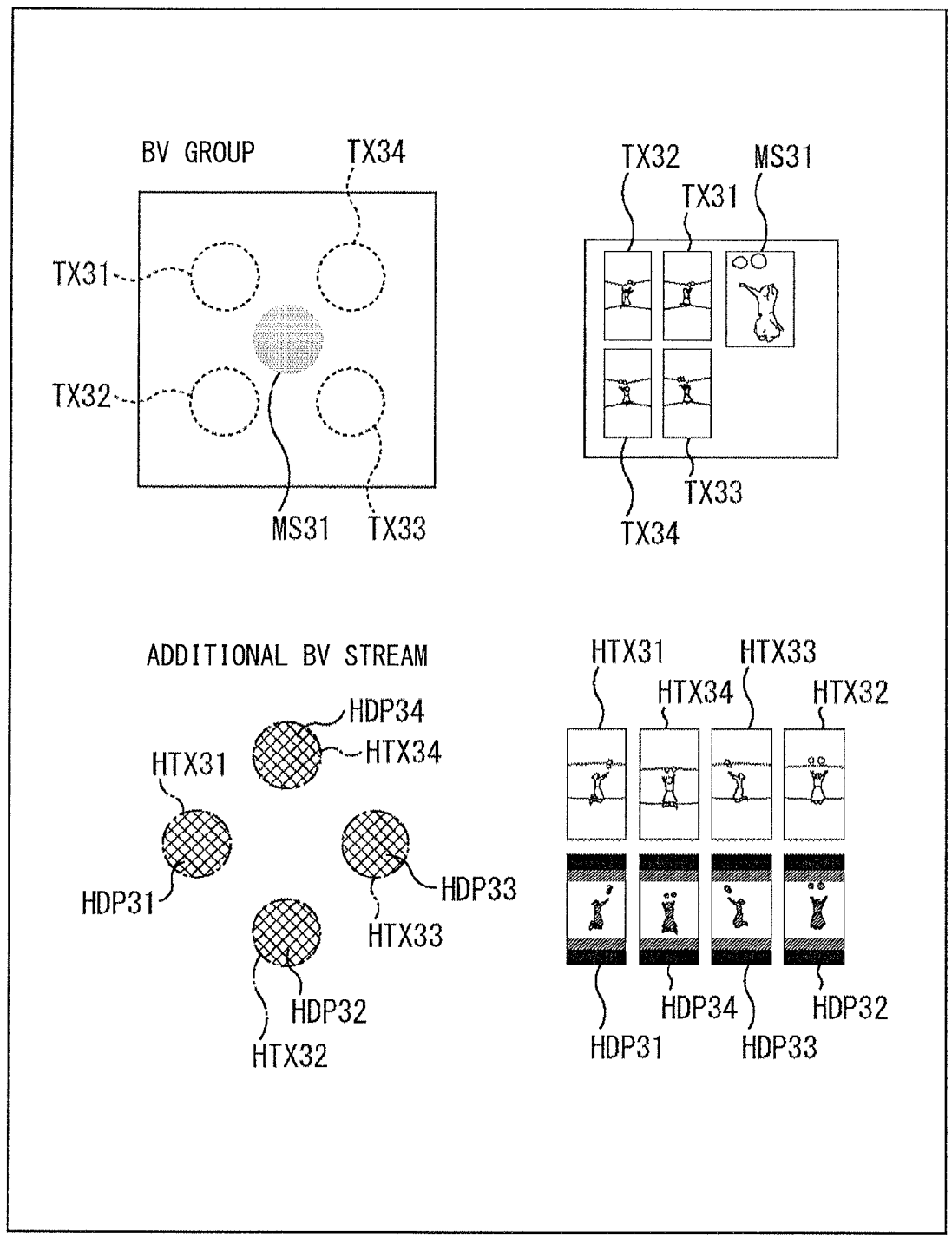
FIG. 14 is a diagram for describing examples of a BV group and additional BV streams.

For example, as illustrated in FIG. 14, it is assumed that one BV group includes a mesh MS31 and four textures TX31 to TX34.

In addition, it is assumed that additional textures HTX31 to HTX34 at viewpoint positions different from viewpoint positions of the respective textures TX31 to TX34 are additionally acquirable. Further, it is assumed that additional depths HDP31 to HDP34 respectively located at the same viewpoint positions as the viewpoint positions of textures HTX31 to HTX34 are also acquirable.

It is to be noted that, in FIG. 14, a circle drawn on a left side in the diagram represents a viewpoint position of each BV stream, that is, each of the textures, the mesh, and the depths.

As described above, in a case where one BV group includes the respective BV streams of the mesh MS31 and the textures TX31 to TX34 and respective BV streams of the textures HTX31 to HTX34 and the depths HDP31 to HDP34 are additionally acquirable for the BV group, for example, the MPD file is as illustrated in FIG. 15 and FIG. 16.

It is to be noted that FIG. 16 illustrates a remaining portion of the MPD file following a portion of the MPD file illustrated in FIG. 15, that is, a portion illustrated on a lower side in FIG. 15. In FIG. 15 and FIG. 16, in order to make it clear that one MPD file is illustrated by these diagrams, a remark "CONTINUED ON FIG. 16" is illustrated on the lower side in FIG. 15, and a remark "CONTINUED FROM FIG. 15" is illustrated on an upper side in FIG. 16. These remarks "CONTINUED ON FIG. 16" and "CONTINUED FROM FIG. 15" are not actually described in the MPD file.

In addition, in the MPD file illustrated in FIG. 15 and FIG. 16, description of portions similar to those in the example illustrated in FIG. 4 is omitted as appropriate to prevent repetition. Further, it is assumed that the textures, the mesh, and the depths herein are individually stored as single track files.

In the MPD file illustrated in FIG. 15 and FIG. 16, a portion indicated by an arrow W21 is a Preselection relating to one BV group.

In addition, an Adaptation Set indicated by each of arrows W22 to W24 is an Adaptation Set relating to a texture or the mesh included in the BV group. Then, ids of the Adaptation Sets of respective BV streams included in one BV group including the Adaptation Sets indicated by the respective arrows W22 to W24 are described in the Preselection indicated by the arrow W21.

That is, the Adaptation Sets indicated by the arrows W22 to W24 are Adaptation Sets of BV streams included in a BV group indicated by a preselectionComponents portion in the Preselection indicated by the arrow W21.

Herein, tex1 to tex4 are ids of the Adaptation Sets in which information relating to the textures TX31 to TX34 in FIG. 14 is described, and mesh is an id of the Adaptation Set in which information relating to the mesh MS31 in FIG. 14 is described.

Accordingly, it can be seen from the Preselection indicated by the arrow W21 that one BV group includes the textures TX31 to TX34 and the mesh MS31.

Further, an Adaptation Set indicated by each of arrows W25 to W28 is an Adaptation Set in which information relating to an additional BV stream for enhancement of image quality, which is different from the BV streams included in the BV group, for configuration of the same 3D model as the 3D model configured by the BV streams included in the BV group is described.

For example, ids of Adaptation Sets in which information relating to the textures HTX31 to HTX34 illustrated in FIG. 14 is described are hq_tex1 to hq_tex4. Further, ids of Adaptation Sets in which information relating to the depths HDP31 to HDP34 illustrated in FIG. 14 is described are hq_dep1 to hq_dep4.

An Adaptation Set relating to an additional texture indicated by the arrow W25 or the arrow W26 includes a texture descriptor indicating that the Adaptation Set is an Adaptation Set relating to a texture.

In addition, in this example, an EssentialProperty or a SupplementalProperty with "schemeIdUri="urn:mpeg:dash:depth:2017"" is newly defined as a depth descriptor (depth descriptor). The depth descriptor is information indicating that the Preselection or the Adaptation Set is a Preselection or an Adaptation Set relating to a depth.

Referring to this depth descriptor makes it possible for the client to identify that a BV stream to be referred to by the Preselection or the Adaptation Set including the depth descriptor is a depth. It is to be noted that the depth descriptor may be signaled in the Representation or the SubRepresentation.

For example, a portion indicated by an arrow A21 in an Adaptation Set indicated by an arrow W27 and a portion indicated by an arrow A22 in an Adaptation Set indicated by an arrow W28 each have an EssentialProperty with "schemeIdUri="urn:mpeg:dash:depth:2017"" as a depth descriptor.

This makes it possible for the client to figure out that the Adaptation Sets indicated by the arrow W27 and the arrow W28 are Adaptation Sets relating to depths included in the BV content.

In addition, in this example, birdview coverage descriptors indicated by arrows A23 to A30 are described in the Preselection indicated by the arrow W21 and Adaptation Sets indicated by the arrows W22 to W28, respectively.

It is to be noted that the birdview coverage descriptor is applicable to a depth similarly to a texture and a mesh, and herein, a birdview coverage descriptor is also described in the Adaptation Set of the depth.

These birdview coverage descriptors are displayable region information described above, and the displayable region information includes a source_id indicating a source (a material) of a BV stream to be referred to, in addition to information indicating the displayable region of the BV stream.

In other words, the birdview coverage descriptor includes a source ID (source_id) indicating a source of the BV content in addition to the displayable region information. It can be said that this source_id is information indicating a BV content that is reproducible with use of BV streams, that is, a 3D model that is allowed to be configured with use of the BV streams.

The source_id is located at the top of a value portion of the birdview coverage descriptor, and respective parameters relating to the displayable region are located subsequent to the source_id.

Accordingly, the birdview coverage descriptor in the example illustrated in FIG. 15 and FIG. 16 is an extension of the birdview coverage descriptor illustrated in the example in FIG. 4.

Herein, semantics of the birdview coverage descriptor in the example illustrated in FIG. 15 and FIG. 16 are as illustrated in FIG. 17.

In an example illustrated in FIG. 17, a parameter "source_id" indicates an ID of a source of a BV content. Accordingly, in a case where the source_id is the same, the source of the BV content is the same; therefore, it is possible to configure one BV content by combining BV streams having the same source_id.

In the example illustrated in FIG. 17, parameters other than the source_id, that is, the parameters "x", "y", "z", "center_yaw", "center_pitch", "center_roll", "hor_range", and "ver_range" are similar to as those in FIG. 7.

Returning to description of FIG. 15 and FIG. 16, in the value of the Property as the birdview coverage descriptor in the example illustrated in FIG. 15 and FIG. 16, the above-described parameters source_id, x, y, z, center_yaw, center_pitch, center_roll, hor_range, and ver_range are described in a comma-separated manner. That is, a value portion of the birdview coverage descriptor has "value="source_id, x, y, z, center_yaw, center_pitch, center_roll, hor_range, ver_range".

In particular, in this example, the birdview coverage descriptor is stored for each Adaptation Set, that is, for each BV stream, and the source_ids in the respective birdview coverage descriptors indicated by the arrows A23 to A30 are all "1". This makes it possible to specify that all the Preselection and the Adaptation Sets including these birdview coverage descriptors relate to the same BV content. That is, it can be seen that it is possible to configure the same BV content with a texture, a mesh, an additional texture, and an additional depth corresponding to the Adaptation Sets including the source_id of "1".

Figure 10:
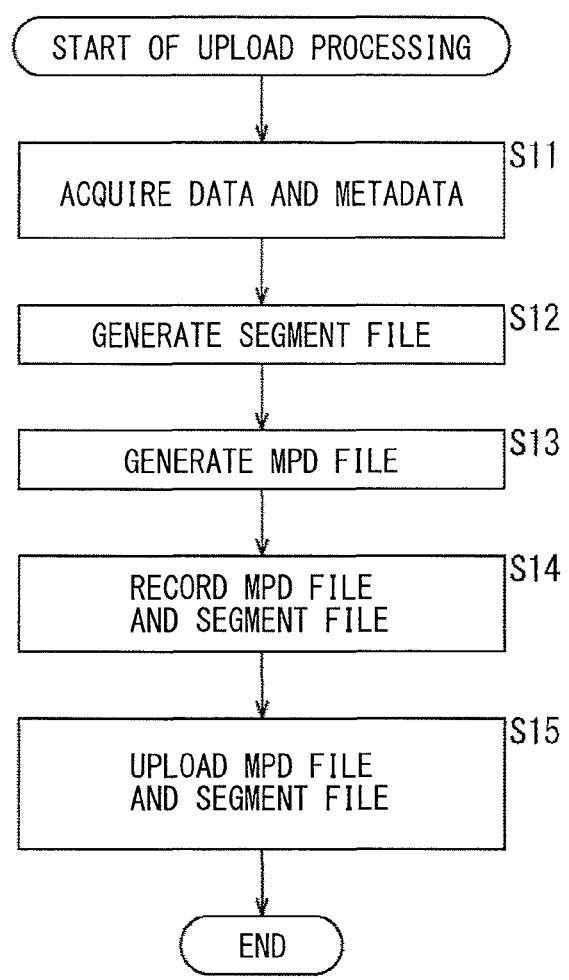
FIG. 10 is a flowchart for describing upload processing.

In a case where additional BV streams are acquirable as described above, for example, the file generation apparatus 11 performs processing similar to the upload processing described with reference to FIG. 10.

However, in the step S13, the MPD file generator 33 generates an MPD file including Adaptation Sets relating to additional textures and additional depths, as illustrated in FIG. 15 and FIG. 16. In addition, the MPD file generator 33 generates a birdview coverage descriptor including the source_id as illustrated in FIG. 15 and FIG. 16, and describes the birdview coverage descriptor in a Preselection or an Adaptation Set.

Further, in a case where additional BV streams are acquirable, the client apparatus 71 performs processing similar to the BV content reproduction processing described with reference to FIG. 12 to reproduce the BV content.

However, in the step S45, the MPD file processor 93 identifies not only the Adaptation Sets and the Representations of the BV group but also Adaptation Sets and Representations of BV streams that are allowed to be added to the BV group on the basis of the source_id of the birdview coverage descriptor. In this case, it is possible to identify Adaptation Sets and Representations of depths by the depth descriptors included in these Adaptation Sets.

In addition, in the step S46, the MPD file processor 93 selects an Adaptation Set or a Representation of a BV stream to be acquired, from the Adaptation Sets and the Representations included in the BV group and the Adaptation Sets and the Representations of additional BV streams.

At this time, the MPD file processor 93 selects the Adaptation Set or the Representation of the BV stream to be acquired, on the basis of the viewpoint position of the user and the transmission band, the source_id and information (parameters) indicating the displayable region that are included in the value of the birdview coverage descriptor, and the like.

Specifically, for example, the MPD file processor 93 is allowed to enhance image quality of a BV stream corresponding to the field-of-view region of the user.

In addition, in a case where the transmission band has a margin, it is possible for the MPD file processor 93 to select a Representation of an additional texture at a viewpoint position different from the viewpoint positions of the textures included in the BV group or a Representation of an additional depth for enhancement of image quality corresponding to the field of view of the user. This makes it possible to reproduce a BV content having higher image quality.

Modification Example 2 of First Embodiment

<About Quality Ranking of BV Stream>

Incidentally, the above-described depth is compressed by AVC/HEVC-based depth map encoding such as ISO/IEC 14496-10 (MVC with depth, 3D AVC) or ISO/IEC 23008-2 (Multiview HEVC, 3D HEVC).

In contrast, in mesh encoding, vertex coordinates of a mesh and vertex merging information are encoded in ISO/IEC 14496-16 (Animation Framework eXtension).

As described above, a codec (a coding system) differs between the depth and the mesh; therefore, it is not possible to compare, simply by bit rates of the BV streams of the depth and the mesh, a quality (quality) of a 3D shape that is creatable with the BV streams of the depth and the mesh.

Accordingly, if a quality ranking that is information indicating quality of the 3D shape including the mesh and the depth is signaled, it is possible for the client to select and acquire a mesh and a depth that are allowed to create a 3D shape having an appropriate quality (quality) corresponding to a transmission band or the like.

An example in which quality rankings of the mesh and the depth are signaled is described below. It is to be noted that the quality ranking is usable not only for signaling of qualities of the mesh and the depth but also for signaling of a quality of a texture and signaling of a quality of a BV content including a combination of the texture, the mesh, and the like.

In a case where the quality rankings of the mesh and the depth are signaled, the MPD file is as illustrated in FIG. 18 and FIG. 19, for example. FIG. 19 illustrates a remaining portion of the MPD file following a portion of the MPD file illustrated in FIG. 18, that is, a portion illustrated on a lower side in FIG. 18. In FIG. 18 and FIG. 19, in order to make it clear that one MPD file is illustrated by these diagrams, a remark "CONTINUED ON FIG. 19" is illustrated on the lower side in FIG. 18, and a remark "CONTINUED FROM FIG. 18" is illustrated on an upper side in FIG. 19. These remarks "CONTINUED ON FIG. 19" and "CONTINUED FROM FIG. 18" are not actually described in the MPD file.

In addition, in the MPD file illustrated in FIG. 18 and FIG. 19, description of portions similar to those in the example illustrated in FIG. 15 and FIG. 16 is omitted as appropriate to prevent repetition. Further, it is assumed that the textures, the mesh, and the depths herein are individually stored as single track files.

In the MPD file illustrated in FIG. 18 and FIG. 19, a Preselection and Adaptation Sets indicated by arrows W41 to W48 are the same as the Preselection and the Adaptation Sets indicated by the arrows W21 to W28 in FIG. 15 and FIG. 16, respectively.

That is, a portion indicated by the arrow W41 is a Preselection relating to one BV group, and the Adaptation Set indicated by each of the arrows W42 to W44 is an Adaptation Set of each of the textures and the mesh included in the BV group.

In addition, the Adaptation Sets indicated by each of the arrows W45 to W48 is an Adaptation Set of an additional texture or a depth of the BV content as the BV group.

Further, in this example, an EssentialProperty or a SupplementalProperty with "schemeIdUri="urn:mpeg:dash:bvqualityranking:2017"" is newly defined as a quality ranking descriptor (quality ranking descriptor) that is information indicating a quality (quality) of a BV stream.

In this example, the quality ranking descriptor is information indicating a relative quality (quality ranking) among a mesh and depths corresponding to Representations included in Adaptation Sets different from each other. In other words, it can be said that the quality ranking descriptor is quality information indicating a relative quality (quality) of each BV stream among a plurality of BV streams for reproduction of the same BV content. In particular, in the quality ranking descriptor, a quality ranking is signaled for each region or every plurality of regions in a displayable region of the mesh or the depth.

For example, semantics of the quality ranking descriptor are as illustrated in FIG. 20.

Specifically, a parameter "id" indicates an id of a quality ranking, and the quality ranking is signaled with a relative value in quality ranking descriptors having the same id.

A parameter "quality_ranking" indicates a value of the quality_ranking, and indicates that, in a case where the value of the quality_ranking is 1 or more, the smaller the value is, the higher the quality is. In addition, in a case where the value of the quality_ranking is 0, the quality_ranking (ranking) is undefined.

A parameter "remaining_area_flag" is flag information for specifying a region as a range where the value of the quality_ranking indicated by the parameter "quality_ranking" is applied.

Herein, in a case where the value of the parameter "remaining_area_flag" is 0, the quality_ranking descriptor further includes parameters "center_yaw", "center_pitch", "center_roll", "hor_range", and "ver_range", and region information where the quality_ranking is signaled with these parameters is signaled.

In other words, the quality_ranking indicated by the parameter "quality_ranking" is a quality_ranking of a region indicated by the parameters "center_yaw", "center_pitch", "center_roll", "hor_range", and "ver_range".

In contrast, in a case where the value of the parameter "remaining_area_flag" is 1, the value indicates that the quality_ranking indicated by the parameter "quality_ranking" is a quality_ranking of a remaining region where the quality_ranking is not signaled in the same Representation.

It is to be noted that, hereinafter, a region as a target of the quality_ranking in a displayable region of a mesh or a depth is also referred to as a target region. It can be said that the parameter "remaining_area_flag" is information indicating the target region to which the quality_ranking is applied.

The parameter "center_yaw" indicates a yaw angle (yaw angle) indicating a center position of the target region as viewed from the center position of the 3D model. In addition, the parameter "center_pitch" indicates a pitch angle (pitch angle) indicating the center position of the target region as viewed from the center position of the 3D model, and the parameter "center_roll" indicates a roll angle (roll angle) of the center position of the target region as viewed from the center position of the 3D model, that is, a rotation angle of the target region.

Further, the parameter "hor_range" indicates a horizontal angle range of the target region as viewed from the center position of the 3D model, and the parameter "ver_range" indicates a vertical angle range of the target region as viewed from the center position of the 3D model.

These parameters "center_yaw", "center_pitch", "center_roll", "hor_range", and "ver_range" specify the target region. That is, the target region is a region surrounded by, for example, a center of a sphere and four circles on the sphere each having a center coincident with the center of the sphere, as in the displayable region described with reference to FIG. 6, and in particular, the target region is the same region as the displayable region or a partial region of the displayable region.

It is to be noted that, herein, a region as viewed from inside of the 3D model that is, the center of the 3D model is signaled as the target region, but a region as viewed from outside of the 3D model, that is, a viewpoint position serving as a predetermined reference may be signaled as the target region.

For example, in a case where the value of the parameter "remaining_area_flag" is 0, in the value of the Property as the quality_ranking descriptor, the above-described parameters id, quality_ranking, remaining_area_flag, center_yaw, center_pitch, center_roll, hor_range, and ver_range are described in a comma-separated manner as information relating to the quality_ranking.

That is, for example, the value of the quality_ranking descriptor has "value="id, quality_ranking, remaining_area_flat, center_yaw, center_pitch, center_roll, hor_ range, ver_range" or the like.

In contrast, in a case where the value of the parameter "remaining_area_flag" is 1, in the value of the Property as the quality_ranking descriptor, the above-described parameters id, quality_ranking, and remaining_area_flag are described in a comma-separated manner as information relating to the quality_ranking.

That is, for example, the value of the quality_ranking descriptor has "value="id, quality_ranking, remaining_area_flag".

In the example illustrated in FIG. 18 and FIG. 19, the SupplementalProperty indicated by each of the arrows A41 to A44 is a quality_ranking descriptor.

For example, in the SupplementalProperty indicated by the arrow A41, a value portion thereof has "1, 5, 1".

Accordingly, it can be seen that the value of the quality_ranking of a mesh of a Representation, in which the id of the Adaptation Set is mesh, corresponding to this SupplementalProperty is "5".

Further, the value of the remaining_area_flag in this SupplementalProperty is "1", from which it can be seen that the value "5" of the quality_ranking is a quality ranking of the entire displayable region of the mesh. That is, the entire displayable region is the target region.

In addition, for example, the SupplementalProperty indicated by the arrow A42 is a quality_ranking descriptor of a depth of a Representation in which the id of the Adaptation Set is hq_dep1, and a value portion thereof has "1, 3, 0, −90, 0, 90, 120".

Accordingly, it can be seen that a target region of an additional depth corresponding to this SupplementalProperty is a region in a range of 0 degrees of rotation indicated by the roll angle, 90 degrees in the horizontal direction and 120 degrees in the vertical direction with a position, as a center, determined by the yaw angle of "−90 degrees" and the pitch angle of "0 degrees" as viewed from the center position of the 3D model. In addition, it can be seen that the value of the quality ranking of the target region is "3".

Further, it can be seen that, for example, each of the SupplementalProperty indicated by the arrow A43 and the SupplementalProperty indicated by the arrow A44 is a quality ranking descriptor of a depth of a Representation in which the id of the Adaptation Set is hq_dep4.

In particular, it can be seen that a target region of an additional depth corresponding to the SupplementalProperty indicated by the arrow A43 is a region in a range of 0 degrees of rotation indicated by the roll angle, 90 degrees in the horizontal direction and 120 degrees in the vertical direction with a position, as a center, determined by the yaw angle of "180 degrees" and the pitch angle of "0 degrees" as viewed from the center position of the 3D model. In addition, it can be seen that the value of the quality ranking of the target region is "1".

In addition, it can be seen that a target region of an additional depth corresponding to the SupplementalProperty indicated by the arrow A44 is a region other than the target region indicated by the SupplementalProperty indicated by the arrow A43 in the displayable region of the depth in which the id of the Adaptation Set is hq_dep4. It can then be seen that the value of the quality ranking of the target region of the additional depth corresponding to the SupplementalProperty indicated by the arrow A44 is "5".

It can be seen from those that in this example, the depth of the Representation in which the id of the Adaptation Set is hq_dep1 has a higher quality in the entire region than the mesh of the Representation in which the id of the Adaptation Set is mesh. In addition, it can be seen that the depth of the Representation in which the id of the Adaptation Set is hq_dep4 has a higher quality only in a region determined by the yaw angle of "180 degrees", the pitch angle of "0 degrees", the roll angle of "0 degrees", the horizontal angle range of "90 degrees", and the vertical angle range of "90 degrees" than the mesh of the Representation in which the id of the Adaptation Set is mesh.

As described above, the quality ranking descriptor is information indicating quality (quality ranking) of each of target regions in BV streams of the mesh, the depths, and the like, which makes it possible to compare quality among the mesh and the depths. It is possible for the client to acquire a depth having an appropriate quality (quality ranking) in addition to the mesh on the basis of such a quality ranking descriptor.

It is to be noted that, herein, although an example in which the respective parameters indicating the value of the quality ranking and the target region are described in the value portion of the Property in a comma-separated manner has been described, the respective parameters may be signaled with individual attribution values.

In addition, a Viewpoint element of an Adaptation Set having a Representation may be used instead of the id of the quality ranking to associate a BV stream as a target of quality comparison by the quality ranking. At this time, "shcemeIdUri="urn:mpeg:dash:bvqualityrankinggroup:2017"" is used as shcemeIdUri of the Property. Then, a case where the value of the Property is the same indicates that a relative quality ranking is signaled for the Representation included in each Adaptation Set.

Further, in the example illustrated in FIG. 18 and FIG. 19, the quality ranking descriptor is signaled under the Representation, but the quality ranking descriptor may be signaled under the Adaptation Set, under the Sub Representation, or under the Preselection.

In addition, a parameter stream_type may be added to the quality ranking descriptor.

For example, it is assumed that one Adaptation Set includes information relating to a texture and a mesh, or a texture and a depth, and it is possible to configure a BV content with BV streams corresponding to the one Adaptation Set. In such a case, the stream_type is used to signal the quality ranking of each of the texture, the mesh, the depth, and the BV content.

Using such stream_type makes it possible to identify an Adaptation Set including information relating to a BV stream (or a BV content) having an appropriate quality in a case where the client selects an additional BV stream necessary to enhance the quality of the BV content.

Herein, FIG. 21 illustrates semantics of the stream_type added to the quality ranking descriptor. In this example, the stream_type indicates a type of BV stream of which the quality ranking is signaled.

Specifically, for example, a value "0" of the stream_type indicates that the type of the BV stream of which the quality ranking is signaled is a texture. The value "1" of the stream_type indicates that the type of the BV stream of which the quality ranking is signaled is a depth or a mesh, and the value "2" of the stream_type indicates that the type of the BV stream of which the quality ranking is signaled is a BV content.

In a case where the quality ranking is signaled with the MPD file as described above, for example, the file generation apparatus 11 performs processing similar to the upload processing described with reference to FIG. 10.

However, in the step S13, the MPD file generator 33 generates an MPD file including the Adaptation Sets of the additional textures and the additional depths, and the quality ranking descriptor, as illustrated in FIG. 18 and FIG. 19.

In addition, in a case where the quality ranking is signaled with the MPD file, the client apparatus 71 performs processing similar to the BV content reproduction processing described with reference to FIG. 12 to reproduce the BV content.

It is to be noted that in the step S44, it is possible for the MPD file processor 93 to refer to the quality ranking descriptors of a plurality of BV contents, and select a BV group of a BV content in which a region corresponding to the field of view of the user has high image quality from BV groups of these BV contents on the basis of the quality rankings of the respective BV contents.

In addition, in the step S45, the MPD file processor 93 identifies not only the Adaptation Sets and Representations of the BV groups but also the Adaptation Sets and Representations of additional BV streams.

Further, in the step S46, the MPD file processor 93 selects an Adaptation Set or a Representation of a BV stream to be acquired, from the Adaptation Sets and the Representations included in the BV group and the Adaptation Sets and the Representations of the additional BV streams.

At this time, the MPD file processor 93 selects the Adaptation Set or the Representation of the BV stream to be acquired on the basis of the viewpoint position, of the user, the transmission band, the birdview coverage descriptor, the quality ranking descriptor, and the like.

For example, it is possible for the MPD file processor 93 to enhance the image quality of the BV stream corresponding to the field-of-view region of the user on the basis of quality ranking descriptor and the like. In addition, in a case where the transmission band had a margin, it is possible for the MPD file processor 93 to select a Representation of an additional depth or the like corresponding to the field of view of the user to reproduce a BV content having higher image quality.

Modification Example 3 of First Embodiment

<Abut Transmission of Silhouette Information>

It is to be noted that, in a case where the 3D shape is created on the basis of a depth, a silhouette is usable to separately process a foreground, that is, an object serving as a 3D model, and a background.

The silhouette is information such as a silhouette image indicating a region of a subject (object) serving as a 3D model in a depth image as described above. The silhouette image herein is, for example, mask information that is an image including pixels having a pixel value of 1 or 0.

It is to be noted that, for example, in a case where a region on a depth including pixels having a luminance value equal to or higher than a predetermined threshold value is set as a foreground region, the threshold value may be set as a silhouette, but in the following description, it is assumed that the silhouette is a silhouette image.

In a case where a silhouette is used, there is an advantage that it is possible to reduce a processing amount by creating a 3D shape of only the foreground with use of the silhouette and the depth.

Figure 22:
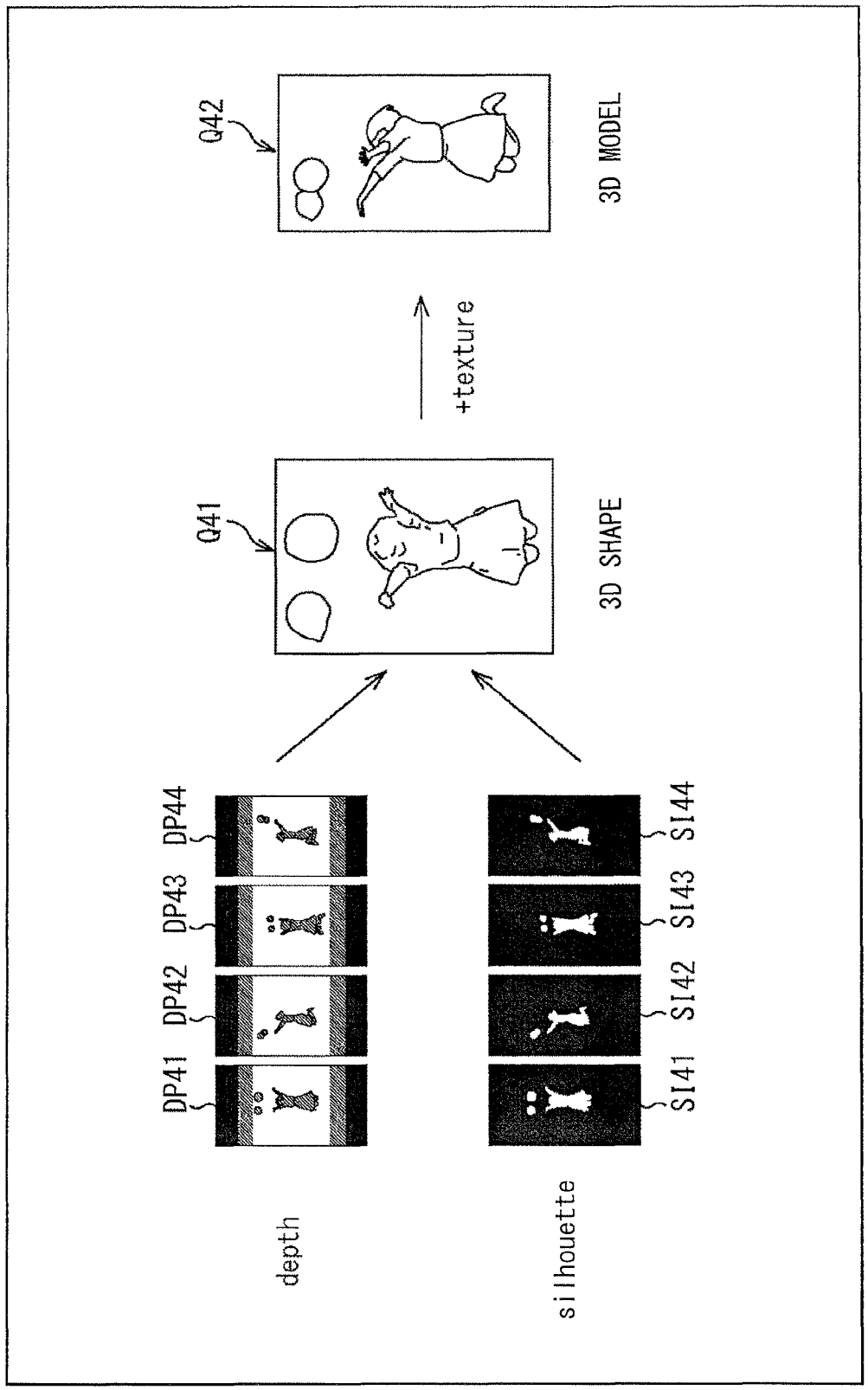
FIG. 22 is a diagram for describing transmission of silhouettes.

In a case where a BV stream of the silhouette is transmitted, for example, as illustrated in FIG. 22, the silhouette is transmitted as a silhouette image. It is to be noted that silhouette information may be included in the depth image, and a depth including the silhouette information may be transmitted.

In an example illustrated in FIG. 22, depths DP41 to DP44 at different viewpoint positions and silhouettes SI41 to SI44 having the same viewpoint positions as the viewpoint positions of the depths DP41 to DP44 are transmitted.

For example, the depth DP41 and the silhouette SI41 are information at the same viewpoint position, and using the silhouette SI41 makes it possible to specify (extract) a region of a foreground portion in the depth DP41.

Using these depths DP41 to DP44 and these silhouettes SI41 to SI44 makes it possible for the client to create, with a small processing amount, a 3D shape of only a 3D model that is a foreground without a background as indicated by an arrow Q41. Then, a texture is attached to the thus-acquired 3D shape, which makes it possible to acquire an 3D model as indicated by an arrow Q42.

Herein, for example, as illustrated in FIG. 14, it is assumed that one BV group includes the mesh MS31 and four textures TX31 to TX34, and additional textures HTX31 to HTX34 and additional depths HDP31 to HDP34 exist.

Figure 23:
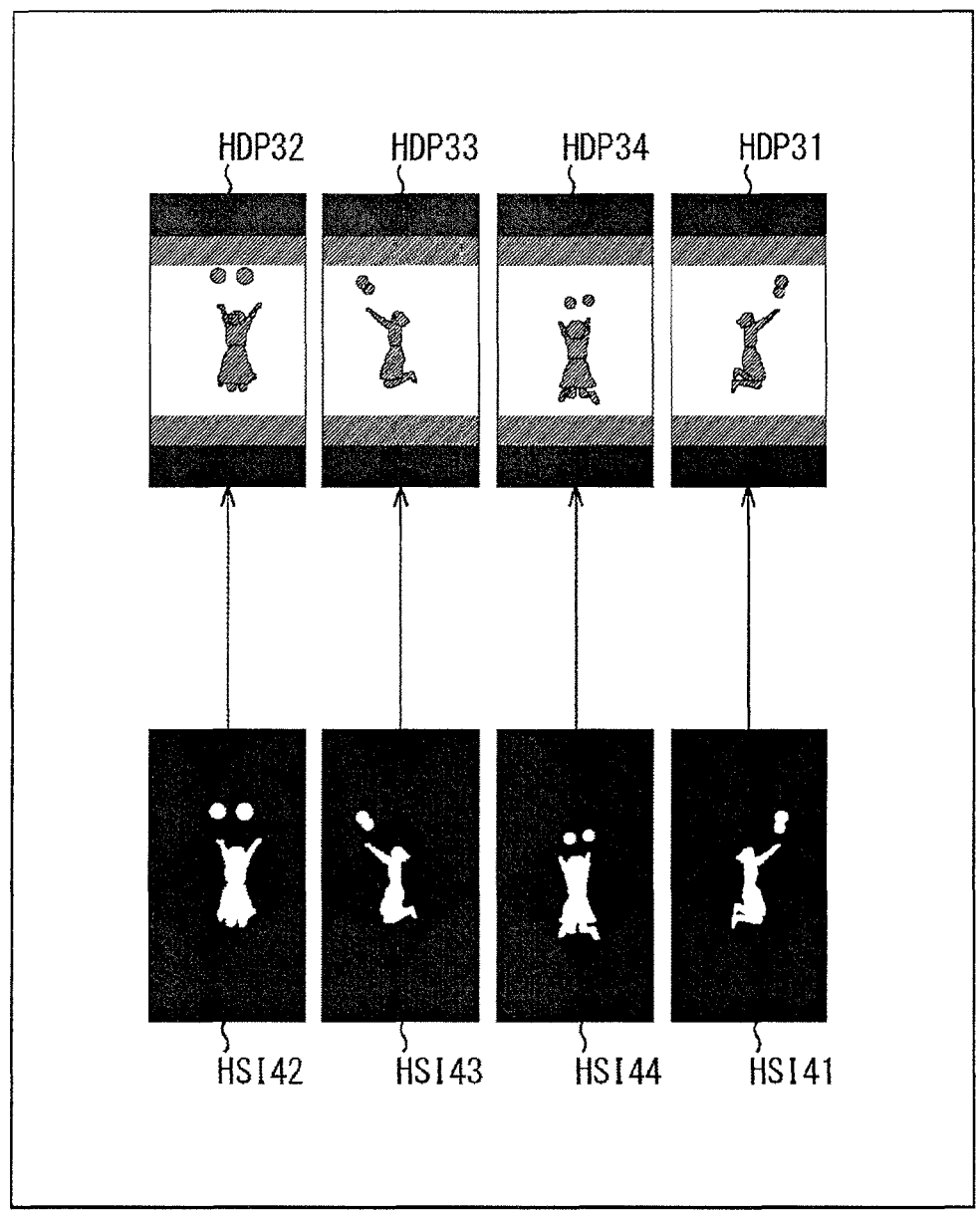
FIG. 23 is a diagram illustrating silhouettes associated with depths.

Further, it is assumed that, in addition to the mesh MS31, the textures TX31 to TX34, the textures HTX31 to HTX34, and the depths HDP31 to HDP34, additional silhouettes HSI41 to HSI44 exist as illustrated in FIG. 23. It is to be noted that, in FIG. 23, portions corresponding to those in FIG. 14 are denoted by the same reference numerals, and description thereof is omitted as appropriate.

In the example illustrated in FIG. 23, the additional silhouettes HSI41 to HSI44 for enhancement of image quality are correlated with the additional depths HDP31 to HDP34. Herein, the viewpoint positions of the silhouettes HSI41 to HSI44 are the same as the viewpoint positions of the depth HDP31 to the depth HDP34, respectively.

In a case where the mesh MS31, the textures TX31 to TX34, the textures HTX31 to HTX34, the depths HDP31 to HDP34, and the silhouettes HSI41 to HSI44 are acquirable as described above, for example, the MPD file is as illustrated in FIG. 24 and FIG. 25.

It is to be noted that FIG. 25 illustrates a remaining portion of the MPD file following a portion of the MPD file illustrated in FIG. 24, that is, a portion illustrated on a lower side in FIG. 24. In FIG. 24 and FIG. 25, in order to make it clear that one MPD file is illustrated by these diagrams, a remark CONTINUED ON FIG. 25" is illustrated on the lower side in FIG. 24, and a remark "CONTINUED FROM FIG. 24" is illustrated on an upper side in FIG. 25. These remarks "CONTINUED ON FIG. 25" and "CONTINUED FROM FIG. 24" are not actually described in the MPD file.

In addition, in the MPD file illustrated in FIG. 24 and FIG. 25, description of portions similar to those in the example illustrated in FIG. 15 and FIG. 16 is omitted as appropriate to prevent repetition. Further, it is assumed that the textures, the mesh, the depths, and the silhouettes herein are individually stored as single track files.

In the MPD file illustrated in FIG. 24 and FIG. 25, a portion indicated by an arrow W61 is a Preselection relating to one BV group, and this Preselection is exactly the same as the Preselection indicated by the arrow W21 in FIG. 15.

In addition, an Adaptation Set indicated by each of arrows W62 to W64 is an Adaptation Set relating to the texture or the mesh included in the BV group. Herein, the Adaptation Sets indicated by the arrows W62 to W64 are exactly the same as the Adaptation Sets indicated by the arrows W22 to W24 in FIG. 15, respectively.

Herein, tex1 to tex4 are ids of the Adaptation Sets relating to the textures TX31 to TX34 in FIG. 14, and mesh is an id of the Adaptation Set relating to the mesh MS31 in FIG. 14. Then, mesh and tex1 to tex4 are described in a preselectionComponents attribute of a Preselection element indicated by the arrow W61.

Adaptation Sets indicated by arrows W65 to W68 correspond to the Adaptation Sets indicated by the arrows W25 to W28 in FIG. 16, respectively.

That is, the Adaptation Sets indicated by the arrows W65 to W68 are Adaptation Sets in which information relating to a corresponding one of the additional texture HTX31, the additional texture HTX34, the additional depth HDP31, and the additional depth HDP34 is described, respectively.

It is to be noted that the Adaptation Sets indicated by the arrows W65 and W66 are exactly the same as the Adaptation Sets indicated by the arrows W25 and W26 in FIG. 16, respectively.

Adaptation Sets indicated by an arrow W69 and an arrow W70 are Adaptation Sets in which information relating to the additional silhouette HSI41 and the additional silhouette HSI44 is described, respectively.

Herein, ids of the Adaptation Sets in which information relating to the textures HTX31 to HTX34 is described are hq_tex1 to hq_tex4, respectively, and ids of the Adaptation Sets relating to the depths HDP31 to HDP34 are hq_dep1 to hq_dep4, respectively.

In addition, ids of the Adaptation Sets relating to the silhouettes HSI41 to HSI44 respectively associated with the depth HDP31 to HDP34 are sil1 to sil4, respectively.

Further, in this example, the EssentialProperty or the SupplementalProperty with "schemeIdUri="urn:mpeg:dash:silhouette:2017"" is newly defined as a silhouette descriptor (silhouette descriptor) that is information indicating that the EssentialProperty or the SupplementalProperty is an Adaptation Set relating to a silhouette.

Referring to this silhouette descriptor makes it possible for the client to identify that a Representation in the Adaptation Set including the silhouette descriptor is a Representation in which information relating to the silhouette is described. It is to be noted that the silhouette descriptor may be signaled in the Representation or a SubRepresentation.

For example, the id "sil1" of the Adaptation Set is described in the Adaptation Set indicated by the arrow W69, and the information relating to the silhouette HSI41 is described in this Adaptation Set. Similarly, the id "sil4" of the Adaptation Set is described also in the Adaptation Set indicated by the arrow W70, and information relating to the silhouette HSI44 is described in this Adaptation Set.

In addition, a portion indicated by an arrow A61 in the Adaptation Set indicated by the arrow W69 and a portion indicated by an arrow A62 in the Adaptation Set indicated by the arrow W70 each have an EssentialProperty with "schemeIdUri="urn:mpeg:dash:silhouette:2017"" as a silhouette descriptor.

This makes it possible for the client to figure out that the Adaptation Set indicated by the arrow W69 or the arrow W70 is an Adaptation Set relating to a silhouette included in the BV content.

It is to be noted that, although not illustrated, in a case where silhouette information is included in the depth, the EssentialProperty or the SupplementalProperty with schemeIdUri "schemeIdUri="urn:mpeg:dash:depthwithsilhouette:2017"" may be newly defined as a depth with silhouette descriptor. In this case, the depth with silhouette descriptor makes it possible to signal that an Adaptation Set including the depth with silhouette descriptor is an Adaptation set in which information relating to the depth including the silhouette information is described.

Further, in the example illustrated in FIG. 25, associationId in a Representation and associationType="silh" in a Representation are used to associate a Representation of a silhouette and a Representation of a depth corresponding to the Representation with each other.

Herein, the associationId is information (Id) for correlating (associating) a depth and a silhouette corresponding to each other, that is, a depth and a silhouette that are paired with each other.

In addition, the associationType is information indicating a type of association of a Representation corresponding to a Representation including the associationType. Specifically, "associationType="silh"" herein indicates that the type of association of the Representation is a relationship between a silhouette and a depth.

For example, "hq_dep1_1" is described as an id in a Representation indicated by an arrow A63 in the Adaptation Set indicated by the arrow W67.

Similarly, "hq_dep4_1" is described as an id in a Representation indicated by an arrow A64 in the Adaptation Set indicated by the arrow W68.

In contrast, the associationId "hq_dep1_1" and the associationType "silh" are described in a Representation indicated by an arrow A65 in the Adaptation Set indicated by the arrow W69.

In addition, the associationId "hq_dep4_1" and the associationType "silh" are described in a Representation indicated by an arrow A66 in the Adaptation Set indicated by the arrow W70.

Accordingly, it is possible for the client to identify that the Representation indicated by the arrow A63 in which the id "hq_dep1_1" is described relates to a depth.

In addition, it is possible for the client to identify that the Representation indicated by the arrow A65 in which the associationId "hq_dep1_1" and "associationType="silh"" are described relates to a silhouette associated with the Representation (depth) indicated by the arrow A63. This is because the same id as the id in the Representation indicated by the arrow A63 is described in the Representation indicated by the arrow A65.

Similarly, it is possible for the client to identify that the Representation indicated by the arrow A64 relates to a depth, and to identify that the Representation indicated by the arrow A66 relates to a silhouette associated with the Representation (depth) indicated by the arrow A64.

Using the associationId and the associationType as described above makes it possible for the client to identify the depth and the silhouette associated (correlated) with the depth and acquire the depth and the silhouette.

In a case where the additional silhouette is acquirable in such a manner, for example, the file generation apparatus 11 performs processing similar to the upload processing described with reference to FIG. 10.

However, in the step S13, the MPD file generator 33 generates an MPD file including Adaptation Sets relating to additional textures, additional depths, and additional silhouettes, as illustrated in FIG. 24 and FIG. 25.

Specifically, in this case, as illustrated in FIG. 24 and FIG. 25, the MPD file generator 33 describes the silhouette descriptor in the Adaptation Sets relating to the silhouettes and describes the associationId and the associationType as necessary in the Representations in the Adaptation Sets of the silhouettes.

In addition, in a case where the additional silhouettes are acquirable, the client apparatus 71 performs processing similar to the BV content reproduction processing described with reference to FIG. 12 to reproduce the BV content.

However, in the step S45, the MPD file processor 93 identifies not only the Adaptation Sets and Representations of the BV group but also Adaptation Sets and Representations of BV streams that are allowed to be added to the BV group on the basis of the source_id of the birdview coverage descriptor, the silhouette descriptor, and the like.

Specifically, referring to the associationId and the associationType in the Representations makes it possible for the MPD file processor 93 to identify a Representation of an additional depth and a Representation of an additional silhouette associated with the depth.

It is to be noted that it is possible to identify the Adaptation Set and the Representation of the silhouette by the silhouette descriptor included in the Adaptation Set. Further, in a case where silhouette information is included in a depth, it is possible to identify the Adaptation Set or the Representation of the depth (the depth with a silhouette) including the silhouette information by the above-described depth with silhouette descriptor.

In addition, in the step S46, the MPD file processor 93 selects an Adaptation Set or a Representation of a BV stream to be acquired, from the Adaptation Sets and the Representations included in the BV group and the Adaptation Sets and Representations of additional BV streams.

At this time, the MPD file processor 93 selects an Adaptation Set or a Representation of the BV stream to be acquired, on the basis of the viewpoint position of the user, the transmission band, the birdview coverage descriptor, and the like. For example, it is possible for the MPD file processor 93 to enhance image quality of the BV stream corresponding to the field-of-view region of the user, or in a case where the transmission band has a margin, it is possible for the MPD file processor 93 to select a Representation of an additional texture, an additional depth, or a silhouette corresponding to the field of view of the user.

Second Embodiment

<About BV Group>

It is to be noted that an example in which one BV group includes the texture and the mesh has been described above, but one BV group may include a texture and a depth.

For example, an advantage and disadvantages in a case where one BV group includes a texture and a depth are as follows.

(Advantage 1)

ABV stream of a depth has a small total size necessary for creation of a 3D shape, as compared with a BV stream of a mesh (Disadvantage 1)

Meshing is necessary on the client side; therefore, a processing load on the client side is high.

(Disadvantage 2)

A plurality of depth images is necessary for creation of a 3D shape.

Figure 26:
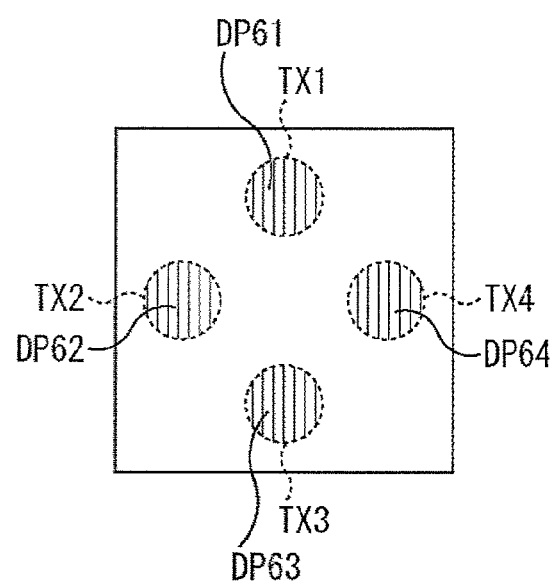
FIG. 26 is a diagram for describing an example of a BV group.

In addition, FIG. 26 illustrates an example of the BV group including the texture and the depth. It is to be noted that, in FIG. 26, portions corresponding to those in FIG. 2 are denoted by the same reference numerals, and description thereof is omitted as appropriate.

In the example in FIG. 26, four textures TX1 to TX4 are located at viewpoint positions that are shifted by 90 degrees to surround a 3D model in space, and four depths DP61 to DP64 are located at the same viewpoint positions as the viewpoint positions of these textures.

That is, the depths DP61 to DP64 have the same viewpoint positions as the textures TX1 to TX4, respectively, and each of the textures TX1 to TX4 is paired with a corresponding one of the depths DP61 to DP64.

Then, one BV group includes the depths DP61 to DP64 and the textures TX1 to TX4, and it is possible to configure a BV content by BV streams included in this BV group.

As in the above-described first embodiment, it is sufficient if an MPD file that is a media presentation management file is used for signaling of such a BV group including the textures and the depths.

Figure 27:
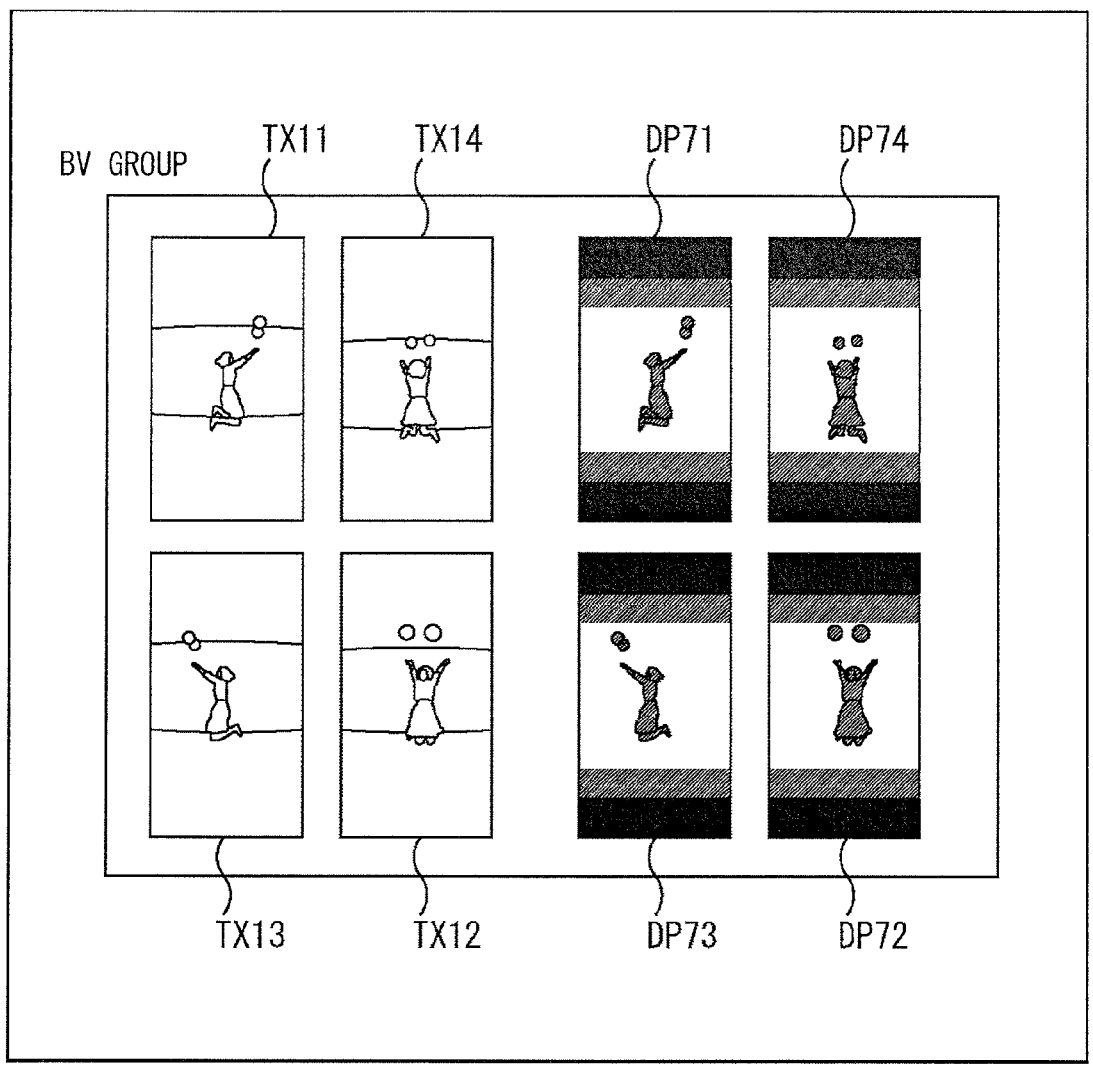
FIG. 27 is a diagram for describing an example of a BV group.

For example, as illustrated in FIG. 27, it is assumed that one BV group includes four textures TX11 to TX14 and four depths DP71 to DP74. In FIG. 27, portions corresponding to those in FIG. 3 are denoted by the same reference numerals, and description thereof is omitted as appropriate.

Herein, the viewpoint positions of the depths DP71 to DP74 are the same as the viewpoint positions of the textures TX11 to TX14, respectively.

In a case where the BV content is distributed with use of MPEG-DASH, it is sufficient if information relating to such a BV group is signaled with an MPD file illustrated in FIG. 28 and FIG. 29, for example.

It is to be noted that FIG. 29 illustrates a remaining portion of the MPD file following a portion of the MPD file illustrated in FIG. 28, that is, a portion illustrated on a lower side in FIG. 28. In FIG. 28 and FIG. 29, in order to make it clear that one MPD file is illustrated by these diagrams, a remark "CONTINUED ON FIG. 29" is illustrated on the lower side in FIG. 28, and a remark "CONTINUED FROM FIG. 28" is illustrated on an upper side in FIG. 29. These remarks "CONTINUED ON FIG. 29" and "CONTINUED FROM FIG. 28" are not actually described in the MPD file.

In addition, in the MPD file illustrated in FIG. 28 and FIG. 29, description of portions similar to those in the example illustrated in FIG. 15 and FIG. 16 is omitted as appropriate to prevent repetition. Further, it is assumed that the textures and the depths herein are individually stored as single track files.

In the MPD file illustrated in FIG. 28 and FIG. 29, a portion indicated by an arrow W91 is a Preselection relating to one BV group.

In addition, an Adaptation Set indicated by each of arrows W92 to W95 is an Adaptation Set relating to a texture or a depth included in the BV group. Then, ids of the Adaptation Sets of the respective BV streams included in one BV group including the Adaptation Sets indicated by the respective arrows W92 to W95 are described in the Preselection indicated by the arrow W91.

Herein, tex1 to tex4 are ids of the Adaptation Sets in which information relating to the textures TX11 to TX14 in FIG. 27 is described. In addition, dep1 to dep4 are ids of the Adaptation Sets in which information relating to the depths DP71 to DP74 in FIG. 27 are described.

For example, in the Adaptation Set indicated by the arrow W92, "tex1" is described as the id of the Adaptation Set, and in the Adaptation Set indicated by the arrow W93, "tex4" is described as the id of the Adaptation Set.

In addition, in the Adaptation Set indicated by the arrow W94, "dep1" is described as the id of the Adaptation Set, and in the Adaptation Set indicated by the arrow W95, "dep4" is described as the id of the Adaptation Set.

Accordingly, it can be seen from "dep1 dep2 dep3 dep4 tex1 tex2 tex3 tex4" described in a preselectionComponents attribute of a Preselection element indicated by the arrow W91 that one BV group includes the textures TX11 to TX14 and the depths DP71 to DP74. In other words, it can be seen that eight Adaptation Sets corresponding to the textures and the depths are grouped as one basic BV group.

In addition, the Preselection indicated by the arrow W91 includes a birdview descriptor and a birdview coverage descriptor similar to those in the Preselection indicated by the arrow W21 in FIG. 15. Similarly, for example, the Adaptation Set indicated by the arrow W92 includes a texture descriptor and a birdview coverage descriptor similar to those in the Adaptation Set indicated by the arrow W22 in FIG. 15.

Further, the Adaptation Set indicated by the arrow W94 and the Adaptation Set indicated by the arrow W95 each include a depth descriptor and a birdview coverage descriptor similar to those in the Adaptation Set indicated by the arrow W27 in FIG. 16.

For example, in the Adaptation Set indicated by the arrow W94, an EssentialProperty indicated by an arrow A81 is a depth descriptor, and a SupplementalProperty indicated by an arrow A82 is a birdview coverage descriptor.

It is to be noted that definitions of the birdview descriptor, the texture descriptor, and the depth descriptor are similar to those in the first embodiment and the modification example 1 of the first embodiment described above. In addition, a definition of the birdview coverage descriptor is similar to that in the modification example 1 of the first embodiment described above.

Even in this example, for each of the textures and the depths included in the BV group, selecting a Representation having an appropriate bit rate, or the like makes it possible for the client to enhance image quality of the textures and the depths in accordance with a transmission band.

In addition, referring to the birdview coverage descriptor makes it possible for the client to enhance image quality of only a texture and a depth corresponding to the field of view of the user.

Further, it is possible for the client to select only a texture and a depth necessary to display the field-of-view range of the user without acquiring all the textures and the depths included in the BV group and to acquire and render the selected texture and the selected depth. This is particularly useful in a case where the transmission band (bandwidth) is limited and it is not possible to acquire all the BV streams included in the BV content.

In a case where the BV group includes the textures and the depths as described above, for example, the file generation apparatus 11 performs processing similar to the upload processing described with reference to FIG. 10.

However, in the step S13, as illustrated in FIG. 28 and FIG. 29, the MPD file generator 33 generates an MPD file including the Adaptation Sets of the textures and the depths.

In addition, in such a case, the client apparatus 71 performs processing similar to the BV content reproduction processing described with reference to FIG. 12 to reproduce the BV content.

It is to be noted that in the step S45, the MPD file processor 93 identifies the Adaptation Sets of the textures and the depths included in the BV group on the basis of the texture descriptor and the depth descriptor.

Then, in the step S46, the MPD file processor 93 selects an Adaptation Set or a Representation of a BV stream to be acquired, from the Adaptation Sets and Representations of the textures and the depths included in the BV group. At this time, the MPD file processor 93 selects an Adaptation Set or a Representation on the basis of the viewpoint position of the user, the transmission band, the birdview coverage descriptor, and the like.

Modification Example 1 of Second Embodiment

<About Acquisition of Additional BV Stream>

It is to be noted that, as described in the second embodiment, in a case where the BV group includes the textures and the depths, in addition to the BV group, it may be also possible to additionally acquire a texture and a depth at a viewpoint position that are not included in the BV group.

In a case where an additional BV stream is acquired in addition to the BV group, it is possible to reproduce a BV content having higher image quality.

In other words, increasing the number of acquirable textures makes it unnecessary to generate a texture in a region outside the displayable region by complementing, which makes it possible to enhance quality of the BV content during rendering. In addition, adding a depth makes it possible to acquire a more accurate 3D shape in a case where the 3D model is constructed.

Figure 30:
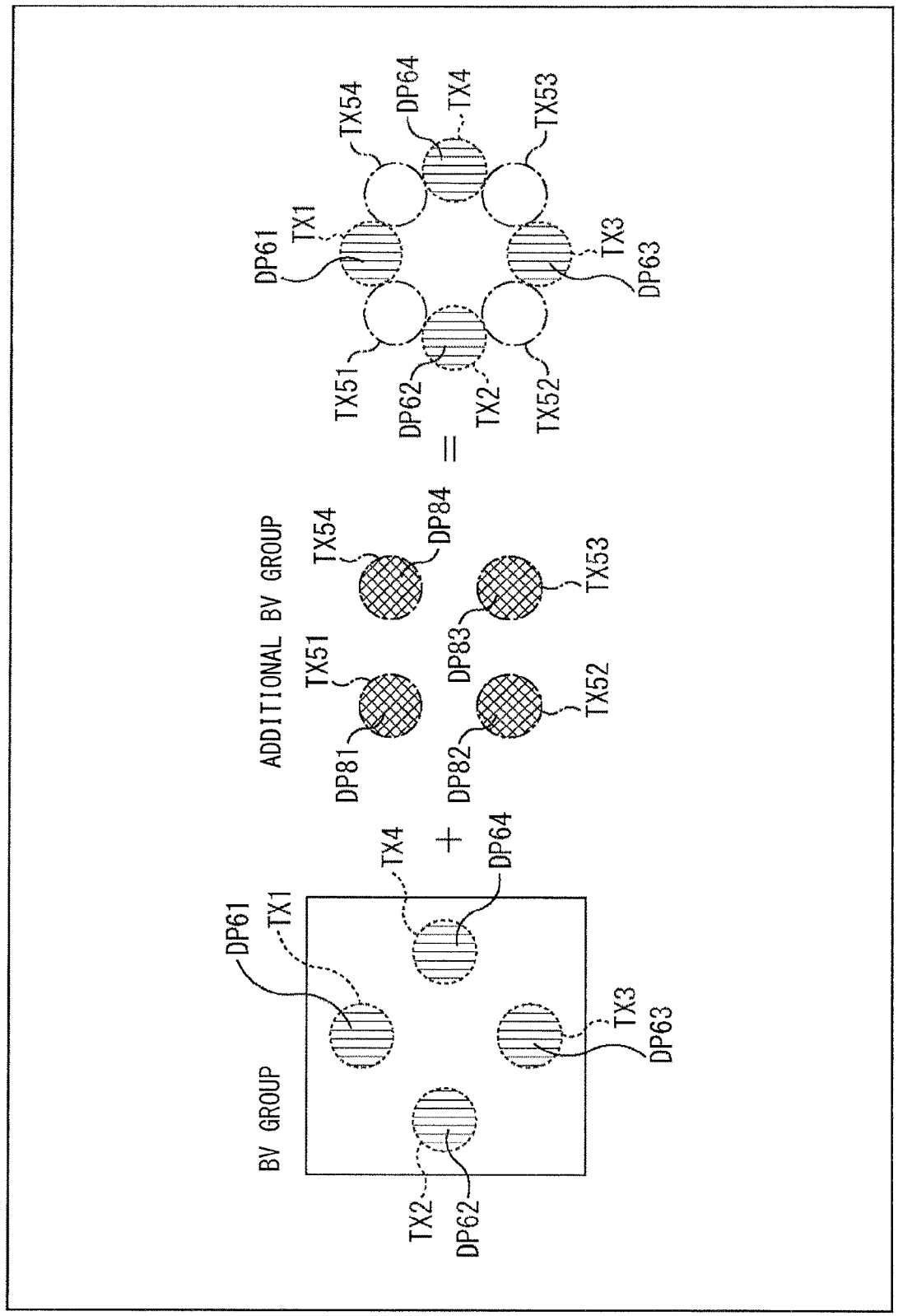
FIG. 30 is a diagram for describing an example of a BV group.

For example, an example illustrated in FIG. 30 is considered in a case where a texture or a depth is additionally acquirable. It is to be noted that, in FIG. 30, portions corresponding to those in FIG. 26 are denoted by the same reference numerals, and description thereof is omitted as appropriate.

In the example in FIG. 30, as illustrated on a left side in the diagram, one BV group includes four textures TX1 to TX4 and four depths DP61 to DP64 at viewpoint positions that are shifted by 90 degrees to surround the 3D model in space.

Further, in addition to the BV streams of the BV group, as illustrated at a center in the diagram, four textures TX51 to TX54 are located at viewpoint positions that are shifted by 90 degrees to surround the 3D model and are different from the viewpoint positions of the textures TX1 to TX4. Further, depths DP81 to DP84 are located at the same viewpoint positions as the viewpoint positions of the textures TX51 to TX54, respectively.

It is possible for the client side to acquire BV streams of the textures TX51 to TX54 and BV streams of the depths DP81 to DP84 as additional BV streams.

In a case where such additionally acquirable textures exist, for example, as illustrated on a right side in the diagram, it becomes possible to use a texture having a coverage (a displayable region) different from the textures of the BV group, which makes it possible to reproduce the BV content having higher image quality.

In particular, in this example, in addition to the textures TX1 to TX4, the texture TX51 to TX54 are acquired, which makes it possible to use textures at more viewpoint positions that surround the 3D model.

In a case where the BV content is distributed with use of MPEG-DASH, in order to also allow for distribution of the additional BV streams as described above, it is sufficient if the MPD file is used for signaling of information relating to the additional BV streams.

Figure 31:
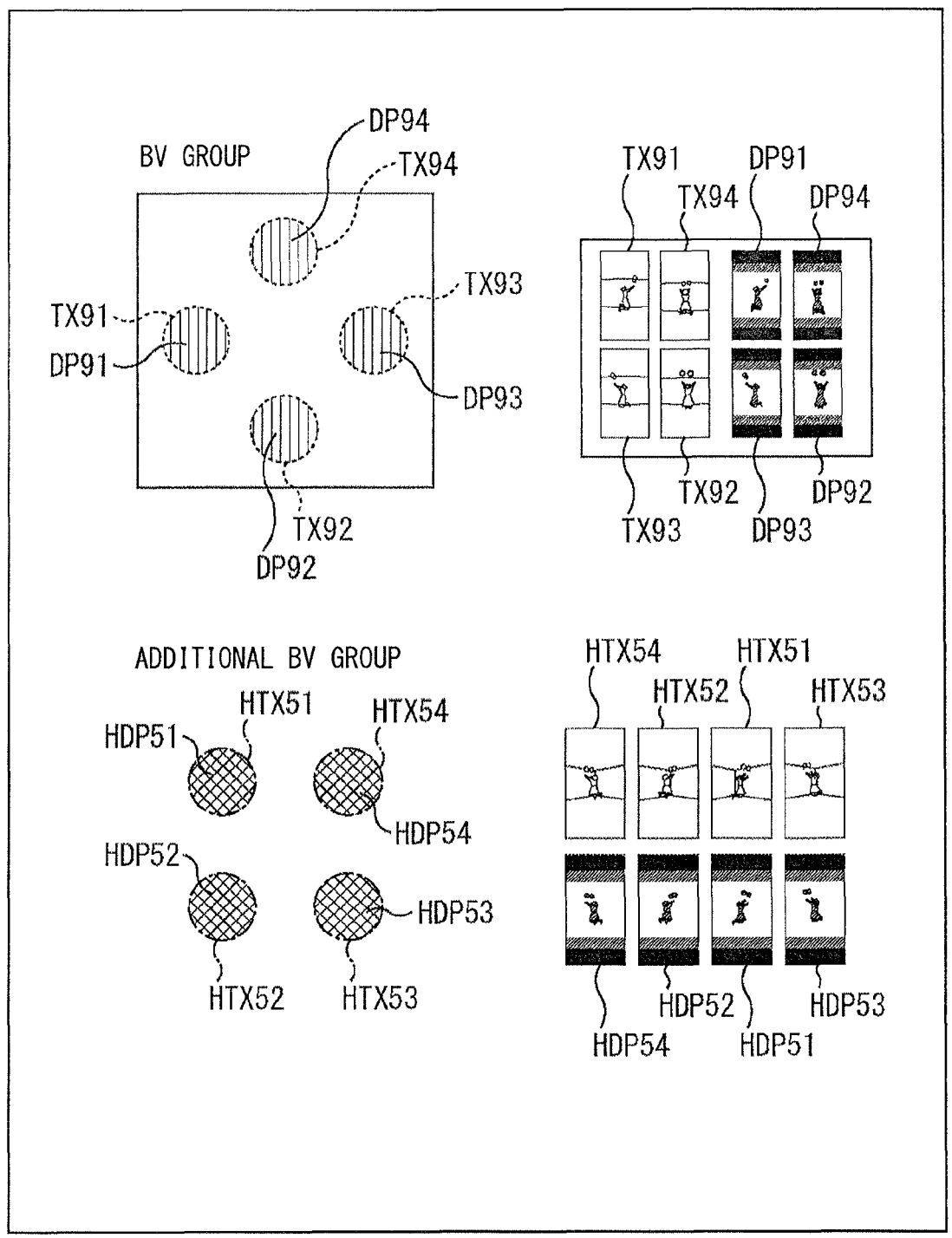
FIG. 31 is a diagram for describing an example of a BV group.

For example, as illustrated in FIG. 31, it is assumed that one BV group includes four textures TX91 to TX94 and four depths DP91 to DP94.

In addition, it is assumed that BV streams of additional textures HTX51 to HTX54 at viewpoint positions different from viewpoint positions of the respective textures TX91 to TX94 are additionally acquirable. Further, it is assumed that BV streams of the additional depths HDP51 to HDP54 respectively located at the same viewpoint positions as the viewpoint positions of the respective textures HTX51 to HTX54 are also acquirable.

It is to be noted that, in FIG. 31, a circle drawn on a left side in the diagram represents a viewpoint position of each BV stream, that is, each of the textures and the depths.

As described above, in a case where one BV group includes the textures TX91 to TX94 and the depths DP91 to DP94, and the textures HTX51 to HTX54 and the depths HDP51 to HDP54 are additionally acquirable for the BV group, for example, the MPD file is as illustrated in FIG. 32 and FIG. 33.

It is to be noted that FIG. 33 illustrates a remaining portion of the MPD file following a portion of the MPD file illustrated in FIG. 32, that is, a portion illustrated on a lower side in FIG. 32. In FIG. 32 and FIG. 33, in order to make it clear that one MPD file is illustrated by these diagrams, a remark "CONTINUED ON FIG. 33" is illustrated on the lower side in FIG. 32, and a remark "CONTINUED FROM FIG. 32" is illustrated on an upper side in FIG. 33. These remarks "CONTINUED ON FIG. 33" and "CONTINUED FROM FIG. 32" are not actually described in the MPD file.

In addition, in the MPD file illustrated in FIG. 32 and FIG. 33, description of portions similar to those in the example illustrated in FIG. 15 and FIG. 16 is omitted as appropriate to prevent repetition. Further, it is assumed that the textures and the depths herein are individually stored as single track files.

In the MPD file illustrated in FIG. 32 and FIG. 33, a portion indicated by an arrow W111 is a Preselection relating to one BV group.

In addition, an Adaptation Set indicated by each of arrows W112 to W115 is an Adaptation Set relating to a texture or a depth included in the BV group. Then, ids of the Adaptation Sets of respective BV streams included in one BV group including the Adaptation Sets indicated by the arrows W112 to W114 are described in the Preselection indicated by the arrow W111.

Herein, tex1 to tex4 are ids of the Adaptation Sets in which information relating to the textures TX91 to TX94 in FIG. 31 is described. In addition, dep1 to dep4 are ids of the Adaptation Sets in which information relating to the depths DP91 to DP94 in FIG. 31 is described.

Accordingly, it can be seen from "dep1 dep2 dep3 dep4 tex1 tex2 tex3 tex4" described in a preselectionComponents attribute of a Preselection element indicated by the arrow W111 that one BV group includes the textures TX91 to TX94 and the depths DP91 to DP94.

Further, an Adaptation Set indicated by each of arrows W116 to W119 is an Adaptation Set in which information relating to an additional BV stream for enhancement of image quality is described.

For example, ids of the Adaptation Sets in which information relating to the textures HTX51 to HTX54 illustrated in FIG. 31 is described are hq_tex1 to hq_tex4. Further, ids of Adaptation Sets in which information relating to the depths HDP51 to HDP54 illustrated in FIG. 31 is described are hq_dep1 to hq_dep4.

It is to be noted that, in the example illustrated in FIG. 32 and FIG. 33, definitions of the birdview descriptor, the texture descriptor, and the depth descriptor are similar to those in the first embodiment and the modification example 1 of the first embodiment described above. In addition, a definition of the birdview coverage descriptor is similar to that in the modification example 1 of the first embodiment, that is, in FIG. 15 and FIG. 16.

The Preselection indicated by the arrow W111 includes a birdview descriptor and a birdview coverage descriptor similar to those in the Preselection indicated by the arrow W21 in FIG. 15. In particular, a portion indicated by an arrow A101 in the Preselection indicated by the arrow W111 is a birdview coverage descriptor, and this birdview coverage descriptor includes "1" as a source_id indicating a source (material) of the BV stream to be referred to.

Further, each of the Adaptation Sets indicated by the arrow W112, the arrow W113, the arrow W116, and the arrow W117 that are Adaptation Sets relating to the textures includes a texture descriptor. Similarly, each of Adaptation Sets indicated by the arrow W114, the arrow W115, the arrow W118, and the arrow W119 that are Adaptation Sets relating to the depths includes a depth descriptor.

Further, each of portions indicated by arrows A102 to A109 in the Adaptation Sets indicated by the arrows W112 to W119 is a birdview coverage descriptor, and the birdview coverage descriptors each include "1" as the source_id.

Accordingly, it is possible for the client side to identify (specify) that combining the textures and the depths corresponding to the Adaptation Sets indicated by the respective arrows W112 to W119 makes it possible to configure one BV content. At this time, for example, selecting and acquiring additional BV streams having the same source_id, that is, an additional texture and an additional depth in addition to the BV streams of the BV group in accordance with the field of view of the user makes it possible to achieve reproduction of the BV content having higher image quality.

In a case where the additional BV streams are acquirable as described above, for example, the file generation apparatus 11 performs processing similar to the upload processing described with reference to FIG. 10.

However, in the step S13, the MPD file generator 33 generates an MPD file including Adaptation Sets relating to additional textures and additional depths, as illustrated in FIG. 32 and FIG. 33. In addition, the MPD file generator 33 generates a birdview coverage descriptor including the source_id as illustrated in FIG. 32 and FIG. 33, and describes the birdview coverage descriptor in a Preselection or an Adaptation Set.

Further, in a case where additional BV streams are acquirable, the client apparatus 71 performs processing similar to the BV content reproduction processing described with reference to FIG. 12 to reproduce the BV content.

However, in the step S45, the MPD file processor 93 identifies not only the Adaptation Sets and the Representations of the BV group but also the Adaptation Sets and Representations of BV streams that are allowed to be added to the BV group on the basis of the source_id of the birdview coverage descriptor.

In addition, in the step S46, the MPD file processor 93 selects an Adaptation Set or a Representation of a BV stream to be acquired, from the Adaptation Sets and the Representations included in the BV group and the Adaptation Sets and the Representation of additional BV streams.

At this time, the MPD file processor 93 selects the Adaptation Set or the Representation on the basis of the viewpoint position of the user, the transmission band, and information (parameters) indicating the source_id and the displayable region included in the value of the birdview coverage descriptor, and the like.

It is to be noted that, even in the second embodiment and the modification example 1 of the second embodiment described above, it may also be possible to acquire a silhouette associated with a depth, as in the modification example 3 of the first embodiment. In such a case, an Adaptation Set relating to the silhouette is described in the MPD file.

In addition, in the first embodiment and the second embodiment, grouping in the BV group may be performed with use of a Viewpoint element of an Adaptation Set instead of the Preselection. At this time, "shcemeIdUri="urn:mpeg:dash:bvgroup:2017"" is used in a Viewpoint. In this case, Adaptation Sets of which the Viewpoints have the same value indicate that the Adaptation Sets are BV streams that are allowed to configure the same BV content.

Further, in the modification example 1 of the first embodiment and the modification example 1 of the second embodiment, a BV stream that is allowed to be added to the BV group signaled in the Preselection is associated by the source_id in the value of the birdview coverage descriptor. However, instead of the source_id, the BV stream may be associated by a preselection id indicating an id of a Preselection of the BV group to which the BV stream is allowed to be added.

For example, in the example illustrated in FIG. 15, "bv_base" in the Preselection is the selection_id, and including this selection_id in the birdview coverage descriptor makes it possible to associate the BV streams of the BV group and the additional BV stream with each other.

Further, in the first embodiment, the modification example 1 of the first embodiment, the second embodiment, and the modification example 1 of the second embodiment, information equivalent to the birdview coverage descriptor may be signaled with use of a Viewpoint element of the Preselection or a Viewpoint element of the Adaptation Set instead of the SupplementalProperty and the EssentialProperty. At this time, semantics of schemeIdUri of the Viewpoint and the value of the Viewpoint are similar to those of the birdview coverage descriptor described above.

In addition in a case where the texture and the mesh or the texture and the depth are stored in one track of a file relating to the BV content and it is possible to configure the BV content with one Adaptation Set, the birdview descriptor may be signaled in the Adaptation Set.

As described above, according to the present technology described in the first embodiment to the modification example 1 of the second embodiment, it is possible to group respective types of BV streams such as the texture, the mesh, and the depth in a DASH MPD layer, that is, an MPD file and signal the BV group. This makes it possible for the client to easily select and acquire a BV stream necessary for viewing of the BV content.

Further, image quality of the BV streams of the BV group is adaptively changeable in accordance with the transmission band, and it is possible to effectively use the transmission band (bandwidth).

In addition, adding the displayable region information of the BV stream makes it possible to acquire a necessary additional BV stream in accordance with the field of view of the user, and makes it possible to construct a 3D model partially having high image quality with the BV streams of the BV group and the additional BV stream.

Third Embodiment

<About Signaling of BV Group>

Incidentally, a method of grouping BV streams included in the BV content in the DASH MPD layer has been described above. However, it is also possible to perform such grouping of the BV streams in an ISOBMFF layer.

Hereinafter, a case where a BV content is stored in ISOBMFF, and BV streams are grouped in an ISOBMFF layer is described below as an example.

Figure 34:
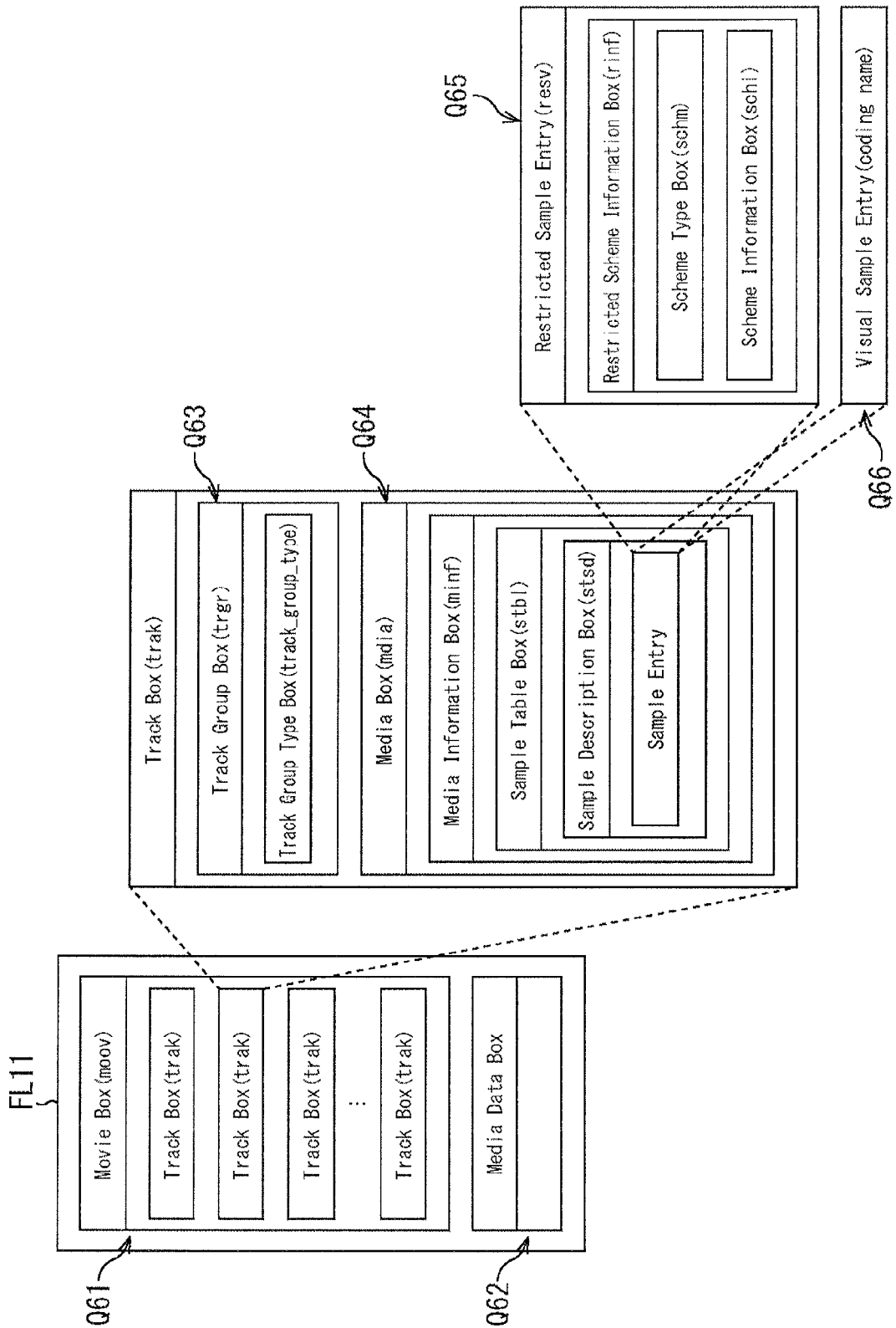
FIG. 34 is a diagram illustrating a file format example.

In such a case, a file in which the BV content is stored has a format as illustrated in FIG. 34, for example.

In FIG. 34, a file FL11 is a file for reproduction of the BV content, and the file FL11 is, for example, an MP4 file based on ISOBMFF.

In this example, the file FL11 includes a Movie Box (movie box) indicated by an arrow Q61 and a Media Data Box (media data box) indicated by an arrow Q62.

The Media Data Box is a data region in which a BV stream for reproduction of the BV content is stored, and a BV stream referred to by one or a plurality of tracks (tracks) is stored in the Media Data Box. Then, one or a plurality of BV streams is referred to by one track. Hereinafter, referring to the BV stream stored in the Media Data Box by the track is also referred to as storing the BV stream by the track.

It is to be noted that one type of BV stream out of a plurality of types such as a texture and a depth may be stored in one track, or two or more types of BV streams may be stored in one track.

The Movie Box (moov) is a region in which information relating to each track in the Media Data Box is stored. The information herein is meta information relating to a BV content stored in the Media Data Box. In other words, the Movie Box is a management region in which media presentation management information for management of the BV content is stored.

More specifically, a Track Box (trak) in which information relating to the track is stored in the Movie Box, and herein, one Track Box is provided for one track.

Then, in the Track Box, for example, a Track Group Box (trgr) indicated by an arrow Q63 and a Media Box (mdia) indicated by an arrow Q64 are stored.

The Track Group Box is a region in which information relating to a track group (track group) including one or a plurality of tracks is stored, and the track is grouped by this Track Group Box, and common information is signaled in a group.

A Track Group Type Box (track_group_type) is stored in the Track Group Box. The Track Group Type Box is defined in ISOBMFF, and is used as a tool for grouping a plurality of tracks having the same characteristics.

A Media Information Box (minf) is stored in the Media Box indicated by the arrow Q64, and a Sample Table Box (stbl) for management of information such as time and an address of a BV stream to be referred to by the track is stored in the Media Information Box.

A Sample Description Box (stsd) is stored in the Sample Table Box. Further, a Sample Entry is stored in the Sample Description Box.

This Sample Entry includes a Restricted Sample Entry (resv) indicated by an arrow Q65 and a Visual Sample Entry (coding name) indicated by an arrow Q66. In other words, types of the Sample Entry include the Restricted Sample Entry and the Visual Sample Entry.

A Restricted Scheme Information Box (rinf) is stored in the Restricted Sample Entry, and this Restricted Scheme Information Box is a region in which information to be used in post-processing after decoding (decoding) of the BV stream is stored.

Herein, a Scheme Type Box (schm) and a Scheme Information Box (schi) are stored in the Restricted Scheme Information Box, and in particular, the information to be used in the post-processing after decoding of the BV stream is stored in the Scheme Information Box.

In addition, the Visual Sample Entry (coding name) indicated by the arrow Q66 is information determined for each video codec, and is, for example, hvc1 or the like in a case of HEVC. Information of a video sequence stored from the track is stored in this Visual Sample Entry.

Herein, in the file in the format illustrated in FIG. 34, it is considered that a BV stream included in a BV group is signaled.

In the present technology, in the file in the format illustrated in FIG. 34, a Birdview Group Box obtained by extending the Track Group Type Box is newly defined in order to signal that a texture or a depth stored in a track is included in a BV content.

In the example illustrated in FIG. 34, the Birdview Group Box obtained by extending the Track Group Type Box is stored in the Track Group Box.

That is, the Birdview Group Box is stored only in the Track Box corresponding to the track in which the BV stream included in the BV content is stored.

Accordingly, referring to the Birdview Group Box in the Track Box makes it possible for the client to identify in which track the BV stream of the BV content is stored.

It is to be noted that only the texture or the depth may be stored in one track, or both the texture and the depth may be stored in one track.

Herein, FIG. 35 illustrates a syntax and semantics of the Track Group Type Box.

In FIG. 35, a portion indicated by an arrow Q81 indicates the syntax of the Track Group Type Box, and a portion indicated by an arrow Q82 indicates the semantics of the Track Group Type Box.

The Track Group Type Box is defined by ISOBMFF, and is a tool for grouping of a plurality of tracks having the same characteristics. Herein, characteristics (particular characteristics) of the track include, for example, a characteristic in which the track belongs to a predetermined group (track group) including tracks that are possibly reproduced simultaneously.

The Track Group Type Box includes a track_group_id that is information indicating characteristics of the track corresponding to the Track Group Type Box, more specifically, the Track Box in which the Track Group Type Box is stored. That is, the track_group_id is an id of a track group to which the track belongs.

Accordingly, this means that tracks having the same track_group_type indicating the type (kind) of the track group and having the same track_group_id belong to the same track group.

As described above, in the present technology, the BV streams included in the BV group are grouped by the Birdview Group Box obtained by extending this Track Group Type Box.

FIG. 36 illustrates a syntax of a Birdview Group Box obtained by extending the Track Group Type Box illustrated in FIG. 35.

In an example illustrated in FIG. 36, the track_group_type is ""bvgp"" as indicated by an arrow Q91, and this track_group_type indicates that the type of track group is a track group including tracks in which BV streams included in a BV group are stored.

In addition, the track_group_id described above is stored in the Birdview Group Box illustrated in FIG. 36. This means that the BV streams stored in the tracks belonging to the Birdview Group Box and having the same track_group_id are included in the same BV content.

This makes it possible for the client to identify the tracks in which the BV streams included in the same BV content are stored, by the presence or absence of the Birdview Group Box in the Track Box and the track_group_id included in the Birdview Group Box.

In other words, it is possible for the client to identify the BV streams of the same BV content, that is, the BV streams included in the BV group, by whether or not the Birdview Group Box is stored in the Track Box, and the track_group_id in the Birdview Group Box. It can be said from this that the Birdview Group Box is information indicating a track in which BV streams for reproduction of the same BV content are stored, that is, group information indicating a plurality of BV streams for configuration of the same 3D model.

The file having such a configuration makes it possible to encode and decode a BV stream with use of a typical, that is, general-purpose codec such as HEVC and AVC, for example, and to achieve grouping of BV streams with which the BV content is reproducible. That is, it is possible to appropriately reproduce the BV content.

It is to be noted that it is possible to store any box in the Birdview Group Box illustrated in FIG. 36. Accordingly, for example, a Birdview Coverage Information Box as illustrated in FIG. 37 may be newly defined as displayable region information of the BV content and stored in the Birdview Group Box.

In FIG. 37, a portion indicated by an arrow Q101 indicates a syntax of the Birdview Coverage Information Box, and a portion indicated by an arrow Q102 indicates semantics of the Birdview Coverage Information Box.

The Birdview Coverage Information Box is information indicating the displayable region of the BV content, and corresponds to the birdview coverage descriptor described above.

Herein, the Birdview Coverage Information Box includes "pos_x", "pos_y", "pos_z", "center_yaw", "center_pitch", "center_roll", "hor_range", and "ver_range" as information (parameters) indicating a displayable region.

Specifically, a parameter "pos_x" indicates an x-coordinate of a center position of a 3D model in space. In addition, a parameter "pos_y" indicates a y-coordinate of the center position of the 3D model in space, and a parameter "pos_z" indicates a z-coordinate of the center position of the 3D model in space.

These parameters pos_x, pos_y, and pos_z correspond to the parameters x, y, and z of the birdview coverage descriptor illustrated in FIG. 7.

In addition, a parameter "center_yaw" indicates a yaw angle (yaw angle) indicating a center position of a displayable region as viewed from the center position of the 3D model. A parameter "center_pitch" indicates a pitch angle (pitch angle) indicating the center position of the displayable region as viewed from the center position of the 3D model, and a parameter "center_roll" indicates a roll angle (roll angle) of the center position of the displayable region as viewed from the center position of the 3D model, that is, a rotation angle of the displayable region.

Further, a parameter "hor_range" indicates a horizontal angle range of the displayable region as viewed from the center position of the 3D model, and a parameter "ver_range" indicates a vertical angle range of the displayable region as viewed from the center position of the 3D model.

These parameters center_yaw, center_pitch, center_roll, hor_range, and ver_range are the same as those in the birdview coverage descriptor illustrated in FIG. 7.

Accordingly, referring to the respective parameters signaled in the Birdview Coverage Information Box makes it possible for the client to specify (identify) the displayable region of the BV content.

It is to be noted that, a case where the Birdview Coverage Information Box is not signaled in the Birdview Group Box, that is, a case where the Birdview Coverage Information Box is not stored may indicate that the BV content covers an entire circumference as the displayable region.

In addition, for example, in some cases, BV streams of a plurality of BV contents having displayable regions different from each other are stored in the file. In such a case, referring to the Birdview Coverage Information Box makes it possible for the client to select an appropriate BV content, that is, an appropriate group of BV streams corresponding to the field of view of the user from the plurality of BV contents, and reproduce the BV content.

<About Operations of File Generation Apparatus and Client Apparatus>

As described above, in a case where grouping of the BV streams is performed in the ISOBMFF layer, for example, the file generation apparatus 11 performs processing similar to the upload processing described with reference to FIG. 10.

Note that, in the step S12, the segment file generator 43 files encoded data of the BV streams supplied from the encoder 42 on the basis of metadata or the like supplied from the data input unit 31 to generate a file in the format illustrated in FIG. 34. At this time, the Birdview Group Box illustrated in FIG. 36 and the Birdview Coverage Information Box illustrated in FIG. 37 are stored in the generated file.

Upon generating such a file, the segment file generator 43 generates a segment file on the basis of the acquired file, and supplies the segment file to the recording unit 34.

In addition, in the step S13, the MPD file described in the first embodiment, the second embodiment, or the like may be generated, or a typical MPD file may be generated.

After the segment file and MPD file are generated in such a manner, processing in the steps S14 and S15 is performed to upload the segment file and the MPD file, and the upload processing ends.

It is to be noted that an example in which the file of the BV content is distributed with use of MPEG-DASH is described herein, but the generated file of the BV content may be stored in a removable recording medium or the like.

Figure 38:
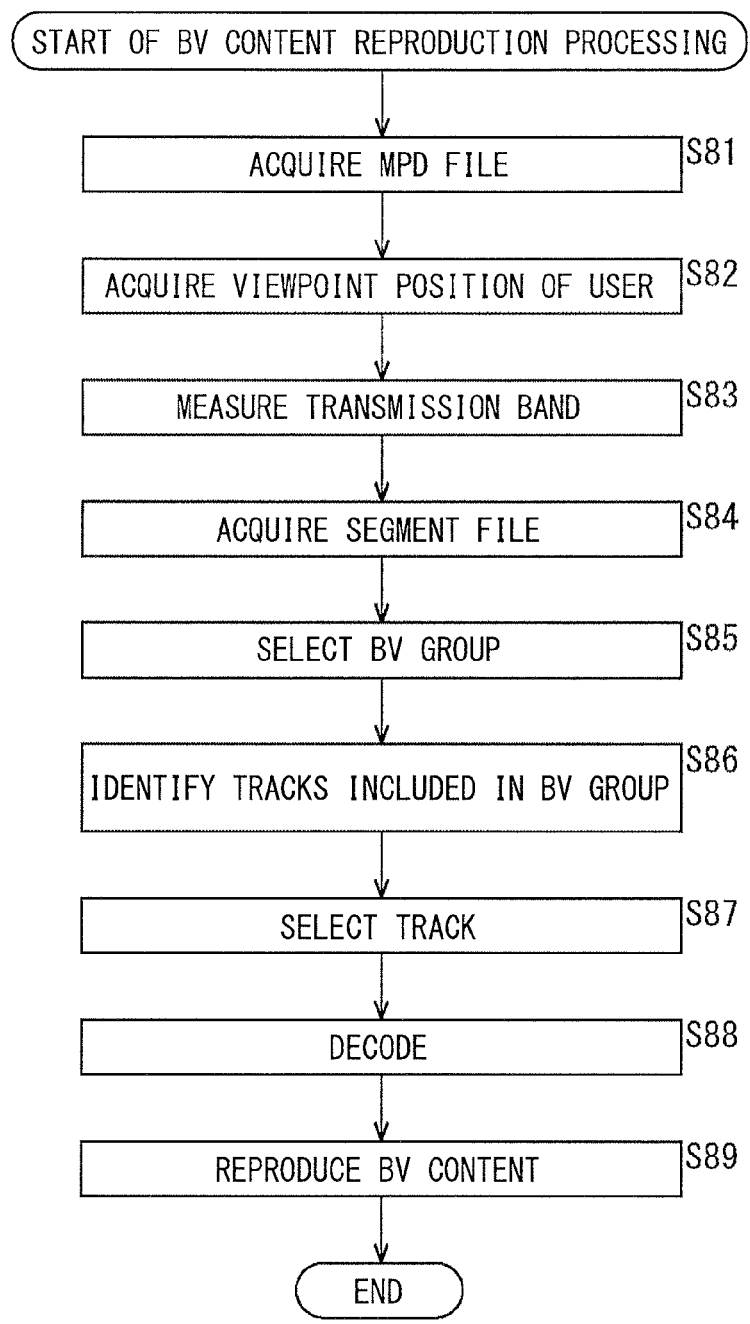
FIG. 38 is a flowchart for describing BV content reproduction processing.

In addition, in a case where grouping of the BV streams is performed in the ISOBMFF layer, for example, the client apparatus 71 performs BV content reproduction processing illustrated in FIG. 38. Hereinafter, description is given of the BV content reproduction processing performed by the client apparatus 71 with reference to a flowchart in FIG. 38.

It is to be noted that processing in steps S81 to S83 is similar to that in the steps S41 to S43 in FIG. 12, and description thereof is omitted.

In step S84, the segment file acquisition unit 94 performs processing similar to that in the step S47 in FIG. 12 to acquire, from the server, the segment file in which the BV streams are stored, and supplies the acquired segment file to the segment file processor 111.

At this time, for example, the MPD file processor 93 selects a Representation to be acquired on the basis of the MPD file supplied from the MPD file acquisition unit 92, a result of measurement of the transmission band, and the like, and supplies a result of such selection to the segment file acquisition unit 94. Herein, for example, basically, all the Adaptation Sets are selected as the Adaptation Sets to be acquired, and a Representation having a bit rate corresponding to the result of measurement of the transmission band or the like is selected for each Adaptation Set.

Then, on the basis of the result of selection supplied from the MPD file processor 93, the segment file acquisition unit 94 acquires the segment file in accordance with the result of selection.

Thus, for example, the segment file generated on the basis of the file in the format illustrated in FIG. 34 is acquired.

It is to be noted that an example in which a file of the BV content is distributed with use of MPEG-DASH is described herein. However, it is needless to say that the file of the BV content may be downloaded not in a streaming format but at once from the server, or may be read from a hard disk, a removable recording medium, or the like.

In step S85, on the basis of the segment file supplied from the segment file acquisition unit 94, that is, the file of the BV content, the segment file processor 111 selects a BV group including the BV streams stored in the file.

For example, the segment file processor 111 identifies the BV content including the BV streams stored in the file, that is, the BV group by referring to the Birdview Group Box in the file of the BV content.

Specifically, the segment file processor 111 identifies, as BV streams included in one BV group, BV streams stored in tracks in which the Birdview Group Box is signaled and that have the same track_group_id.

The segment file processor 111 selects a BV content to be reproduced from the identified BV contents (BV groups).

At this time, the segment file processor 111 may refer to the Birdview Coverage Information Box stored in the Birdview Group Box, for example, and select a BV group that allows for displaying of a region corresponding to the field of view of the user, that is, a BV group in which the field-of-view region of the user is included in the displayable region.

In step S86, the segment file processor 111 identifies the tracks included in the same BV group selected in the step S85. That is, as described above, the BV streams stored in the tracks having the same track_group_id are identified as the BV streams included in one BV group. At this time, it is possible to identify the type of each track, that is, the type of BV stream stored in the track and a region in which each BV stream is stored, for example, by a Birdview Information Box described later.

In step S87, the segment file processor 111 selects a track to be used for reproduction of the BV content, extracts the encoded BV stream from the selected track in the file of the BV content acquired in the step S84, and supplies the BV stream to the decoder 112. At this time, for example, one or a plurality of tracks included in the BV group selected in the step S85 is all selected. It can be said that selecting the track in such a manner is selecting the BV stream to be used for reproduction of the BV content.

After the coded BV stream is extracted, processing in steps S88 and S89 is performed, and the BV content reproduction processing ends; however, the processing is similar to that in the steps S49 and S50 in FIG. 12, and description thereof is omitted.

As described above, the client apparatus 71 refers to the Birdview Group Box of the acquired file to identify the track in the file, that is, the BV group (the BV content) including the BV streams.

Doing so make is it possible to easily identify the BV group including BV streams encoded by the general-purpose codec even in the file in ISOBMFF. This makes it possible to appropriately reproduce the BV content.

Modification Example 1 of Third Embodiment

<About Signaling of BV-Stream Information Stored in Track>

Incidentally, in the file in the format (format) described in the third embodiment, BV streams of the texture and the depth are stored in the tracks, and the following three methods are considered as variations of a method of storing the BV streams in the tracks.

First, a first method is a method in which each texture is individually stored in the track, and each depth is also individually stored in the track.

In addition, the second method is a method in which only a plurality of textures is packed in one image and stored in a track, and similarly, only a plurality of depths are packed in one image and stored in a track.

The third method is a method in which a plurality of textures and a plurality of depths are packed in one image and stored in one track.

The second method and the third method are methods in which a plurality of BV streams that are basically image information are located side by side, one image is formed by synthesizing the BV streams located side by side, and the acquired image is stored in one track.

Figure 39:
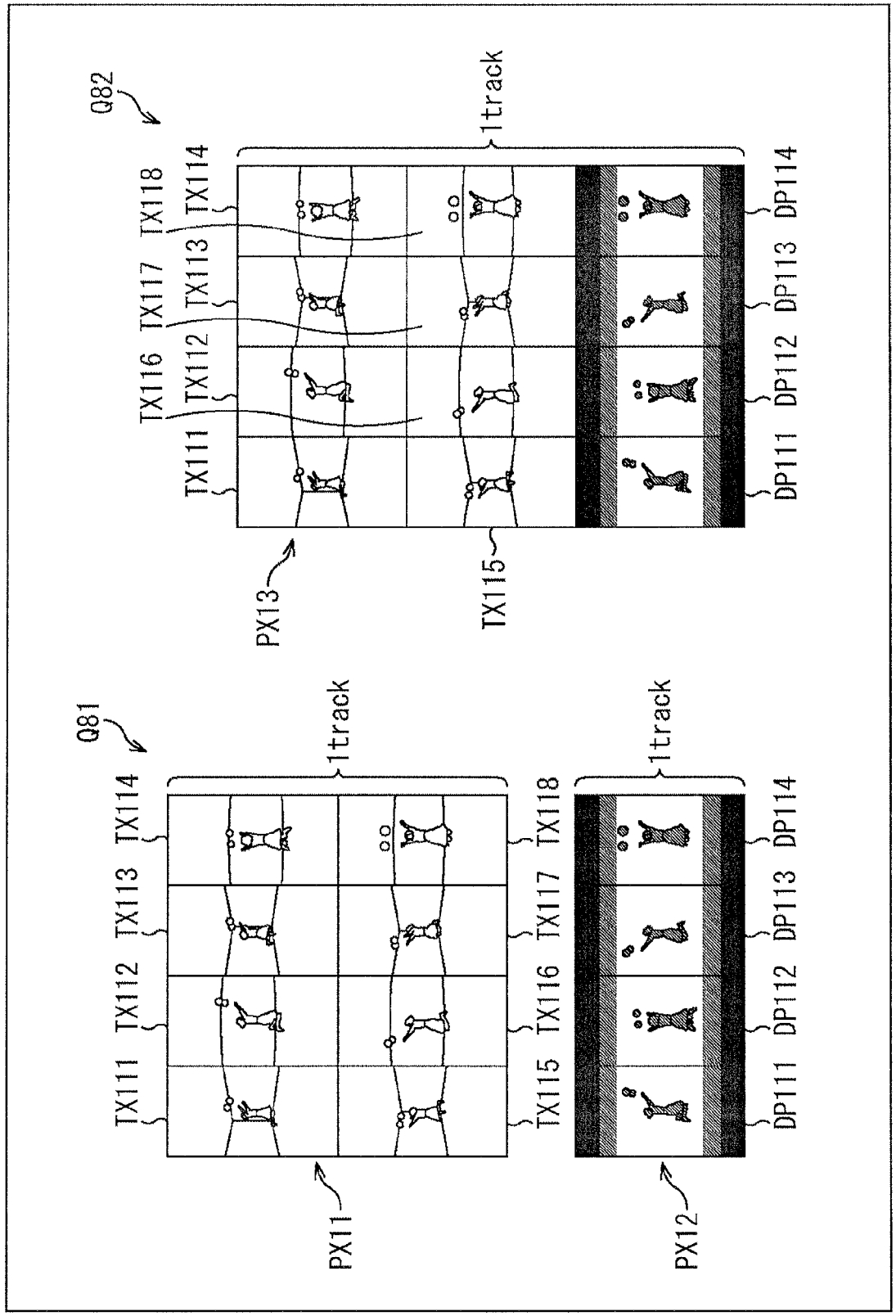
FIG. 39 is a diagram for describing packing of BV streams.

Herein, FIG. 39 illustrates specific examples of the second method and the third method.

In FIG. 39, a portion indicated by an arrow Q81 illustrates the second method, and a portion indicated by the arrow Q82 illustrates the third method.

In other words, in the second method, eight textures TX111 to TX118 are located side by side and synthesized as indicated by the arrow Q81 to form one image PX11. In other words, the textures TX111 to TX118 are packed in one image PX11.

Then, the thus-acquired image PX11 is stored in one track.

Four depths DP111 to DP114 are located side by side and synthesized to form one image PX12, and this image PX12 is stored in one track.

In contrast, in the third method, eight textures TX111 to TX118 and four depths DP111 to DP114 are located side by side and synthesized to form one image PX13, and this image PX13 is stored in one track.

It is to be noted that, hereinafter, one image that is acquired by packing textures and depths and is stored in a track is also referred to as a stored image. In addition, a region of one BV stream on the stored image, that is, a region of an image of one BV stream such as a texture or a depth is also referred to as an image region.

As described above, textures and depths are located side by side and synthesized, which makes it possible to store the textures and the depths in a track as one image. More specifically, upon encoding the BV streams, the stored image is encoded by a predetermined encoding system, and resultant encoded data is stored in a track. In addition, upon decoding the BV stream, the encoded data of the stored image is decoded, and the BV streams are extracted from the acquired stored image. This makes it possible for the server and the client to encode and decode the stored image, that is, the textures and the depths included in the stored image, by a general-purpose encoding system (codec) such as HEVC and AVC.

For example, in a case where a plurality of textures and a plurality of depths are collectively stored in a track as in the second method and the third method, scalability during stream acquisition is lost, but there is an advantage that it is possible to reduce the number of streams to be acquired and reduce network-processing overhead. That is, a plurality of BV streams are stored in one track; therefore, it is not possible to selectively acquire some of the BV streams, but it is possible to acquire a plurality of BV streams in one process.

In the present technology, the Birdview Information Box is newly defined in order to signal information of the BV streams stored in the track in consideration of three cases, that is, the first to third methods described above.

This Birdview Information Box is information to be used during rendering after decoding of the BV streams, and signals information indicating how the textures and depths are packed in the streams stored in the track.

For example, in the file illustrated in FIG. 34, the Birdview Information Box is stored in a Restricted Scheme Information Box ('rinf') or a Scheme Information Box ('schi') defined in ISOBMFF.

Herein, FIG. 40 illustrates a syntax example of the Birdview Information Box, and FIG. 41 illustrates semantics of the Birdview Information Box.

In the example illustrated in FIG. 40, the Birdview Information Box includes parameters stream_num, streams_type, stream_left[i], stream_top[i], stream_width[i], stream_height[i], stream_type[i], IntrinsicCameraParameters(i), and ExtrinsicCameraParametersBox(i).

As illustrated in FIG. 41, the stream_num indicates the total number of textures and depths included in the track, that is, the total number of BV streams included in the stored image.

The streams_type indicates image configuration information of the stored image stored in the track.

That is, herein, a case where a value of the streams_type is 0 indicates that both textures and depths exist in the track. That is, the stored image stored in the track include, for example, textures and depths as indicated by the arrow Q82 in FIG. 39.

A case where the value of the streams_type is 1 indicates that only textures exist in the track, and a case where the value of the streams_type is 2 indicates that only depths exist in the track. A value "3" of the streams_type is reserved.

In particular, in a case where the value of the streams_type is 1 or 2, the streams_type is information indicating the type of each of the BV streams in the stored image.

The stream_left[i] indicates a horizontal position of an upper left pixel of each of the image regions of the textures and the depths packed in the stored image in the track. The stream_top[i] indicates a vertical position of the upper left pixel of each of the image regions of the textures and depths packed in the stored image in the track.

The stream_width[i] indicates a width of each of the image regions of the textures and the depths packed in the stored image in the track. In addition, the stream_height[i] indicates a height of each of the image regions of the textures and the depths packed in the stored image in the track.

It is possible to specify a position and a size of each of the image regions of the textures and the depths in the stored image, that is, to specify which region is the image region by the stream_left[i], the stream_top[i], the stream_width[i], and the stream_height[i] described above. Accordingly, it can be said that the stream_left[i], the stream_top[i], the stream_width[i], and the stream_height[i] is information for specifying each of the image regions of the BV streams on the stored image.

The stream_type[i] is information indicating the type of each of the image regions packed in the stored image in the track, that is, the type of each of the BV streams located in the image regions. For example, a case where a value of the stream_type[i] is 0 indicates that the image region is an image region of a texture, and a case where the value of the stream_type[i] is 1 indicates that the image region is an image region of a depth. Values other than 0 and 1 of the stream_type[i] are reserved.

It is to be noted that the stream_type[i] is stored in the Birdview Information Box only in a case where the value of the stream_type is 0, that is, in a case where the image regions of the textures and the image regions of the depths are mixed on the stored image.

The IntrinsicCameraParameters(i) indicates an intrinsic camera parameter such as focal lengths and principal point information for the textures and the depths packed in the stored image in the track. The IntrinsicCameraParameters(i) is, for example, information of Multiview acquisition information SEI (Supplemental Enhancement Information).

The ExtrinsicCameraParametersBox(i) indicates an extrinsic camera parameter such as rotation and positional information of a camera during shooting of the textures and the depths packed in the stored image in the track. The ExtrinsicCameraParametersBox(i) is, for example, information of Multiview acquisition information SEI, or the like.

It is possible to specify a displayable region (coverage) of a corresponding texture or depth by the IntrinsicCameraParameters(i) and the ExtrinsicCameraParametersBox(i). In other words, it can be said that the IntrinsicCameraParameters(i) and the ExtrinsicCameraParametersBox(i) are displayable region information indicating the displayable region of the texture or the depth.

The stream_left[i], the stream_top[i], the stream_width[i], the stream_height[i], the stream_type[i], the IntrinsicCameraParameters(i), and the ExtrinsicCameraParametersBox(i) are stored by the same number as the number of image regions in the stored image. That is, these parameters are stored for each image region.

It is to be noted that the stream_left[i], the stream_top[i], the stream_width[i], and the stream_height[i] may be relative values indicating the position, the width, the height, and the like of each of the image regions with respect to an angle of view of the entire stored image included in the track, instead of signaling in units of pixels.

Figure 42:
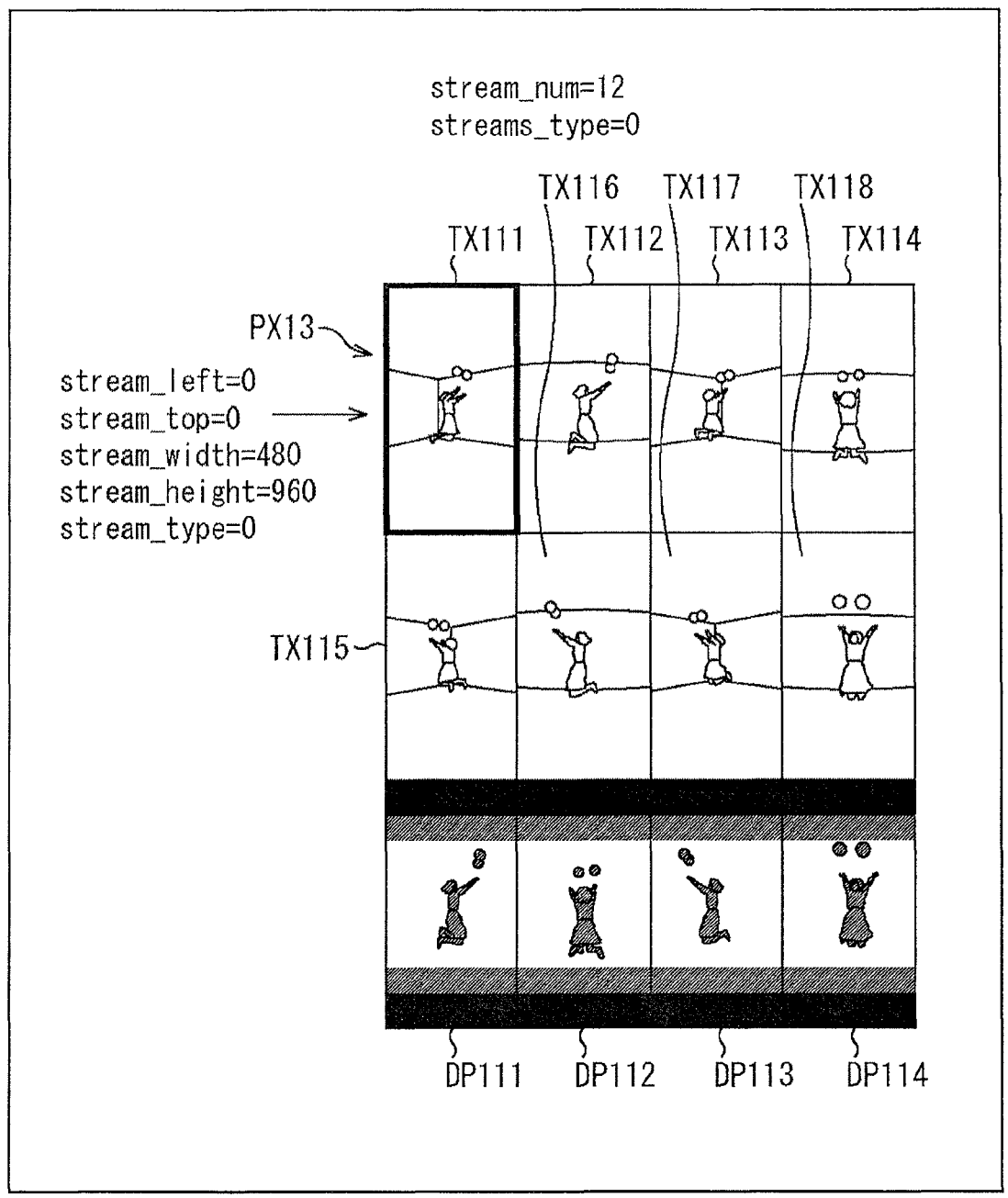
FIG. 42 is a diagram illustrating a signaling example of the Birdview Information Box.

Herein, as a specific example, FIG. 42 illustrates a signaling example of the Birdview Information Box in a case where the image PX13 illustrated in FIG. 39 is stored in one track as a stored image. It is to be noted that, in FIG. 42, portions corresponding to those in FIG. 39 are denoted by the same reference numerals, and description thereof is omitted as appropriate.

In a case where the image PX13 illustrated in FIG. 42 is stored in one track as a stored image, the image PX13 includes eight textures and four depths, and the number of image regions of the textures and the depths included in the image PX13 is 12. Accordingly, the value of the stream_num in the Birdview Information Box is 12, and the value of the streams_type is 0.

In addition, attention is paid to the texture TX111 located at the upper left in FIG. 42 of the image PX13, and it is assumed that a width in a lateral direction and a height of the texture TX111 in FIG. 42 are 480 pixels and 960 pixels, respectively.

In this case, for the texture TX111, the value of the stream_left[i] is 0, the value of the stream_top[i] is 0, the value of the stream_width[i] is 480, the value of the stream_height[i] is 960, and the value of the stream_type[i] is 0.

Referring to such a Birdview Information Box makes it possible for the client to specify the image regions of the textures and the depths in the stored image in each track and the types of the BV streams of the image regions, and correctly extract the textures and the depths from the stored image.

As described above, in a case where the textures and the depths are collectively stored in one track, it is possible to store the BV streams in the track to allow for construction of a 3D model as viewed from at least a specific viewpoint position. Doing so makes it possible for the client to select one track and reproduce a BV content with use of only the BV streams stored in the selected track.

In a case where the Birdview Information Box is signaled, the file generation apparatus 11 performs upload processing similar to that in the third embodiment.

Note that, in the step S12, for example, a file including the Birdview Information Box illustrated in FIG. 40 is generated, and a segment file is generated on the basis of the file.

In addition, in the case where the Birdview Information Box is signaled, the client apparatus 71 performs the BV content reproduction processing described with reference to FIG. 38.

In this case, for example, in the step S86, referring to the Birdview Information Box makes it possible for the segment file processor 111 to identify the type of each of the BV streams stored in the track.

In addition, referring to the Birdview Information Box makes it possible for the segment file processor 111 to identify not only the type of each of the BV streams but also the region (image region) of each of the BV streams on the stored image. Accordingly, the segment file processor 111 supplies these results of such identification to the display information generator 113, which makes it possible for the display information generator 113 to extract the BV streams necessary for reproduction of the BV content from the decoded stored image.

<About Signaling of Quality Ranking>

A Birdview Quality Ranking Box may be newly defined to signal a quality ranking that is information indicating a quality (quality) of the BV streams stored in the track or the BV content.

For example, in a case where the Birdview Quality Ranking Box signals quality rankings of the BV streams stored in the track, it is sufficient if the Birdview Quality Ranking Box is stored in the Visual Sample Entry.

In this case, the quality ranking is quality information indicating a relative quality (quality) of each of the BV streams among the tracks in which the BV streams for reproduction of the same BV content are stored, that is, among a plurality of BV streams for reproduction of the same BV content.

In addition, for example, in a case where the Birdview Quality Ranking Box signals a quality ranking of the BV content, it is sufficient if the Birdview Quality Ranking Box is stored in the Birdview Group Box.

In this case, the quality ranking is quality information indicating a relative quality (quality) of each BV content among a plurality of BV contents.

Doing so makes it possible for the client to perform selection of a track (BV streams) included in a BV content in which the field-of-view region of the user has high image quality, and the like on the basis of the quality ranking.

Herein, examples of a syntax and semantics of the Birdview Quality Ranking Box are illustrated in FIG. 43 and FIG. 44.

FIG. 43 illustrates a syntax example of the Birdview Quality Ranking Box.

In this example, the Birdview Quality Ranking Box includes parameters num_regions, remaining_area_flag, stream_type, quality_ranking, center_yaw, center_pitch, center_roll, hor_range, and ver_range.

Herein, the parameter quality_ranking indicates a value of the quality ranking, and indicates that, in a case where the value of the quality_ranking is 1 or more, the smaller the value is, the higher the quality is.

In addition, semantics of other parameters are as illustrated in FIG. 44.

That is, the parameter num_regions is information indicating the number of regions of which the quality ranking is signaled.

The parameter remaining_area_flag is flag information for specifying a region as a range where the value of quality ranking indicated by the quality_ranking is applied.

Herein, in a case where the parameter "remaining_area_flag" is 0, each region of which the quality ranking is signaled, that is, each region as a range where the value of quality ranking is applied is a region determined by the parameters center_yaw, center_pitch, center_roll, hor_range, and ver_range.

In contrast, in a case where the value of the parameter remaining_area_flag is 1, each of regions, from a first region to a second-to-last region, that are described in the Birdview Quality Ranking Box and of which the quality rankings are signaled is a region determined by the parameters center_yaw, center_pitch, center_roll, hor_range, and ver_range.

Then, a last region that is described in the Birdview Quality Ranking Box and of which the quality ranking is signaled is an entire remaining region portion not included in the regions determined by the signaled parameters center_yaw, center_pitch, center_roll, hor_range, and ver_range of the displayable region of a corresponding BV stream. That is, a remaining region not included in the regions from the first region to the second-to-last region of the displayable region of the BV stream is the last region of which the quality ranking is signaled.

It is to be noted that hereinafter, a region as a target of the quality ranking in a displayable region such as a BV stream of a texture or a depth and a BV content is also referred to as a target region. It can be said that the parameter remaining_area_flag is information indicating the target region.

The stream_type is information indicating image information of the region of which the quality ranking is signaled, that is, the type of the target region. For example, a case where the value of the stream_type is 0 indicates that the target region is a region of a texture, and a case where the value of the stream_type is 1 indicates that the target region is a region of a depth. In addition, a case where the value of the stream_type is 2 indicates that the target region is a region of a BV content, and a value "3" of the stream_type is reserved.

The parameter center_yaw indicates a yaw angle (yaw angle) indicating a center position of the target region as viewed from a center position of a 3D model. In addition, the parameter center_pitch indicates a pitch angle (pitch angle) indicating the center position of the target region as viewed from the center position of the 3D model, and the parameter center_roll indicates a roll angle (roll angle) of the center position of the target region as viewed from the center position of the 3D model, that is, a rotation angle of the target region.

Further, the parameter hor_range indicates a horizontal angle range of the target region as viewed from the center position of the 3D model, and the parameter ver_range indicates a vertical angle range of the target region as viewed from the center position of the 3D model.

These parameters center_yaw, center_pitch, center_roll, hor_range, and ver_range specify the target region. That is, the target region is a region surrounded by, for example, a center of a sphere and four circles on the sphere each having a center coincident with the center of the sphere, as in the displayable region described with reference to FIG. 6, and in particular, the target region is the same region as the displayable region or a partial region of the displayable region.

As described above, in the Birdview Quality Ranking Box, the quality ranking is signaled for each target region or every plurality of target regions in the displayable region in the BV content or the BV stream.

It is to be noted that, herein, a region as viewed from inside of the 3D model, that is, the center of the 3D model is signaled as the target region, but a region as viewed from outside of the 3D model, that is, a viewpoint position serving as a predetermined reference may be signaled as a target region.

In a case where the Birdview Quality Ranking Box is signaled as described above, the file generation apparatus 11 performs upload processing similar to that in the third embodiment.

Note that, in the step S12, for example, a file including the Birdview Quality Ranking Box illustrated in FIG. 43 is generated, and a segment file is generated on the basis of the file.

In addition, in a case where the Birdview Quality Ranking Box is signaled, the client apparatus 71 performs the BV content reproduction processing described with reference to FIG. 38.

In this case, in the step S85, for example, it is possible for the segment file processor 111 to refer to the Birdview Quality Ranking Box stored in the Birdview Group Box and select a BV group in which a region corresponding to the field of view of the user has high image quality.

Similarly, for example, even in the step S87, it is possible for the segment file processor 111 to refer to the Birdview Quality Ranking Box stored in the Visual Sample Entry and select a BV stream in which a region corresponding to the field of view of the user has high image quality.

It is to be noted that, for example, the Birdview Coverage Information Box illustrated in FIG. 37 may be signaled in the Restricted Scheme Information Box ('rinf') or the Scheme Information Box ('schi') illustrated in FIG. 34.

Doing so makes it possible to signal, for example, the displayable region of the BV stream stored in each track, that is, each BV stream such as only the texture or only the depth. In addition, in a case where the texture and the depth included in the BV content are stored in one track, it is possible to signal the displayable region of the BV content. Further, the displayable region may be signaled in units of image regions of textures and depths packed in the stored image in the track.

Modification Example 2 of Third Embodiment

<About Storage of Silhouette>

The silhouette described in the modification example 3 of the first embodiment, that is, the silhouette image may be stored in the file (file format) described with reference to FIG. 34 by extending the above-described Birdview Information Box. Usefulness of the silhouette is as described in the modification example 3 of the first embodiment.

As with the textures and the depths, in a case where silhouettes are collectively stored in one track, scalability during stream acquisition is lost, but there is an advantage that it is possible to reduce the number of streams to be acquired and reduce network-processing overhead.

In a case where silhouettes are stored in the track, the syntax of the Birdview Information Box is the same as that illustrated in FIG. 40, but semantics are as illustrated in FIG. 45, for example.

In an example illustrated in FIG. 45, the stream_num indicates the total number of textures, depths, and silhouettes included in the track, that is, the total number of BV streams included in the stored image.

It is to be noted that, herein, it is assumed that types of BV streams include not only a BV stream of only a silhouette but also a BV stream of a depth including a silhouette. Hereinafter, the depth including the silhouette is specifically referred to as a depth with a silhouette.

Herein, at least one type of BV stream out of the texture, the depth, the depth with the silhouette, and the silhouette is stored in each track.

In addition, the streams_type indicates image configuration information of the stored image stored in the track.

Herein, for example, a case where the value of the streams_type is 0 indicates that at least two or more of the texture, the depth, the depth with the silhouette and the silhouette exist in the track.

A case where the value of the streams_type is 1 indicates that only the texture exists in the track, and a case where the value of the streams_type is 2 indicates that only the depth exists in the track.

A case where the value of the streams_type is 3 indicates that only the depth with the silhouette exists in the track, and a case where the value of the streams_type is 4 indicates that only the silhouette exists in the track. Other values (values other than 0 to 4) of the streams_type are reserved.

In addition, in the example illustrated in FIG. 45, the stream_left[i], the stream_top[i], the stream_width[i], and the stream_height[i] are the same as those in the example illustrated in FIG. 41.

The stream_type[i] is information indicating the type of each of the image regions packed in the stored image in the track. For example, a case where the value of the stream_type[i] is 0 indicates that the image region is an image region of a texture, and a case where the value of the stream_type[i] is 1 indicates that the image region is an image region of a depth.

A case where the value of the stream_type[i] is 3 indicates that the image region is an image region of a depth with a silhouette, and a case where the value of the stream_type[i] is 4 indicates that the image region is an image region of a silhouette. Values other than 0 to 4 of the stream_type[i] are reserved.

Further, the IntrinsicCameraParameters(i) and the ExtrinsicCameraParametersBox(i) are the same as those in the example illustrated in FIG. 41.

In the example illustrated in FIG. 45, in a case where the ExtrinsicCameraParametersBox(i), that is, the extrinsic camera parameters of the depth and the silhouette are the same, the depth and the silhouette are a depth and a silhouette that have the same viewpoint position or the like, that is, the same displayable region, and are paired.

In other words, a silhouette having the same extrinsic camera parameter as a predetermined depth is a silhouette corresponding to the predetermined depth, and using such a silhouette makes it possible to extract only information of a 3D model (foreground) portion from the predetermined depth. Accordingly, in this case, it can be said that the extrinsic camera parameter is information that associates (correlates) the depth and the silhouette with each other.

It is to be noted that it is possible to associate (correlate) a track including only the silhouette with a track including the depth associated with the silhouette with use of a Track Reference Box defined in ISOBMFF. In this case, in the Track Reference Type Box stored in the Track Reference Box, reference type="silh" is newly defined, and the track including only the silhouette and the track including the depth are associated with each other.

As described above, in a case where the depth with the silhouette and the silhouette are also stored in the tracks, the file generation apparatus 11 performs upload processing similar to that in the third embodiment.

Note that, in the step S12, for example, the Birdview Information Box illustrated in FIG. 40 in the semantics illustrated in FIG. 45 is generated. Then, in addition to the acquired Birdview Information Box, a file including the tracks and the like in which the silhouette, the depth with the silhouette, and the like are stored is generated, and a segment file is generated on the basis of the file.

In addition, in a case where the depth with the silhouette and the silhouette are also stored in the tracks, the client apparatus 71 performs the BV content reproduction processing described with reference to FIG. 38.

In this case, in the step S89, in addition to the texture and the depth, the silhouette is also used as appropriate to generate an image of the 3D model for reproduction of the BV content.

Modification Example 3 of Third Embodiment

<About Method of Packing BV Streams>

Incidentally, as described in the modification example 1 of the third embodiment, in a case where a plurality of BV streams are packed in one stream (a stored image) and stored in a track, performing specific packing makes it possible to achieve effects such as an improvement in encoding efficiency and facilitation of processing corresponding to the field of view of a client (a user).

Four effective packing techniques of BV streams and advantages thereof are described below. It is to be noted that, in any of the techniques, it is possible to signal packing information, that is, information and the like relating to the respective BV streams in the Birdview Information Box.

Specifically, as the effective packing techniques of the BV streams, the following first to fourth packing techniques are described.
(First Packing Technique)
Textures having viewpoint positions close to each other are adjacently located, and are packed.
(Second Packing Technique)
Resolutions of important regions of a texture and a depth are enhanced, and the regions are packed.
(Third Packing Technique)
Image regions are located to adjacently locate a texture and a depth corresponding to each other, and are packed.
(Fourth Packing Technique)
Image regions are located to adjacently locate a texture, a depth, and a silhouette that have the same direction, and are packed.

First, the first packing technique of these packing techniques is described.

Figure 46:
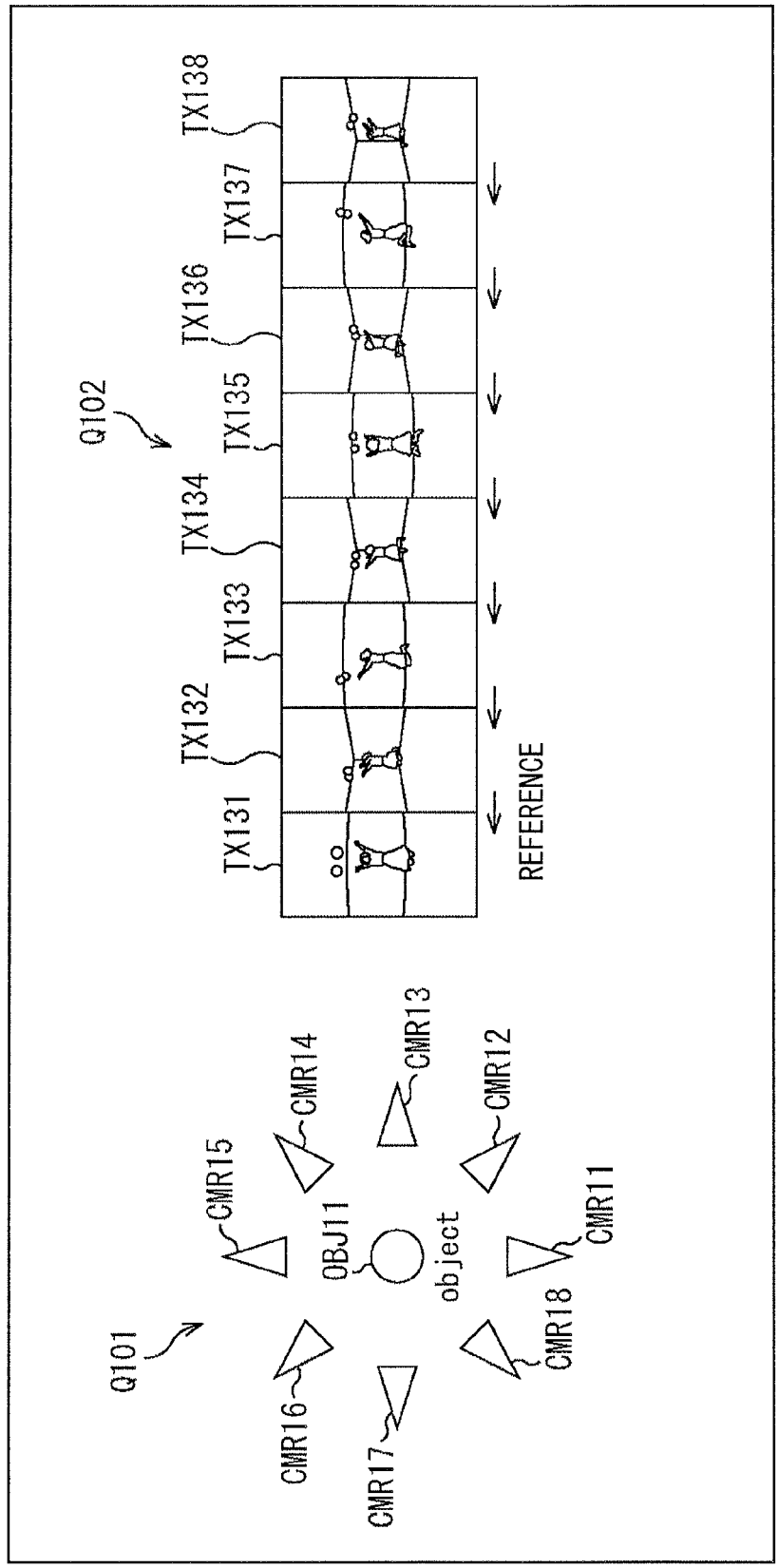
FIG. 46 is a diagram for describing a first packing technique.

For example, as indicated by an arrow Q101 in FIG. 46, it is assumed that cameras CMR11 to CMR18 are located to surround a foreground, that is, an object OBJ11 serving as a 3D model.

Then, it is assumed that images are captured by the cameras CMR11 to CMR18 located at positions different from each other, and textures TX131 to TX138 corresponding to respective viewpoint positions of the cameras CMR11 to CMR18 are generated. Herein, for example, an image captured by the camera CMR11 is directly referred to as the texture TX131.

In this case, in the first packing technique, as indicated by an arrow Q102, textures having viewpoint positions close to each other are adjacently located, and are packed to form one stored image.

In particular, herein, textures having viewpoint positions closest to each other of the textures located on the stored image are adjacently located on the stored image. That is, the textures are located side by side in order of the textures TX131 to TX138 from a left side in the diagram to a rightward direction in the diagram to form one stored image.

Herein, for example, the texture TX131 and the texture TX132 located side by side adjacent to each other are textures having viewpoint positions closest to each other of the textures TX131 to TX138.

Thus, in a case where packing is performed to cause the textures having viewpoint positions close to each other to be adjacently located, for example, performing encoding (encoding) with a reference relationship between the textures adjacent to each other makes it possible to improve encoding efficiency.

Specifically, for example, the texture TX131 and the texture TX132 described above have viewpoint positions close to each other; therefore, a difference in a pixel value of a pixel between the texture TX131 and the texture TX132 becomes small. Accordingly, for example, in a case where a portion of an image region of the texture TX132 in the stored image is to be encoded, encoding is performed with a reference relationship between the texture TX131 and the texture TX132, that is, with use of a difference between the texture TX131 and the texture TX132, which makes it possible to reduce an encoding amount of data acquired by encoding. This makes it possible to improve encoding efficiency.

Further, during encoding of the stored image, for example, collectively encoding textures having viewpoint positions close to each other as a HEVC tile makes it possible to independently decode (decode) a corresponding texture and a texture around a field of view in accordance with the field of view of the client, that is, the field of view of the user and perform rendering. Herein, the HEVC tile is a processing unit on which encoding and decoding is allowed to be performed independently.

It is to be noted that, although an example using the textures have been described here, the first packing technique is also applicable to depths, silhouettes, and the like.

It is to be noted that an image itself actually captured by a camera may serve as a texture, but a texture may be generated from a plurality of images captured by a camera, or the like. For example, a 3D model may be constructed in advance, and then a texture, a depth, or a silhouette at a virtual camera position as a viewpoint position may be generated on the basis of the constructed 3D model.

Next, the second packing technique is described.

Figure 47:
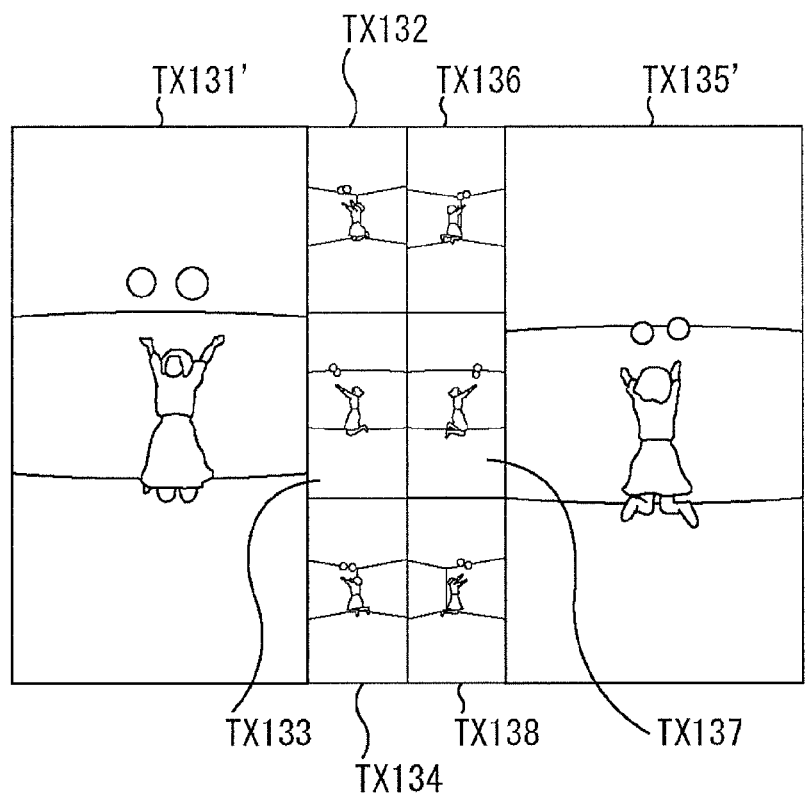
FIG. 47 is a diagram for describing a second packing technique.

For example, as illustrated in FIG. 47, it is assumed that a texture TX131', the textures TX132 to TX134, a texture TX135', and the textures TX136 to TX138 are packed in one stored image. In FIG. 47, portions corresponding to those in FIG. 46 are denoted by the same reference numerals, and description thereof is omitted as appropriate.

In FIG. 47, the texture TX131' and the texture TX135' are textures at the same viewpoint positions as the viewpoint positions of the texture TX131 and the texture TX135 illustrated in FIG. 46.

Herein, the texture TX131' and the texture TX135' are images that are different only in sizes, that is, resolutions of texture images from the texture TX131 and the texture TX135.

In particular, the texture TX131' is an image of a foreside (front) of an object (a 3D model), and the texture TX135' is an image of a back of the object.

In this example, the front and the back of the 3D model are assumed to be more important than other sides and the like.

Accordingly, displayable regions of the texture TX131' and the texture TX135' herein are considered to be higher in importance than displayable regions of the textures TX132 to TX134 and the textures TX136 to TX138 other than the texture TX131' and the texture TX135'.

Accordingly, resolutions of the texture TX131' and the texture TX135' are higher than resolutions of the textures TX132 to TX134 and the textures TX136 to TX138 other than the texture TX131' and the texture TX135'. That is, the texture TX131' and the texture TX135' are high-resolution texture images, and the textures TX132 to TX134 and the textures TX136 to TX138 are low-resolution texture images.

Then, the texture TX131', the texture TX135', the textures TX132 to TX134, and the textures TX136 to TX138 are located side by side to form one stored image.

As described above, in the second packing technique, textures having different resolutions (sizes) are located on the stored image. Doing so makes it possible to cause an important region to have a high resolution, and to reduce the size of a file in which the BV streams are stored without impairing quality of a viewing experience of the user. This is advantageous, for example, in file transmission via a network.

It is to be noted that, although an example using the textures have been described here, the second packing technique is also applicable to depths, silhouettes, and the like.

Next, the third packing technique is described.

Figure 48:
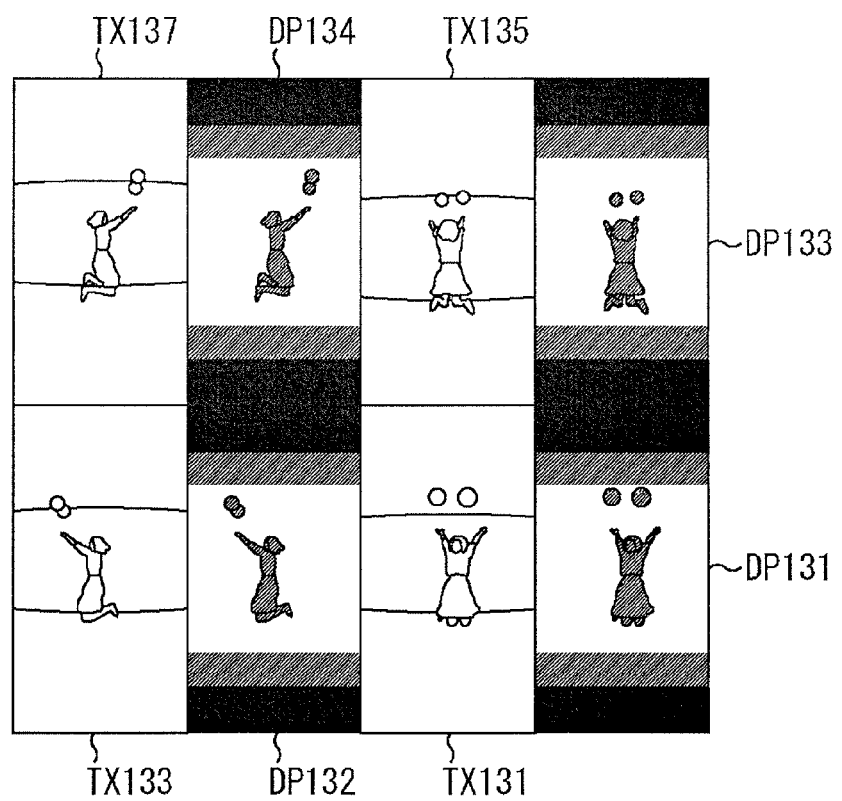
FIG. 48 is a diagram for describing a third packing technique.

In the third packing technique, for example, as illustrated in FIG. 48, a texture and a depth corresponding to each other, that is a texture and a depth having the same viewpoint position (displayable region) are adjacently located, and are packed. It is to be noted that, in FIG. 48, portions corresponding to those in FIG. 46 are denoted by the same reference numerals, and description thereof is omitted as appropriate.

In an example illustrated in FIG. 48, the texture TX131, the texture TX133, the texture TX135, and the texture TX137, and depths DP131 to DP134 corresponding to these textures are located side by side to form one stored image.

Herein, in particular, the texture TX131 and the depth DP131 corresponding to each other are adjacently located, the texture TX133 and the depth DP132 corresponding to each other are adjacently located, the texture TX135 and the depth DP133 corresponding to each other are adjacently located, and the texture TX137 and the depth DP134 corresponding to each other are adjacently located.

In this case, the stored image including, as a HEVC tile, one pair of a texture and a depth corresponding to each other such as the texture TX131 and the depth DP131 is encoded.

For example, doing so makes it possible to use the texture and the depth acquired by decoding for applications other than BV content reproduction, such as stereo display of only the displayable regions of the texture and the depth in a case where one pair of the texture and the depth is decoded independently in accordance with the field of view of the user. For example, even though the client does not support BV content reproduction, as long as the client supports stereo display using the depth, it is possible to easily perform stereo display of an image corresponding to the field of view.

Further, the fourth packing technique is described.

Figure 49:
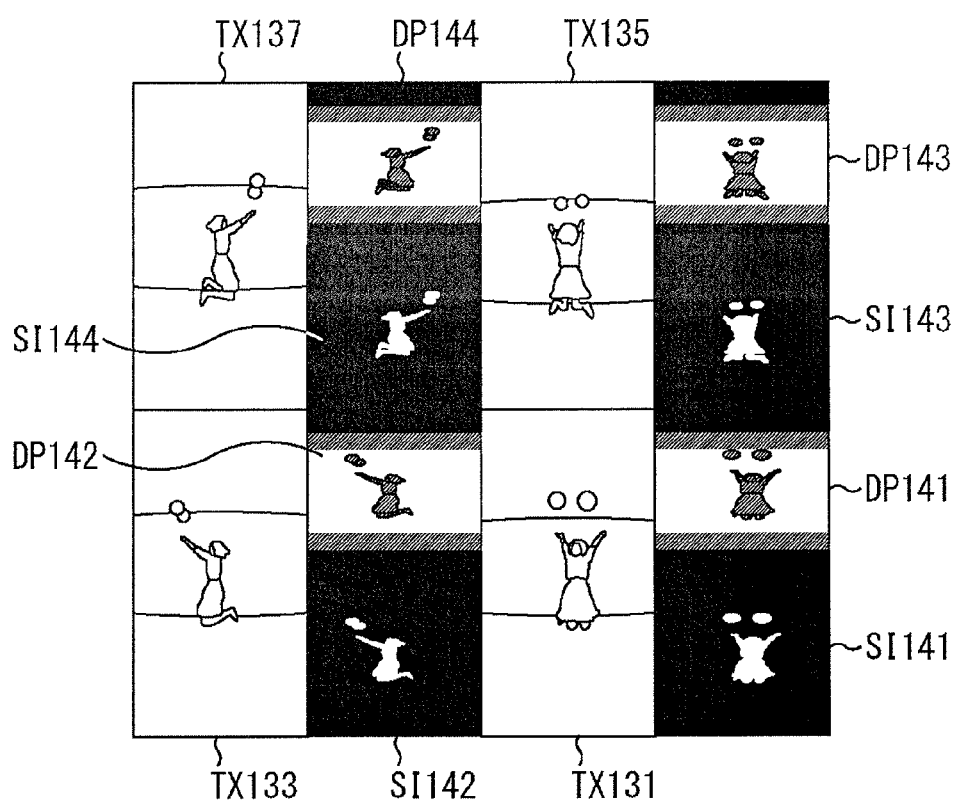
FIG. 49 is a diagram for describing a fourth packing technique.

In the fourth packing technique, for example, as illustrated in FIG. 49, a texture, a depth and a silhouette have the same direction, that is, having substantially the same displayable region are adjacently located, and are packed. Herein, the same direction means that the directions of the 3D model as viewed from the viewpoint positions of the BV streams are substantially the same.

In FIG. 49, portions corresponding to those in FIG. 46 are denoted by the same reference numerals, and description thereof is omitted as appropriate.

In an example illustrated in FIG. 49, the texture TX131, the texture TX133, the texture TX135, and the texture TX137, and the depths DP141 to DP144, and the silhouettes SI141 to SI144 corresponding to these textures are located side by side to form one stored image.

In particular, for example, the texture TX131, the depth DP141, and the silhouette SI141 that correspond to each other, that is, have the same direction are adjacently located. Similarly, the texture TX133, the depth DP142, and the silhouette SI142 corresponding to each other are adjacently located, the texture TX135, the depth DP143, and the silhouette SI143 corresponding to each other are adjacently located, and the texture TX137, the depth DP144, and the silhouette SI144 corresponding to each other are adjacently located.

As described above, in the fourth packing technique, a texture, and a depth and a silhouette that correspond to the texture, that is, have the same direction are adjacently located on the stored image.

In addition, herein, the depth and the silhouette have a relatively low resolution than the texture. The texture is dominant in contribution to image quality of the 3D model during configuration of the 3D model; therefore, causing the depth and the silhouette to have a relatively low resolution makes it possible to reduce the size of a file in which the BV streams are stored without impairing quality of a viewing experience of the user.

Further, causing the depth and the silhouette corresponding to each other during encoding to have a reference relationship makes it possible to improve encoding efficiency. This is advantageous, for example, in file transmission via a network.

<About Relocation of Image Region>

Further, for example, it is also possible to determine a default packing technique in advance, perform region relocation on the basis of the default packing technique, and then implement another packing.

As a specific example, for example, it is possible to set the above-described first packing technique as a predetermined packing technique, that is, a default packing technique, perform region relocation as appropriate, and then perform packing not by the first packing technique but by the second packing technique.

Figure 50:
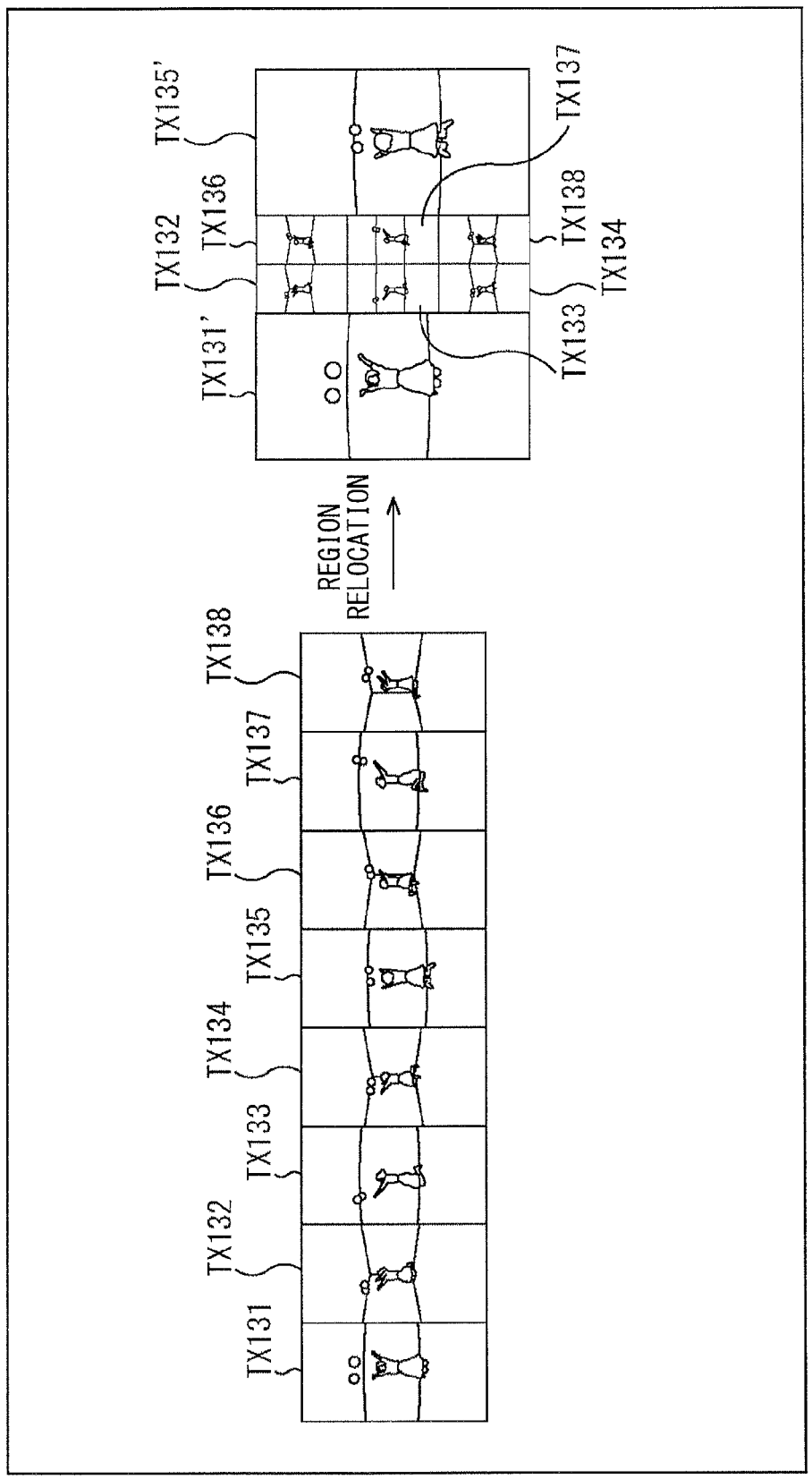
FIG. 50 is a diagram for describing region relocation.

In such a case, location of image regions of BV streams by each of the packing techniques is as illustrated in FIG. 50, for example. In FIG. 50, portions corresponding to those in FIG. 46 are denoted by the same reference numerals, and description thereof is omitted as appropriate.

In the case illustrated in FIG. 50, the textures TX131 to TX138 having the same resolution are usually located side by side as illustrated on a left side in the diagram to form one stored image. That is, packing is performed by the first packing technique described above. Hereinafter, one stored image generated by the first packing technique is specifically referred to as a projected picture.

As described above, basically, a projected picture is generated by the first packing technique, and the acquired projected picture is stored in a track. However, in some cases, it is desired to increase resolutions of some of the textures.

In such a case, location of the respective textures is changed, that is, region relocation is performed, and packing is performed by the second packing technique as illustrated on a right side in FIG. 50. That is, resolutions of the texture TX131 and the texture TX135 are increased to acquire a texture TX131' and a texture TX135' both having a higher resolution.

The texture TX131', the textures TX132 to TX134, the texture TX135', and the textures TX136 to TX138 are located side by side differently from those located in the first packing technique to form one stored image. Hereinafter, one stored image generated by the second packing technique is specifically referred to as a packed picture.

In this example, location of BV streams (textures) on the stored image stored in the track is either location determined by the first packing technique determined as a default technique in advance or location determined by the second packing technique. In particular, in a case where region relocation has been performed, the stored image stored in the track is the packed picture, and location of the textures on the packed picture is the location determined by the second packing technique.

Incidentally, the projected picture and the packed picture differ from each other in a relationship of positions of the respective textures, that is, a positional relationship of the image regions.

For example, in a case where location in the projected picture is default location, the client has already known location of the textures on the projected picture. Accordingly, it is possible for the client to correctly extract each of the textures from the projected picture and perform rendering.

However, in a case where region relocation is performed and the packed picture is stored in the track, unless it is possible to specify which region on the stored image corresponds to which texture when rendering is performed, it is not possible for the client to correctly extract the textures.

Accordingly, in the present technology, in a case where region relocation is performed, information indicating a relationship between the positions of the textures before and after the relocation is signaled as region relocation information.

Specifically, for example, extended RegionWisePackingBox as illustrated in FIG. 51 may be used to signal the region relocation information.

The RegionWisePackingBox illustrated in FIG. 51 is stored in, for example, a Track Box, any box in the Track Box, or the like. The RegionWisePackingBox includes RegionWisePackingStruct, and a syntax of this RegionWisePackingStruct is as illustrated in FIG. 52.

In the RegionWisePackingStruct illustrated in FIG. 52, parameters num_regions, proj_picture_width, proj_ picture_height, and packing_type[i] are stored. In addition, RectRegionPacking(i) is also stored in the RegionWisePackingStruct.

FIG. 53 illustrates a syntax of the RectRegionPacking(i), for example.

In the RectRegionPacking(i) illustrated in FIG. 53, parameters content_type, stream_type, IntrinsicCameraParameters(i), ExtrinsicCameraParametersBox(i), prof_reg_width[i], proj_reg_height[i], proj_reg_top[i], proj_reg_left[i], packed_reg_width[i], packed_reg_height[i], packed_reg_top[i], packed_reg_top[i], and packed_reg_left[i] are stored.

The RegionWisePackingBox, specifically the RegionWisePackingStruct in the RegionWisePackingBox is region relocation information, and semantics of the RegionWisePackingStruct and the RectRegionPacking(i) are as illustrated in FIG. 54.

That is, the parameter num_regions indicates the number of image regions included in the stored image, that is, the number of regions of BV streams.

The parameter proj_picture_width indicates a width of a projected picture before relocation, and the parameter proj_picture_height indicates a height of the projected picture before relocation.

The parameter packing_type[i] indicates region-wise packing of an i-th region included in the RegionWisePackingStruct, that is, a type of image region of a BV stream corresponding to i-th RectRegionPacking(i).

Specifically, a case where a value of the packing_type[i] is 0 indicates that the image region is a rectangular region, that is, packing of the rectangular region. It is to be noted that values other than 0 of the packing_type[i] are reserved.

The parameter content_type indicates a type of content. For example, a case where a value of the content_type is 0 indicates that the content is an omnidirectional image, and a case where the value of the content_type is 1 indicates that the content is a Birdview image, that is, a BV content.

The parameter stream_type indicates an image type of image region.

Specifically, a case where a value of the stream_type is 0 indicates that the image region is a texture (a texture image), and a case where the value of the stream_type is 1 indicates that the image region is a depth (a depth image).

In addition, a case where the value of the stream_type is 2 indicates that the image region is a depth with a silhouette (a depth image including a silhouette), and a case where the value of the stream_type is 3 indicates that the image region is a silhouette (a silhouette image). Values other than 0 to 3 of the stream_type are reserved.

Referring to this stream_type makes it possible for the client to specify which type of BV stream, such as a texture or a depth, an i-th image region signaled in the RegionWisePackingStruct is.

The parameter IntrinsicCameraParameters(i) indicates an intrinsic camera parameter such as a focal length and principal point information for the i-th image region.

The parameter IntrinsicCameraParameters(i) is, for example, information of Multiview acquisition information SEI.

The parameter ExtrinsicCameraParametersBox(i) indicates an extrinsic camera parameter such as rotation and positional information of a camera during shooting of the i-th image region.

The ExtrinsicCameraParametersBox(i) is, for example, information of Multiview acquisition information SEI, or the like.

It is possible to specify a displayable region (coverage) of a texture or a depth stored in a corresponding image region by the IntrinsicCameraParameters(i) and the ExtrinsicCameraParametersBox(i).

The parameter proj_reg_width[i] indicates a width of the i-th image region on the projected picture, and the parameter prof_reg_height[i] indicates a height of the i-th image region on the projected picture.

In addition, the parameter prof_reg_top[i] indicates a vertical position of an upper left pixel of the i-th image region on the projected picture, and the parameter proj_reg_left[i] indicates a horizontal position of the upper left pixel of the i-th image region on the projected picture.

It is possible to specify a position and a size of the i-th image region on the projected picture by these parameters proj_reg_width[i], prof_reg_height[i], proj_reg_top[i], and prof_reg_left[i]. That is, it is possible to specify the position and the size of the i-th image region before relocation.

Accordingly, it can be said that the proj_reg_width[i], the proj_reg_height[i], the proj_reg_top[i], and the proj_reg_left[i] are information for specifying the image regions of the BV streams on the stored image (projected picture) in a case where the BV streams are disposed in a location determined by the default first packing technique.

The parameter packed_reg_width[i] indicates a width of the i-th image region on the packed picture, and the parameter packed_reg_height[i] indicates a height of the i-th image region on the packed picture.

In addition, the parameter packed_reg_top[i] indicates a vertical position of an upper left pixel of the i-th image region on the packed picture, and the parameter packed_reg_left[i] indicates a horizontal position of the upper left pixel of the i-th image region on the packed picture.

It is possible to specify a position and a size of the i-th image region on the packed picture by these parameters packed_reg_width[i], packed_reg_height[i], packed_reg_top[i], and packed_reg_left[i]. That is, it is possible to specify the position and the size of the i-th image region after relocation.

Accordingly, it can be said that the packed_reg_width[i], the packed_reg_height[i], the packed_reg_top[i], and the packed_reg_left[i] are information for specifying the image regions of the BV streams on the stored image (packed picture) in a case where the BV streams are disposed in a location determined by the second packing technique in region relocation.

Herein, as a specific example, FIG. 55 illustrates a signaling example of the RegionWisePackingBox in a case where the packed picture illustrated in FIG. 50 is stored in one track as a stored image. It is to be noted that, in FIG. 55, portions corresponding to those in FIG. 50 are denoted by the same reference numerals, and description thereof is omitted as appropriate.

In the example illustrated in FIG. 55, a projected picture normally formed by locating textures side by side as indicated by an arrow Q131 is changed to a packed picture formed by relocating the textures as indicated by an arrow Q132 by relocation of image regions of the textures.

In this case, a content including the textures and the like is a BV content; therefore, the value of the content_type stored in the RegionWisePackingBox is "1" indicating the BV content. In addition, the image region is a region of a BV stream of a texture; therefore, the value of the stream_type is set to "0".

In addition, attention is paid to the texture TX131 located at a left end in a diagram of the projected picture, and it is assumed that a width in a lateral direction and a height of the texture TX131 in the diagram are 480 pixels and 960 pixels, respectively. Further, it is assumed that a vertical position of an upper left pixel of the texture TX131 is "0" indicating an uppermost portion of the projected picture, and a horizontal position of the upper left pixel of the texture TX131 is "0" indicating a leftmost portion of the projected picture.

In this case, for the image region of the texture TX131 before relocation, the value of the prof_reg_width[i] in the RectRegionPacking(i) is 480, the value of the proj_reg_height[i] is 960, the value of the proj_reg_top[i] is 0, and the value of the proj_reg_left[i] is 0.

It is also assumed that a texture after relocation of the texture TX131 is the texture TX131', and a width in the lateral direction and a height of the texture TX131' in the diagram are 960 pixels and 1920 pixels, respectively. Further, it is assumed that a vertical position of an upper left pixel of the texture TX131' is "0" indicating an uppermost portion of the packed picture, and a horizontal position of the upper left pixel of the texture TX131' is "0" indicating a leftmost portion of the packed picture.

In this case, for the image region of the texture TX131' after relocation, the value of the packed_reg_width[i] in the RectRegionPacking(i) is 960, the value of the packed_reg_height[i] is 1920, the value of the packed_reg_top[i] is 0, and the value of the packed_reg_left[i] is 0.

As described above, referring to the RegionWisePackingBox makes it possible for the client to specify a corresponding relationship between the texture TX131 before relocation and the texture TX131' after relocation, a position and a size of the texture TX131' on the packed picture after relocation, and the like.

It is to be noted that region relocation of textures has been described as an example, but region relocation of image regions of depths and silhouettes is also possible as in the case of the textures.

In the present technology, using such RegionWisePackingBox makes it possible to select an appropriate packing technique in accordance with content features, and the like.

In a case where packing by the first to fourth packing techniques and region relocation of the image regions as described above are performed, the file generation apparatus 11 performs upload processing similar to that in the third embodiment.

Note that, in the step S12, the BV streams are packed in the stored image in accordance with the first to fourth packing techniques or a packing technique in region relocation of the image regions as appropriate, and are stored in the track.

In addition, in a case where region relocation is performed, a file in which the RegionWisePackingBox is stored is generated, and a segment file is generated on the basis of the file.

Further, in a case where packing by the first to fourth packing techniques and region relocation of the image regions are performed, the client apparatus 71 performs the BV content reproduction processing described with reference to FIG. 38.

In this case, for example, in a case where region relocation of the image regions is performed, in the step S86, the segment file processor 111 refers to the RegionWisePackingBox to specify a location relationship between the image regions before and after relocation. Then, the display information generator 113 extracts a BV stream such as a texture from the track on the basis of a thus-specified result.

In addition, in a case where packing by the first to fourth packing techniques is performed, the segment file processor 111 refers to the Birdview Information Box to identify the image region of each of the BV streams.

As described above in the third embodiment to the modification example 3 of the third embodiment, even in a case where the BV streams are stored in tracks in the file in ISOBMFF, grouping the tracks makes it possible to easily select a track in which a BM stream necessary for viewing of the BV content is stored.

In addition, a plurality of BV streams is packed in one stream, that is, one stored image, and stored in the track, which makes it possible to reduce the number of streams to be acquired and reduce network-processing overhead. Further, performing packing by the packing techniques as described in the modification example 3 of the third embodiment makes it possible to improve encoding efficiency and to easily perform processing corresponding to the field of view of the client (user).

<Configuration Example of Computer>

Incidentally, it is possible to execute the series of processing described above by hardware or software. In a case where the series of processing is executed by software, a program included in the software is installed in a computer. The computer herein includes a computer that is incorporated in dedicated hardware, or a general-purpose personal computer that is able to execute various functions by having various programs installed therein, and the like.

Figure 56:
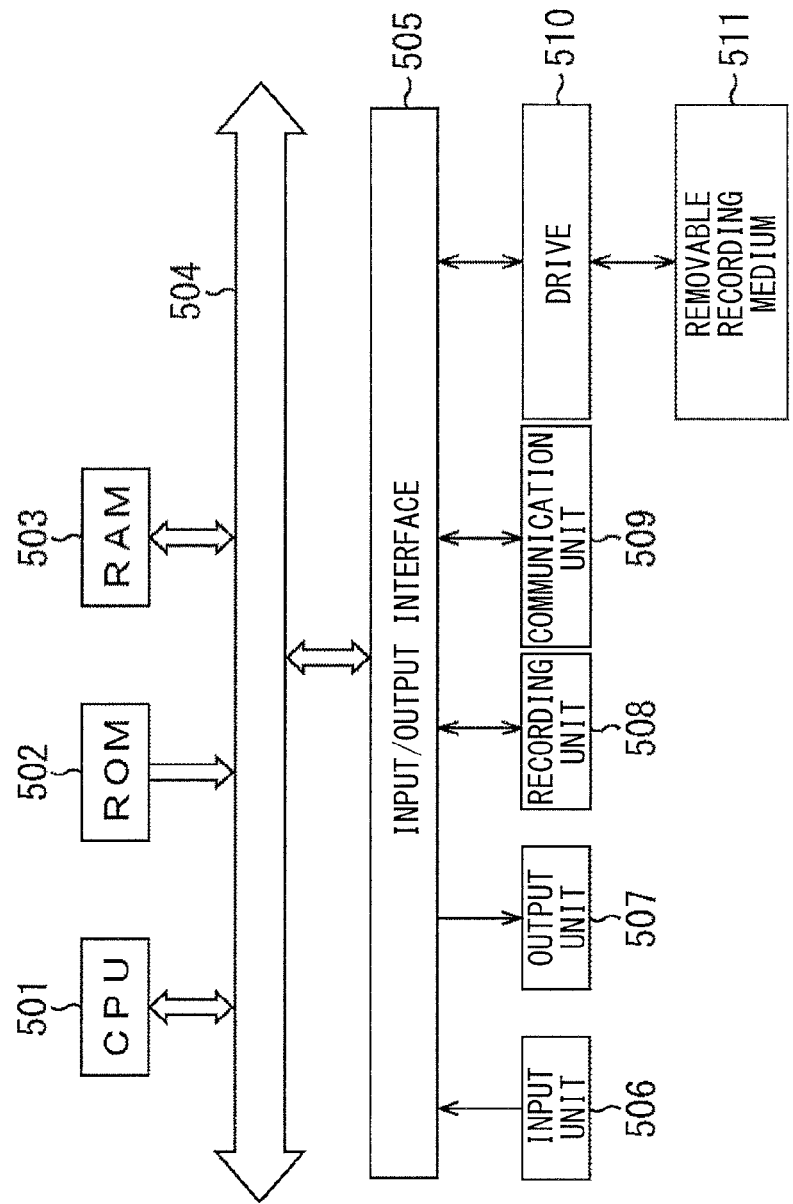
FIG. 56 is a diagram illustrating a configuration example of a computer.

FIG. 56 is a block diagram illustrating a configuration example of the hardware of a computer that executes the series of processing described above with a program.

In the computer, a CPU (Central Processing Unit) 501, a ROM (Read Only Memory) 502, and a RAM (Random Access Memory) 503 are coupled to each other by a bus 504.

An input/output interface 505 is further coupled to the bus 504. An input unit 506, an output unit 507, a recording unit 508, a communication unit 509, and a drive 510 are coupled to the input/output interface 505.

The input unit 506 includes a keyboard, a mouse, a microphone, an imaging element, and the like. The output unit 507 includes a display, a speaker, and the like. The recording unit 508 includes a hard disk, a nonvolatile memory, and the like. The communication unit 509 includes a network interface and the like. The drive 510 drives a removable recording medium 511, such as a magnetic disk, an optical disk, a magneto-optical disk, or a semiconductor memory.

In the computer configured as described above, the CPU 501 loads a program recorded in, for example, the recording unit 508 into the RAM 503 via the input/output interface 505 and the bus 504, and executes the program, thereby performing the series of processing described above.

It is possible to provide a program to be executed by the CPU 501 by recording the program in the removable recording medium 511 as a package medium or the like, for example. In addition, it is possible to provide the program via a wired or wireless transmission medium such as a local area network, the Internet, or digital satellite broadcasting.

In the computer, mounting the removable medium 511 onto the drive 510 makes it possible to install the program in the recording unit 508 via the input/output interface 910. In addition, it is possible to receive the program in the communication unit 509 and install the program in the recording unit 508 via a wired or wireless transmission medium. In addition, it is possible to install the program in advance in the ROM 502 or the recording unit 508.

It is to be noted that a program executed by the computer may be a program in which processing is performed chronologically in the order described herein or may be a program in which processing is performed in parallel or at necessary timings such as when the processing is invoked.

In addition, an embodiment of the present technology is not limited to the embodiments described above, and may be modified in variety of ways in a scope without departing from the gist of the present technology.

For example, it is possible for the present technology to adopt a configuration of cloud computing in which one function is distributed to a plurality of apparatuses via a network and processed in cooperation.

In addition, for example, it is possible to execute the respective steps described in the flowcharts described above with one apparatus, and it is also possible to distribute the respective steps to a plurality of apparatuses for execution.

Further, in a case where a plurality of processing is included in one step, it is possible to execute the plurality of processing included in the one step with one apparatus, and it is also possible to distribute the plurality of processing to a plurality of apparatuses for execution.

Further, it is possible for the present technology to have the following configurations.

(1)

An image processing apparatus including:

a file processor that selects, from a plurality of streams included in a 3D object content, a plurality of the streams to be used for reproduction of the 3D object content on the basis of group information for selection of the stream appropriate for reproduction of the 3D object content, a file including the group information.

(2)

The image processing apparatus according to (1), further including an acquisition unit that acquires the streams selected by the file processor.

(3)

The image processing apparatus according to (1) or (2), in which the group information is included in a region, in which information for each of the 3D object contents is stored, in the file.

(4)

The image processing apparatus according to (3), in which the region in which the information for each of the 3D object contents is stored includes information indicating that the 3D object content is a content that allows a 3D object to be viewed from surroundings of the 3D object.

(5)

The image processing apparatus according to (3) or (4), in which the region in which the information for each of the 3D object contents is stored includes information indicating a displayable region of the 3D object content.

(6)

The image processing apparatus according to any one of (1) to (5), in which the file includes information relating to the stream indicated by the group information and information relating to the stream that is additional and different from the stream indicated by the group information.

(7)

The image processing apparatus according to (6), in which the file includes, for each of the streams, information indicating the 3D object content that is reproducible with use of the stream.

(8)

The image processing apparatus according to any one of (1) to (7), in which the file includes information indicating a type of the stream.

(9)

The image processing apparatus according to (8), in which the type of the stream is a texture, a mesh, a depth, a depth including a silhouette, or a silhouette.

(10)

The image processing apparatus according to (9), in which the file includes information for correlating the depth and the silhouette as the streams with each other.

(11)

The image processing apparatus according to any one of (1) to (10), in which the file includes information indicating a displayable region of the stream.

(12)

The image processing apparatus according to any one of (1) to (11), in which the file includes quality information indicating a relative quality of the stream among a plurality of the streams.

(13)

The image processing apparatus according to (12), in which the file includes the quality information for each region or every plurality of regions in a displayable region of the stream.

(14)

An image processing method performed by an image processing apparatus, the method including:

selecting, from a plurality of streams included in a 3D object content, a plurality of the streams to be used for reproduction of the 3D object content on the basis of group information for selection of the stream appropriate for reproduction of the 3D object content, a file including the group information.

(15)

A file generation apparatus including:

a file generator that generates a file including group information for selection, from a plurality of streams included in a 3D object content, of the stream appropriate for reproduction of the 3D object content.

(16)

The file generation apparatus according to (15), further including a communication unit that transmits the file.

(17)

The file generation apparatus according to (15) or (16), in which the group information is included in a region, in which information for each of the 3D object contents is stored, in the file.

(18)

The file generation apparatus according to (17), in which the region in which the information for each of the 3D object contents is stored includes information indicating that the 3D object content is a content that allows a 3D object to be viewed from surroundings of the 3D object.

(19)

The file generation apparatus according to (17) or (18), in which the region in which the information for each of the 3D object contents is stored includes information indicating a displayable region of the 3D object content.

(20)

The file generation apparatus according to any one of (15) to (19), in which the file includes information relating to the stream indicated by the group information and information relating to the stream that is additional and different from the stream indicated by the group information.

(21)

The file generation apparatus according to (20), in which the file includes, for each of the streams, information indicating the 3D object content that is reproducible with use of the stream.

(22)

The file generation apparatus according to any one of (15) to (21), in which the file includes information indicating a type of the stream.

(23)

The file generation apparatus according to (22), in which the type of the stream is a texture, a mesh, a depth, a depth including a silhouette, or a silhouette.

(24)

The file generation apparatus according to (23), in which the file includes information for correlating the depth and the silhouette as the streams with each other.

(25)

The file generation apparatus according to any one of (15) to (24), in which the file includes information indicating a displayable region of the stream.

(26)

The file generation apparatus according to any one of (15) to (25), in which the file includes quality information indicating a relative quality of the stream among a plurality of the streams.

(27)

The file generation apparatus according to (26), in which the file includes the quality information for each region or every plurality of regions in a displayable region of the stream.

(28)

A file generating method performed by a file generation apparatus, the method including:

generating a file including group information for selection, from a plurality of streams included in a 3D object content, of the stream appropriate for reproduction of the 3D object content.

REFERENCE SIGNS LIST

11: file generation apparatus
33: MPD file generator
35: upload unit
43: segment file generator
71: client apparatus
93: MPD file processor
94: segment file acquisition unit
111: segment file processor
113: display information generator

The invention claimed is:

1. An image processing apparatus comprising:
circuitry configured to
acquire a Media Presentation Description (MPD) file that includes Preselection and a plurality of Adaptation Sets for reproducing a 3D model content, the 3D model content being generated by Volumetric Capturing and composed of a plurality of types of bitstream corresponding to the plurality of Adaptation Sets, the Preselection including a group descriptor which indicates the plurality of Adaptation Sets as a group, and each of the plurality of Adaptation Sets including a specific descriptor which indicates type information and identification information of corresponding bitstream;
select at least one of the plurality of Adaptation Sets for reproducing the 3D model content based on the group descriptor and the specific descriptor in the MPD file; and
acquire data based on the selected at least one of the plurality of Adaptation Sets.

2. The image processing apparatus according to claim 1, wherein the MPD file includes two or more groups of the plurality of Adaptation Sets, for reproducing a plurality of 3D model contents, respectively,
wherein the group descriptor is included in a field of the MPD file, in which information for each of the plurality of 3D model contents is stored.

3. The image processing apparatus according to claim 2, wherein the field in which the information for each of the plurality of 3D model contents is stored includes information indicating that a 3D model reproduced based on the selected Adaptation Sets is to be viewed from surroundings of the 3D model.

4. The image processing apparatus according to claim 2, wherein the Preselection includes information indicating a displayable region of the 3D model content.

5. The image processing apparatus according to claim 1, wherein the MPD file further includes information of one or more additional Adaptation Sets by the group descriptor, the one or more additional Adaptation Sets indicate additional and different bitstream related to the group of the plurality of the Adaptation Sets.

6. The image processing apparatus according to claim 1, wherein the plurality of types of bitstream includes a texture, a mesh, a depth, a depth including a silhouette, or a silhouette.

7. The image processing apparatus according to claim 6, wherein the specific descriptor included in one of the plurality of Adaptation Sets indicates a texture descriptor, when the type of the bitstream corresponding to the one of the Adaptation Sets is the texture.

8. The image processing apparatus according to claim 6, wherein the specific descriptor included in one of the plurality of Adaptation Sets indicates a mesh descriptor, when the type of the bitstream corresponding to the one of the Adaptation Sets is the mesh.

9. The image processing apparatus according to claim 6, wherein the specific descriptor included in one of the plurality of Adaptation Sets indicates a depth descriptor, when the type of the bitstream corresponding to the one of the Adaptation Sets is the depth.

10. The image processing apparatus according to claim 1, wherein the MPD file includes information indicating a displayable region of the bitstream to be reproduced.

11. The image processing apparatus according to claim 1, wherein the MPD file includes quality information indicating a relative quality of the bitstream among a plurality types of bitstream,
wherein the circuitry is configured to select the at least one of the plurality of Adaptation Sets for reproducing the 3D model content based on the group descriptor and the specific descriptor in the MPD file, so that the selected Adaptation Sets has higher quality for the bitstream based on the quality information.

12. A file generation apparatus comprising:
circuitry configured to
generate a Media Presentation Description (MPD) file including Preselection and a plurality of Adaptation Sets for reproducing a 3D model content, the 3D model content being generated by Volumetric Capturing and composed of a plurality of types of bitstream corresponding to the plurality of Adaptation Sets, the Preselection including a group descriptor which indicates the plurality of Adaptation Sets as a group, each of the plurality of Adaptation Sets including a specific descriptor which indicates type information and identification information of corresponding bitstream, and the group descriptor and the specific descriptor being used in selection of at least one of the plurality of Adaptation Sets for reproducing the 3D model content at an image processing apparatus.

13. The file generation apparatus according to claim 12, wherein the MPD file includes two or more groups of the plurality of Adaptation Sets, for reproducing a plurality of 3D model contents, respectively, wherein the group descriptor is included in a field of the MPD file, in which information for each of the plurality of 3D model contents is stored.

14. The file generation apparatus according to claim 13, wherein the field in which the information for each of the plurality of 3D model contents is stored includes information indicating that a 3D model reproduced based on the selected Adaptation Sets is to be viewed from surroundings of the 3D model.

15. The file generation apparatus according to claim 13, wherein the Preselection includes information indicating a displayable region of the 3D model content.

16. The file generation apparatus according to claim 12, wherein the MPD file further includes information of one or more additional Adaptation Sets by the group descriptor, the one or more additional Adaptation Sets indicate additional and different bitstream related to the group of the plurality of the Adaptation Sets.

17. The file generation apparatus according to claim 12, wherein the plurality of types of bitstream includes a texture, a mesh, a depth, a depth including a silhouette, or a silhouette.

18. The file generation apparatus according to claim 12, wherein the MPD file includes information indicating a displayable region of the bitstream to be reproduced.

19. The file generation apparatus according to claim 12, wherein the MPD file includes quality information indicating a relative quality of the bitstream among a plurality types of bitstream.

20. An image processing method, comprising:

acquiring a Media Presentation Description (MPD) file that includes Preselection and a plurality of Adaptation Sets for reproducing a 3D model content, the 3D model content being generated by Volumetric Capturing and composed of a plurality of types of bitstream corresponding to the plurality of Adaptation Sets, the Preselection including a group descriptor which indicates the plurality of Adaptation Sets as a group, and each of the plurality of Adaptation Sets including a specific descriptor which indicates type information and identification information of corresponding bitstream;

selecting at least one of the plurality of Adaptation Sets for reproducing the 3D model content based on the group descriptor and the specific descriptor in the MPD file; and acquiring data based on the selected at least one of the plurality of Adaptation Sets.

* * * * *